(12) United States Patent
Danziger

(10) Patent No.: US 12,253,686 B2
(45) Date of Patent: Mar. 18, 2025

(54) OPTICAL DEVICES HAVING DICHROIC BEAM COMBINERS, OPTICAL DEVICES FOR USE WITH DICHROIC BEAM COMBINERS, AND METHODS OF MANUFACTURE THEREFOR

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 654 days.

(21) Appl. No.: 17/639,982

(22) PCT Filed: Aug. 30, 2020

(86) PCT No.: PCT/IL2020/050944
§ 371 (c)(1),
(2) Date: Mar. 3, 2022

(87) PCT Pub. No.: WO2021/044409
PCT Pub. Date: Mar. 11, 2021

(65) Prior Publication Data
US 2022/0317467 A1    Oct. 6, 2022

Related U.S. Application Data

(60) Provisional application No. 62/895,519, filed on Sep. 4, 2019.

(51) Int. Cl.
*G02B 27/10* (2006.01)
*G02B 27/14* (2006.01)
*G02B 27/01* (2006.01)

(52) U.S. Cl.
CPC ....... *G02B 27/141* (2013.01); *G02B 27/1073* (2013.01); *G02B 27/0172* (2013.01)

(58) Field of Classification Search
CPC .................. G02B 27/141; G02B 27/1073
See application file for complete search history.

(56) References Cited

U.S. PATENT DOCUMENTS 5,096,520 A    3/1992  Farris
5,852,693 A   12/1998  Jeong
(Continued)

FOREIGN PATENT DOCUMENTS

JP        2015099323 A    5/2015

OTHER PUBLICATIONS

Lynch et al. "Beam Manipulation: Prisms vs. Mirrors". Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009) Abstract; first column of p. 45 , middle column of p. 46; Fig. 8.
(Continued)

*Primary Examiner* — Ryan D Howard
(74) *Attorney, Agent, or Firm* — Rivka Friedman

(57) ABSTRACT

Coated surfaces arranged in a stack assume a periodic formation having a sequence of segments including a first segment. The first segment has first, second, and third coated surfaces, and is repeated a set number of times to form the periodic formation. The stack is sliced to form a slice having two major external surfaces and adjacent sections each having coated surfaces from one segment between the two major external surfaces. The slice is cut to form at least one substrate from each section. Each substrate has two major surfaces and coated surfaces from a single segment of the periodic formation between the two major surfaces. In certain embodiments, the first coated surface reflects a first light color, the second coated surface transmits the first light color and reflects a second light color, and the third surface
(Continued)

reflects a third light color and transmits the first and second light colors.

26 Claims, 29 Drawing Sheets

(56) References Cited

U.S. PATENT DOCUMENTS

| | | | |
|---|---|---|---|
| 5,905,837 | A | 5/1999 | Wang et al. |
| 6,404,550 | B1 | 6/2002 | Yajima |
| 6,829,095 | B2 | 7/2004 | Amitai |
| 7,576,916 | B2 | 8/2009 | Amital |
| 2009/0153977 | A1 | 6/2009 | Chen et al. |
| 2010/0027289 | A1 | 2/2010 | Aiki et al. |
| 2012/0068609 | A1 | 3/2012 | Ide et al. |
| 2013/0021581 | A1 | 1/2013 | Takahashi et al. |
| 2013/0335708 | A1 | 12/2013 | Ouderkirk |
| 2015/0288937 | A1 | 10/2015 | Tsai et al. |
| 2016/0313567 | A1 | 10/2016 | Kurashige |
| 2017/0045664 | A1 | 2/2017 | Chung et al. |
| 2017/0242249 | A1 | 8/2017 | Wall et al. |
| 2017/0276947 | A1 | 9/2017 | Yokoyama |
| 2018/0262725 | A1 | 9/2018 | Fan |
| 2019/0018245 | A1 | 1/2019 | Cheng et al. |
| 2020/0209667 | A1 | 7/2020 | Sharlin et al. |
| 2022/0326426 | A1 | 10/2022 | Eisenfeld et al. |
| 2023/0019309 | A1 | 1/2023 | Chriki et al. |

OTHER PUBLICATIONS

M Kivanc Hedili Et Al; "Light-efficient augmented reality display with steerable eyebox", Opt Express . Apr. 29, 2019;27(9):12572-12581. doi: 10.1364/OE.27.012572.

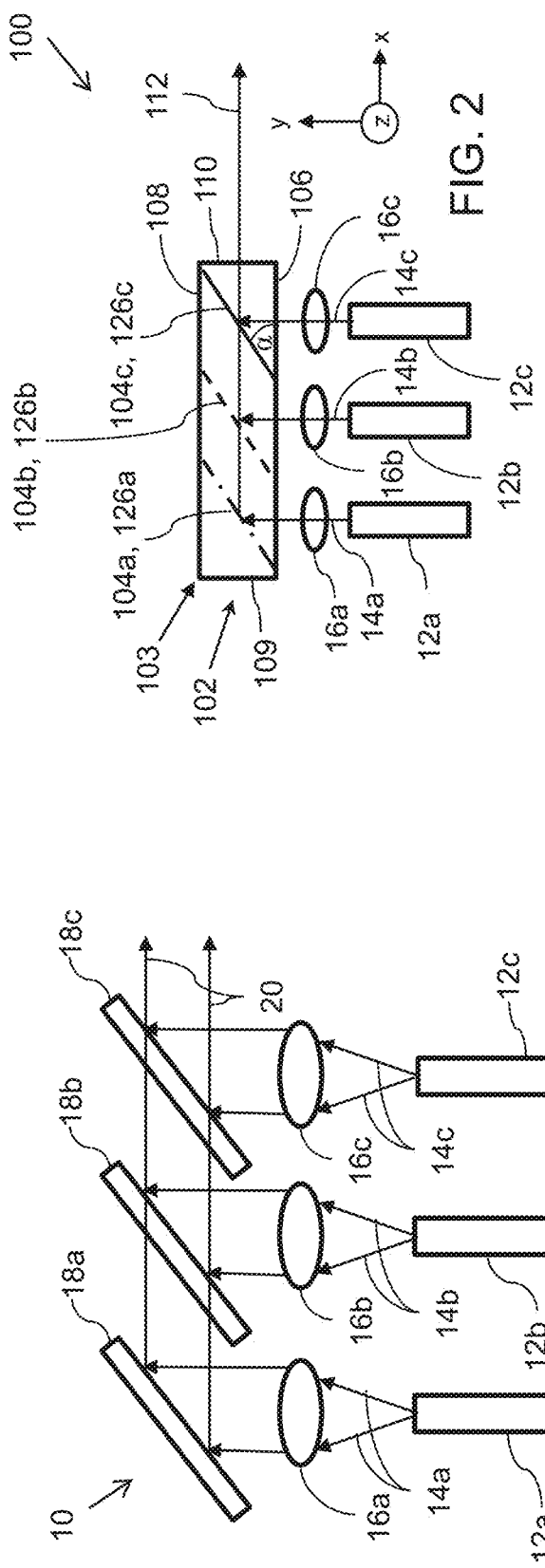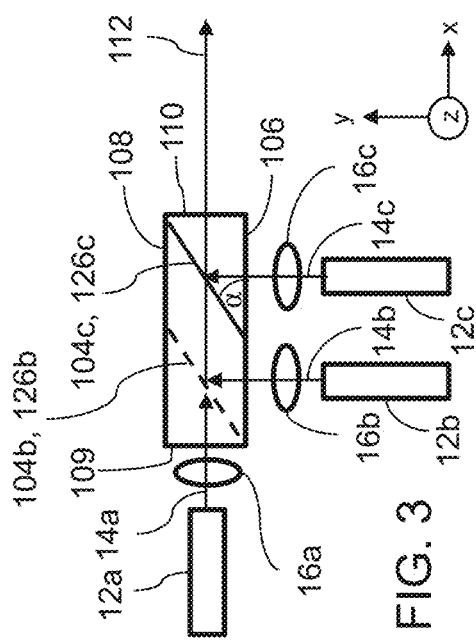

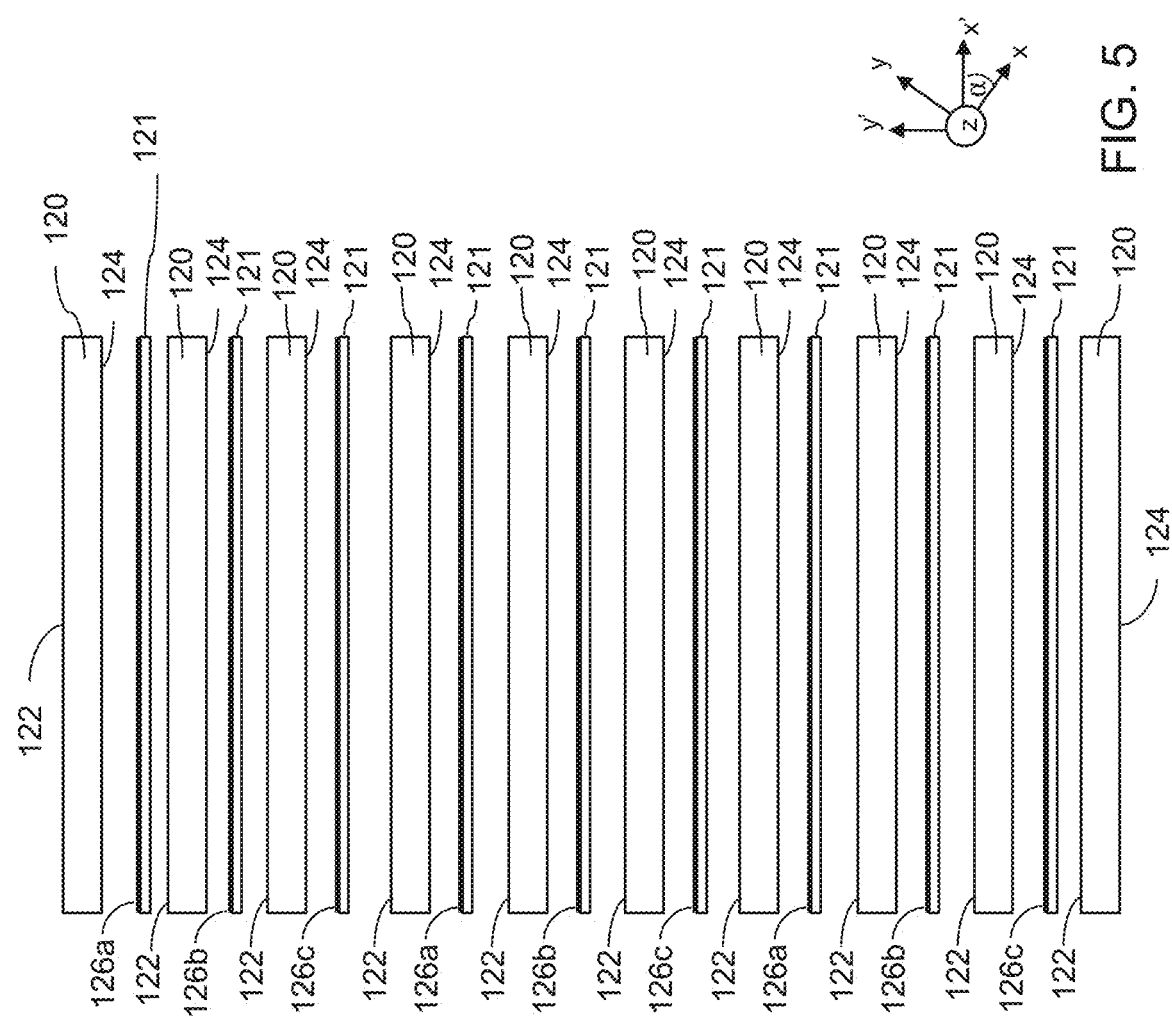

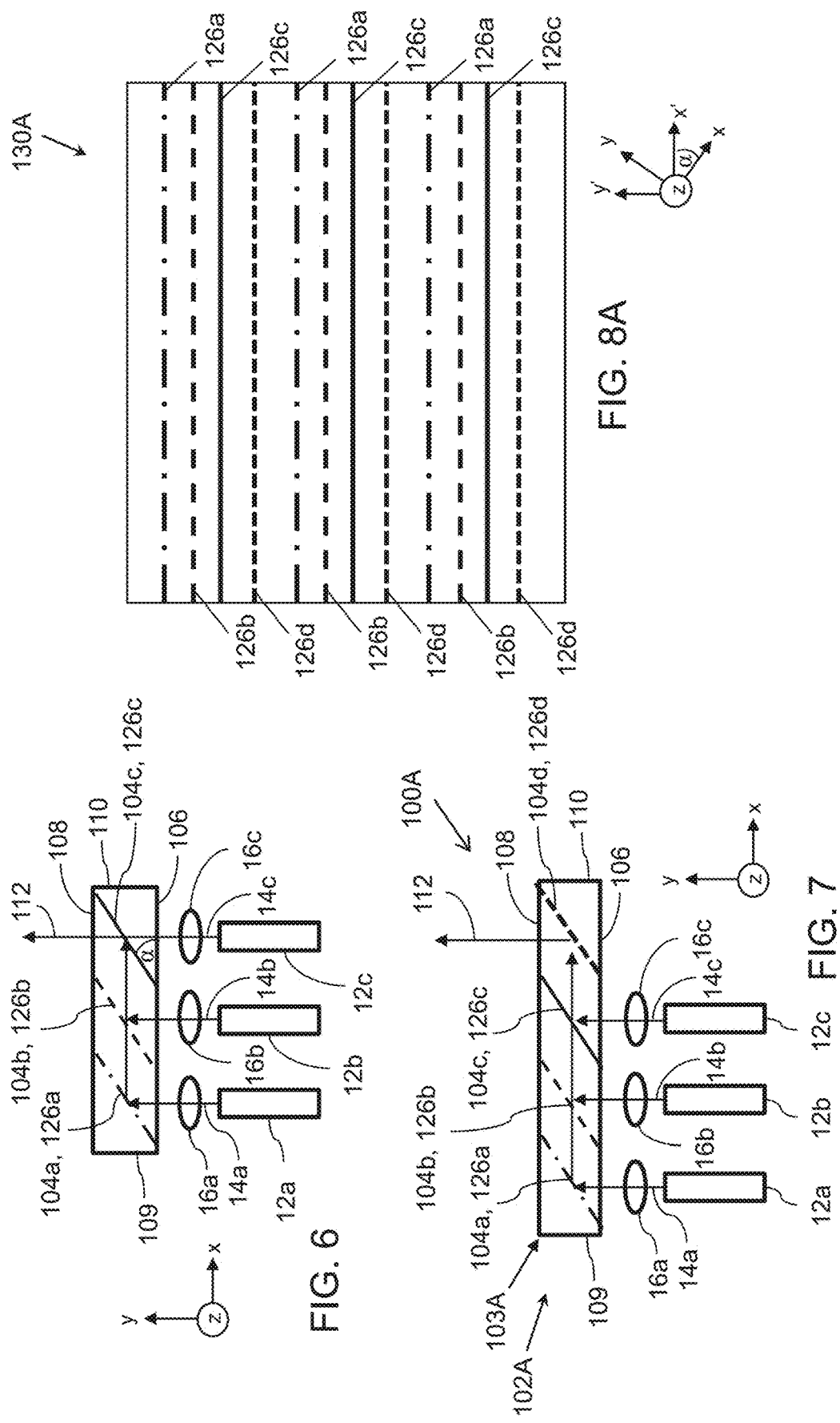

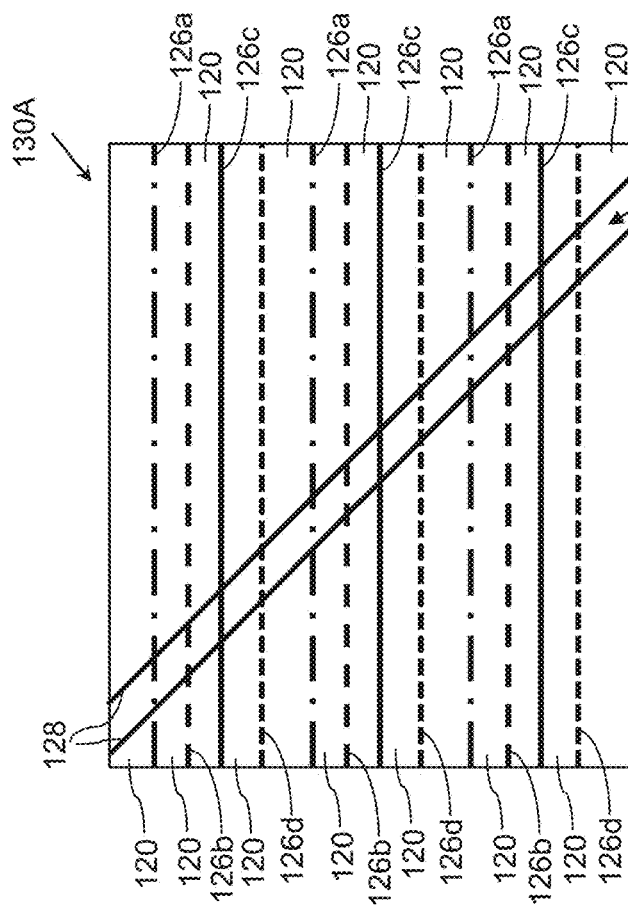
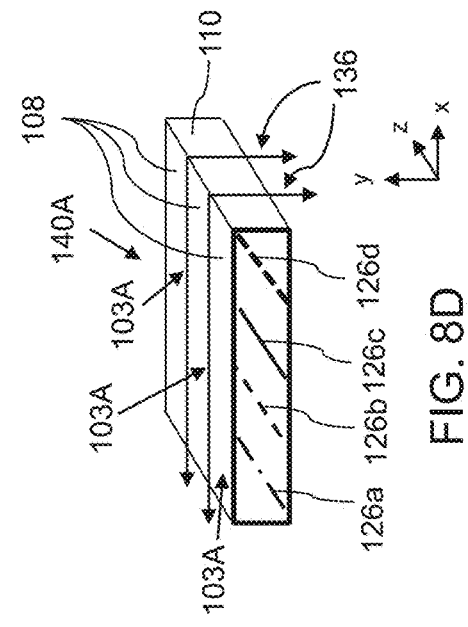
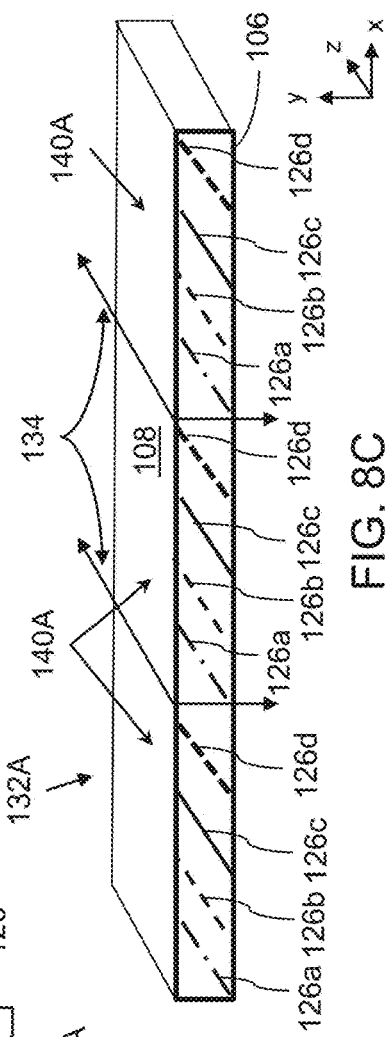
FIG. 8B
FIG. 8D
FIG. 8C

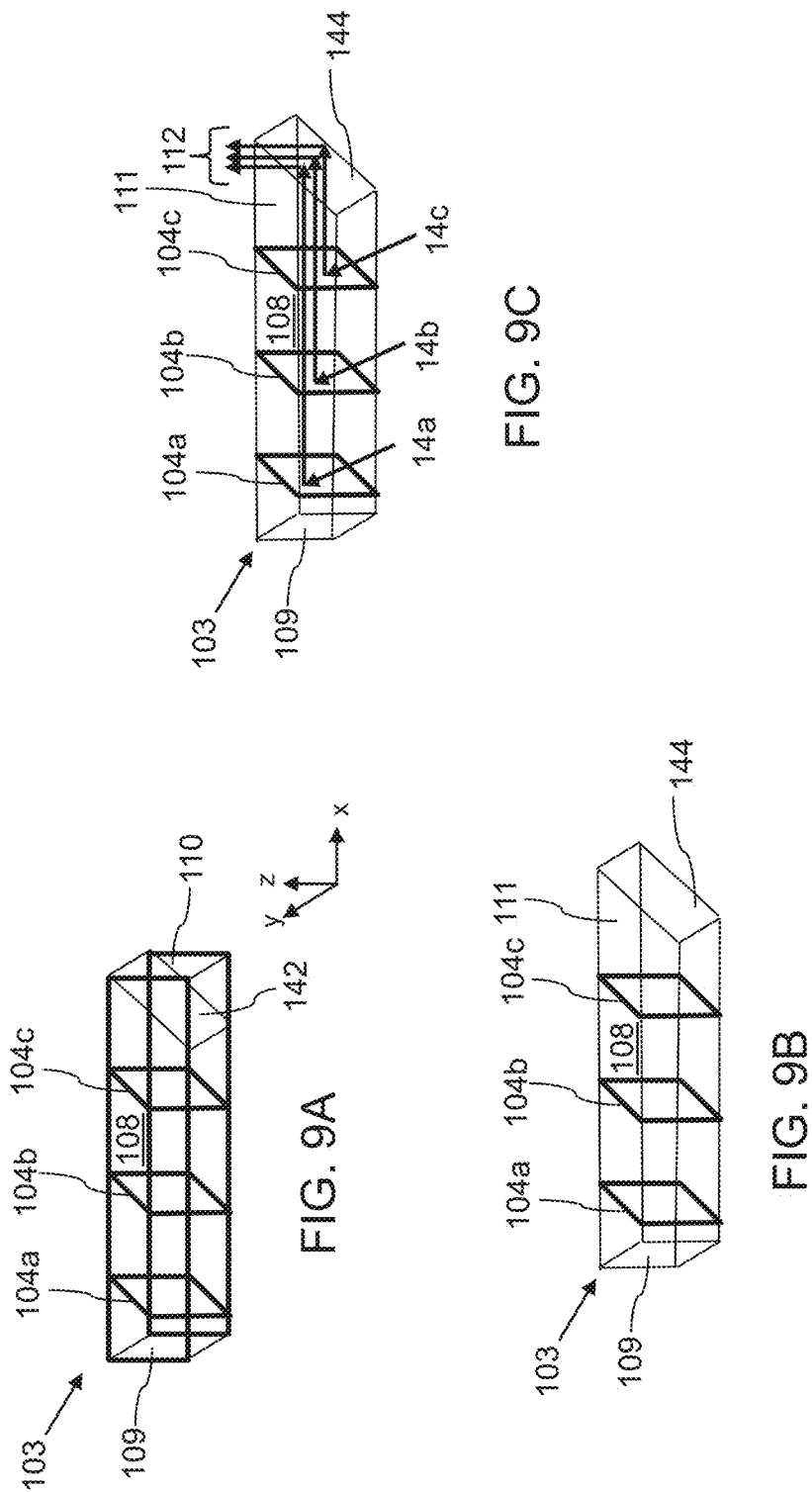

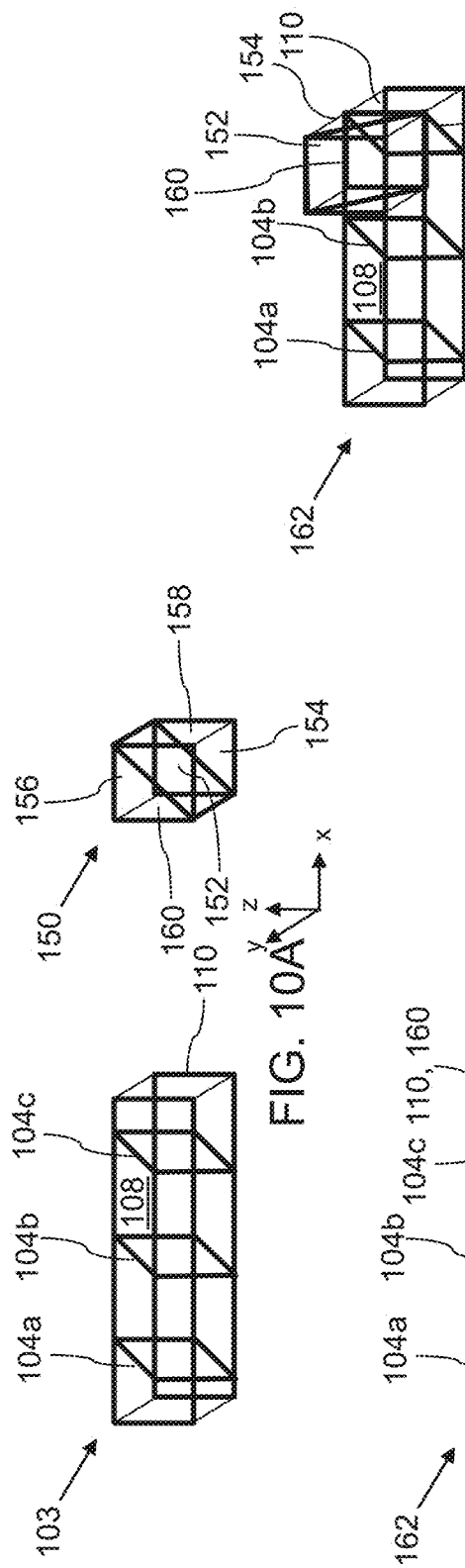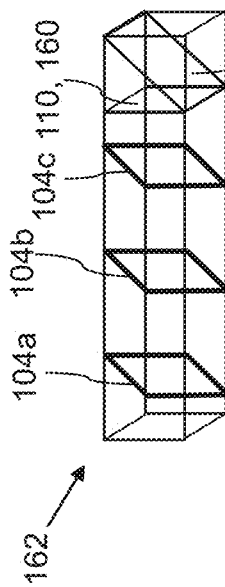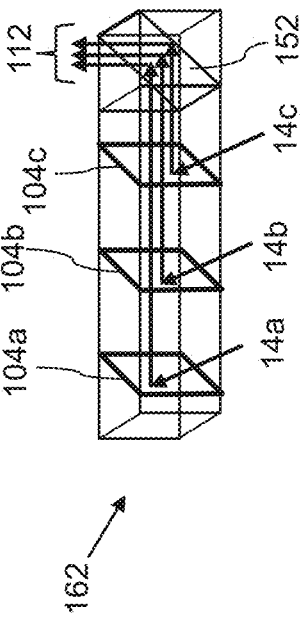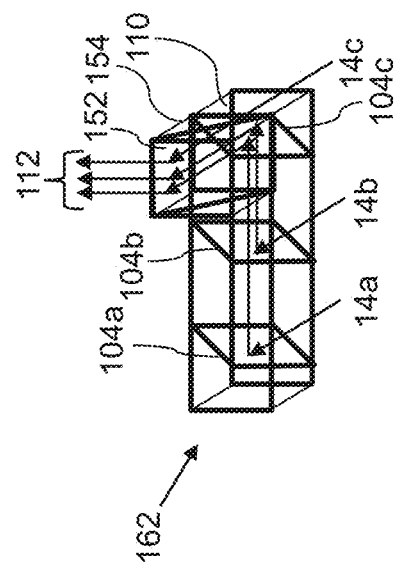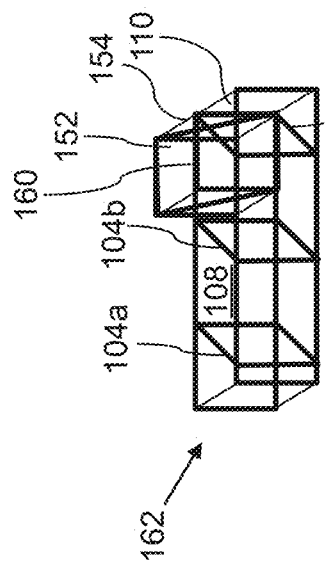

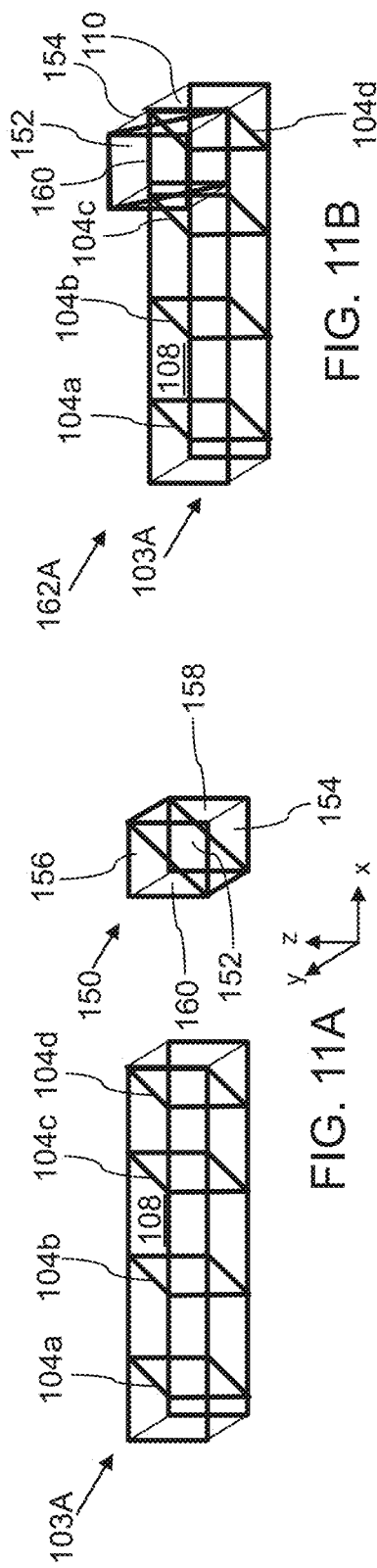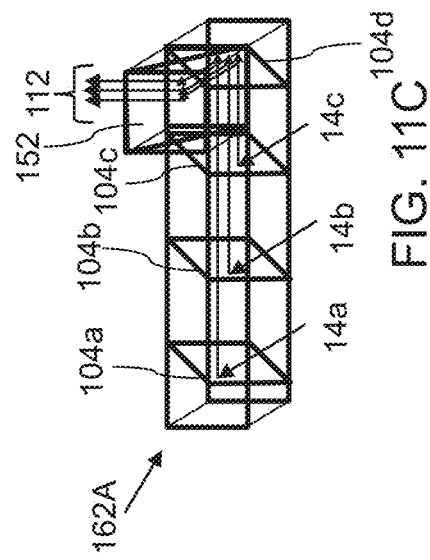

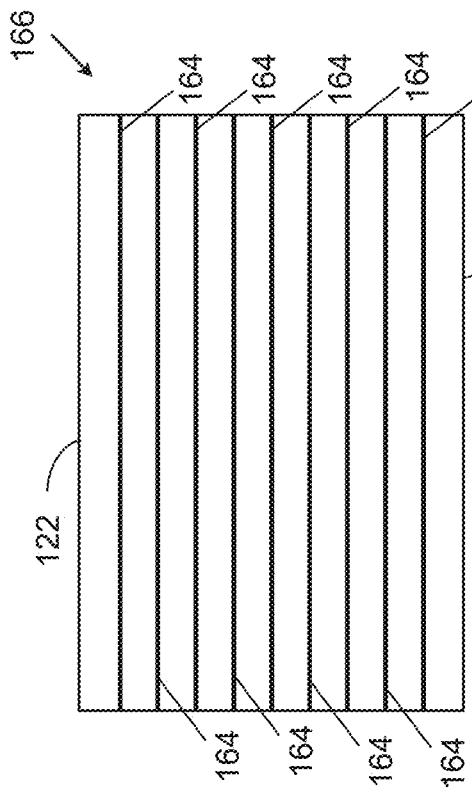
FIG. 12B
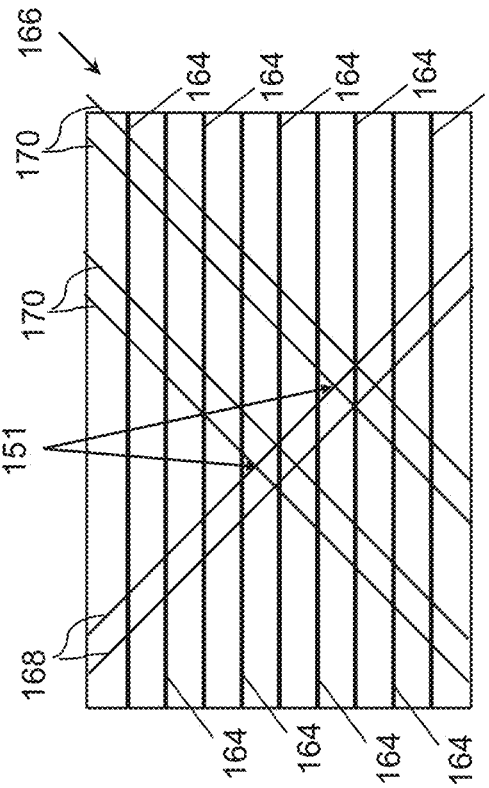
FIG. 12C
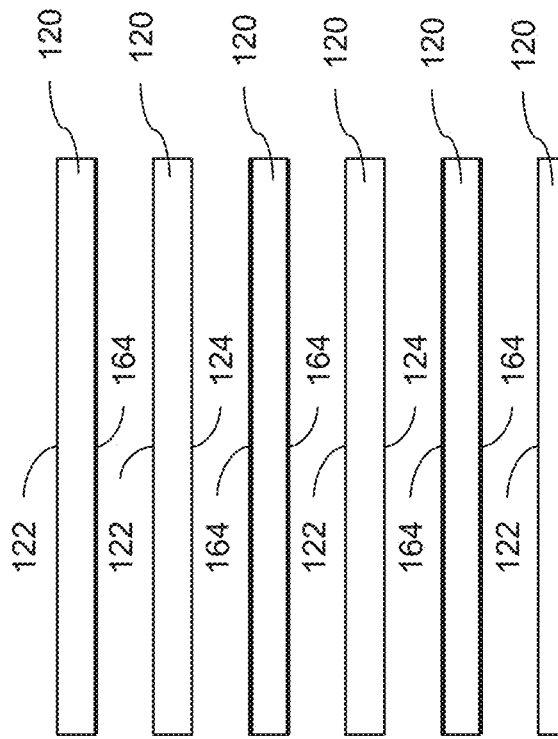
FIG. 12A
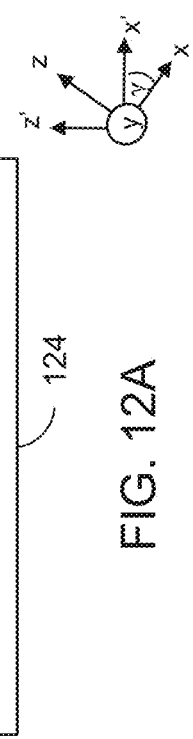

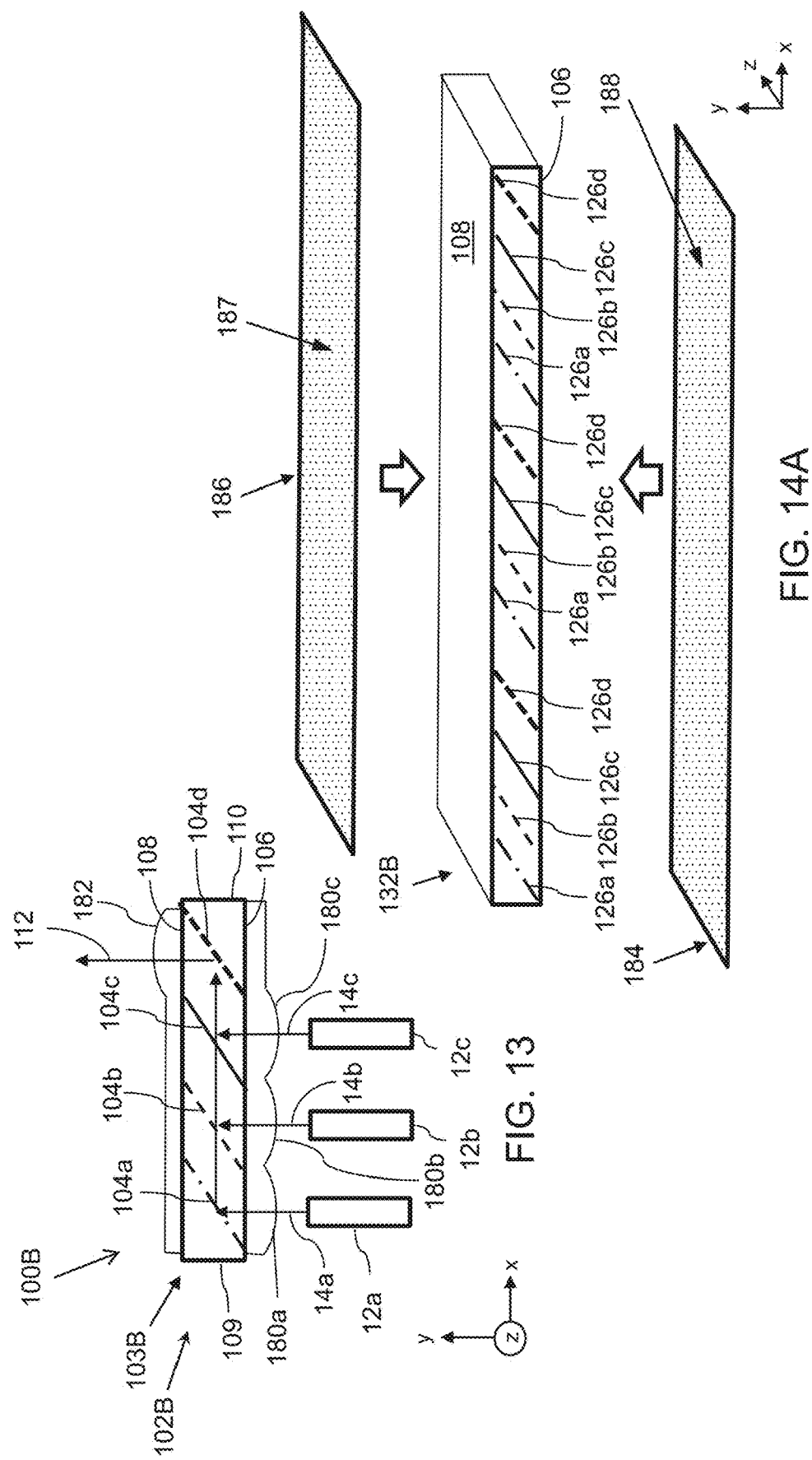

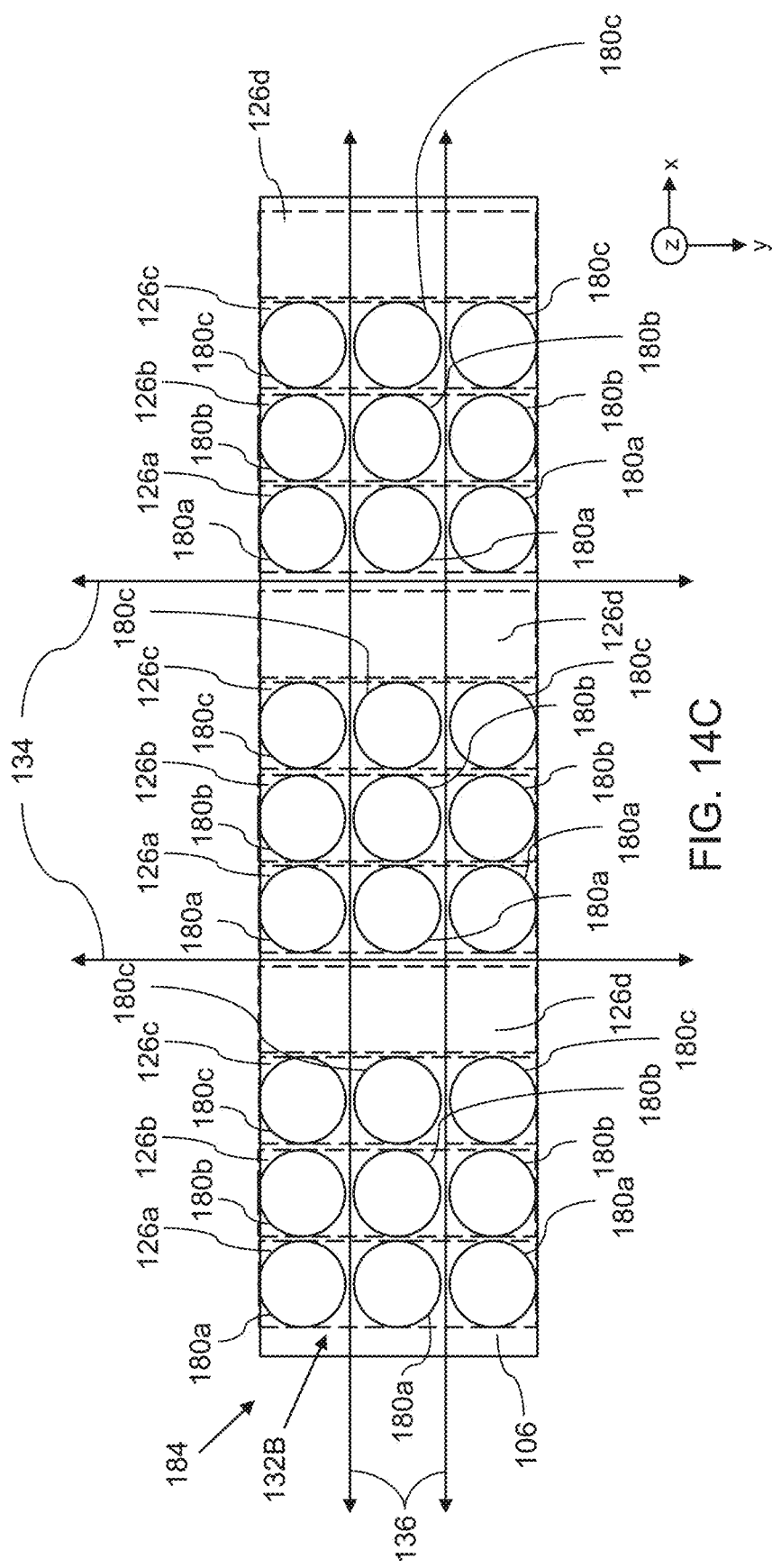

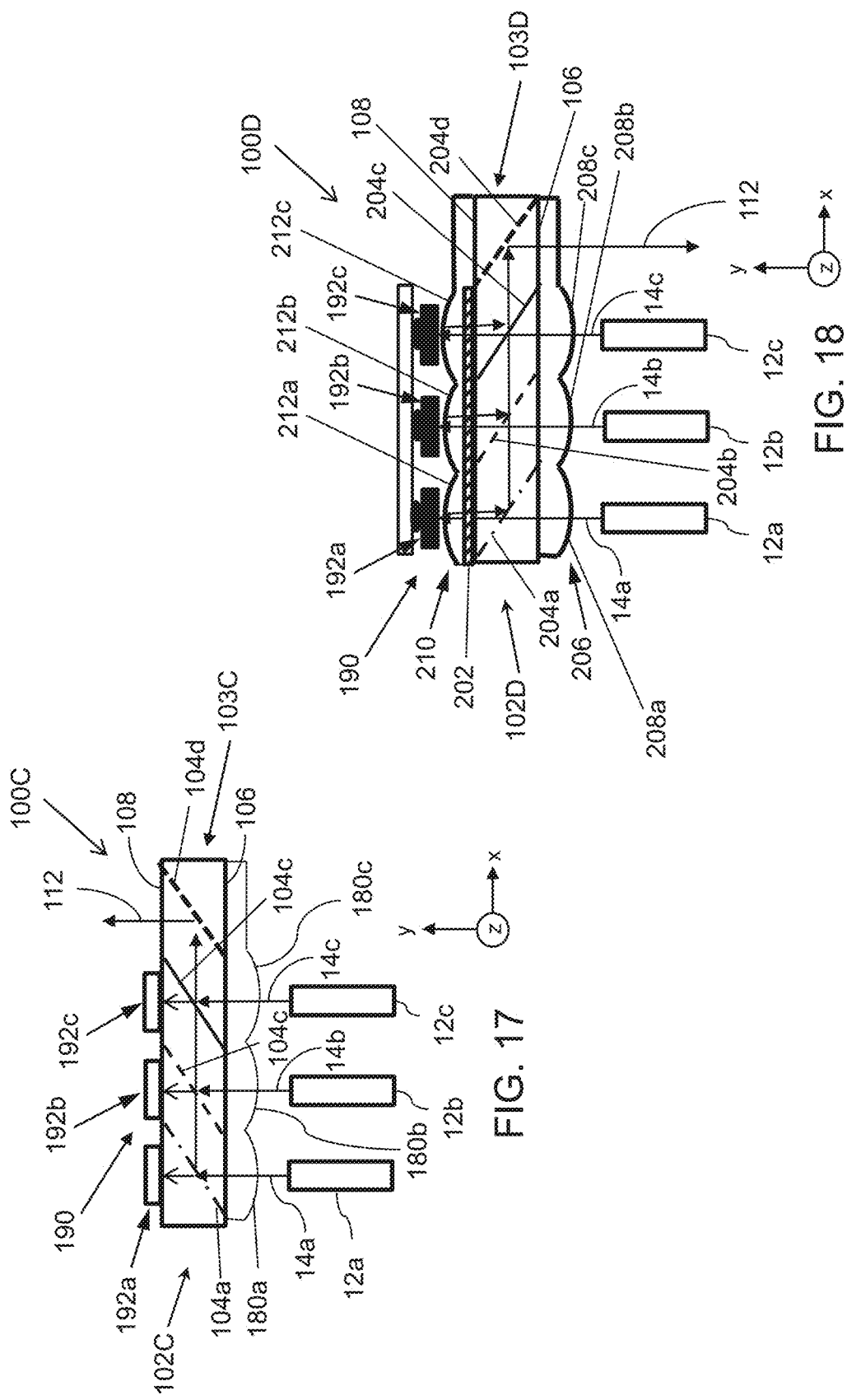

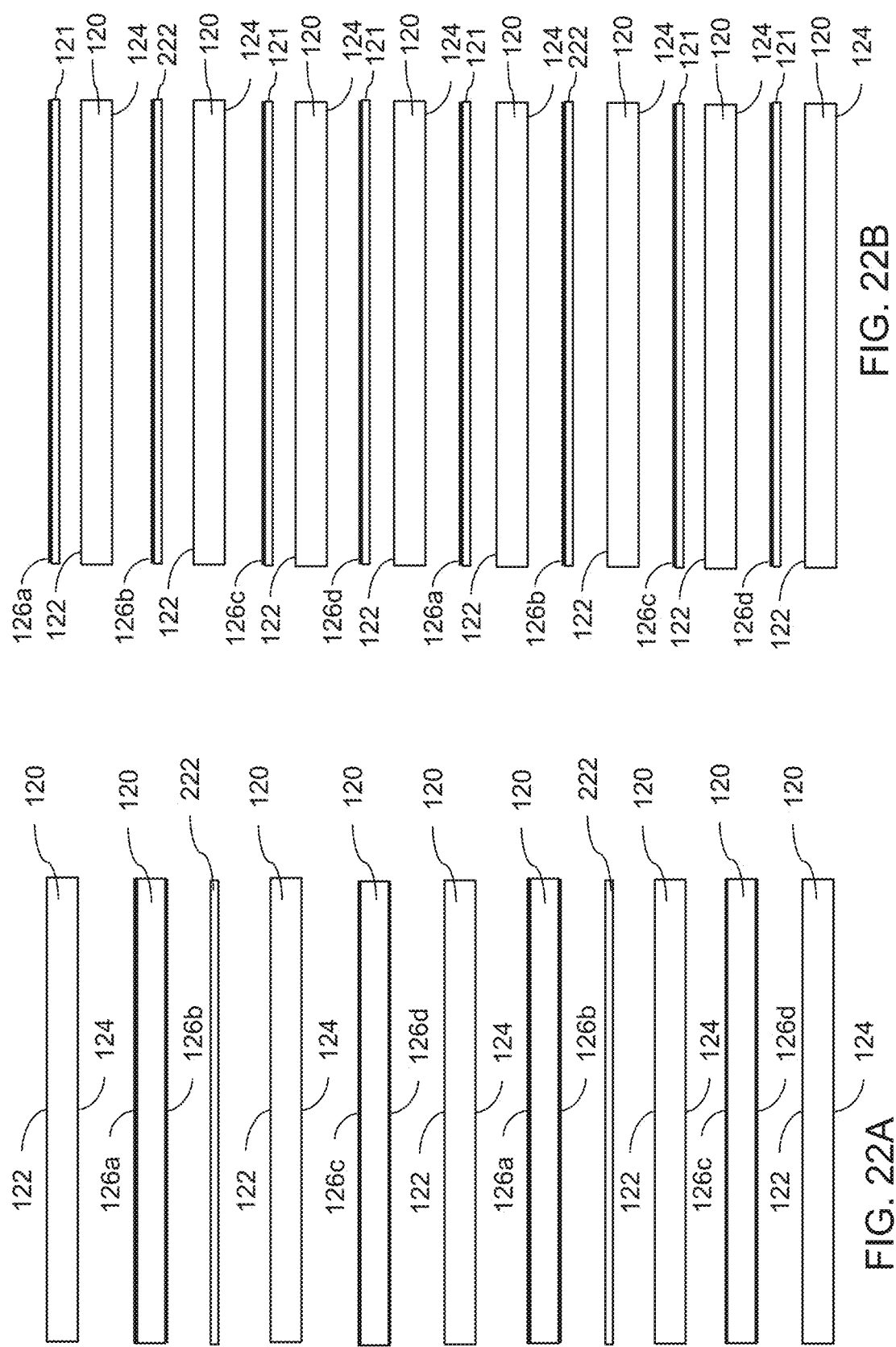

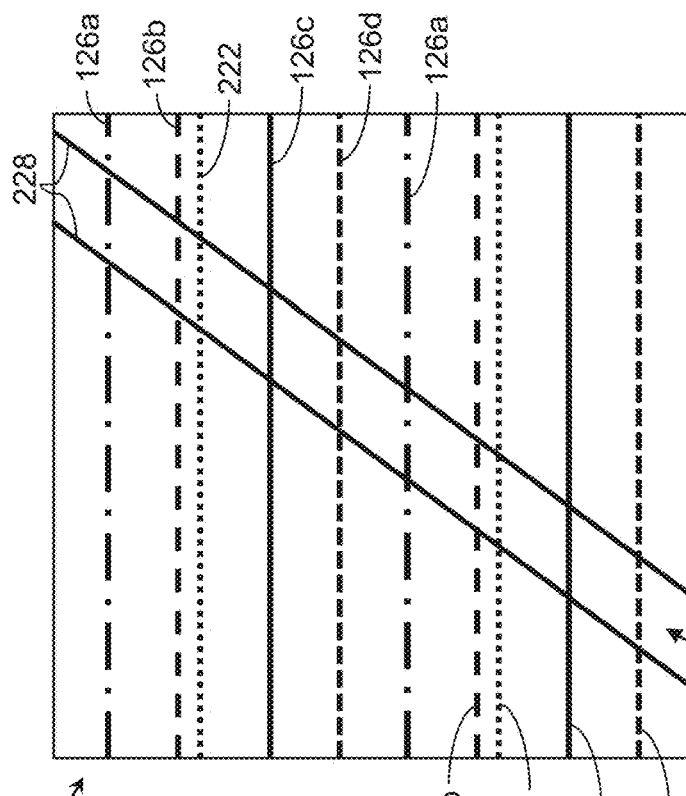
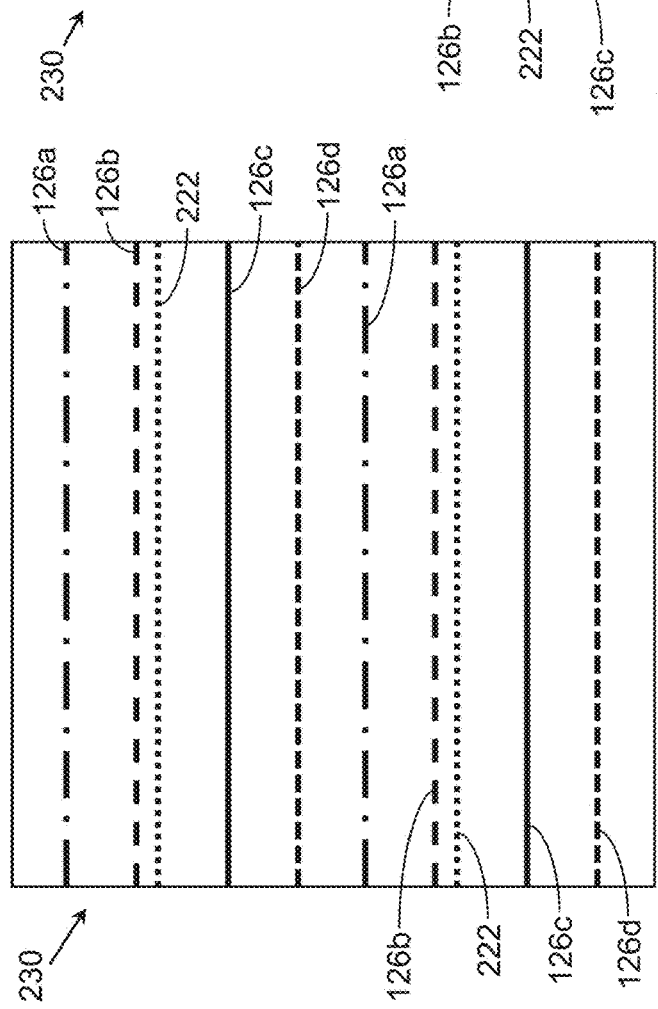
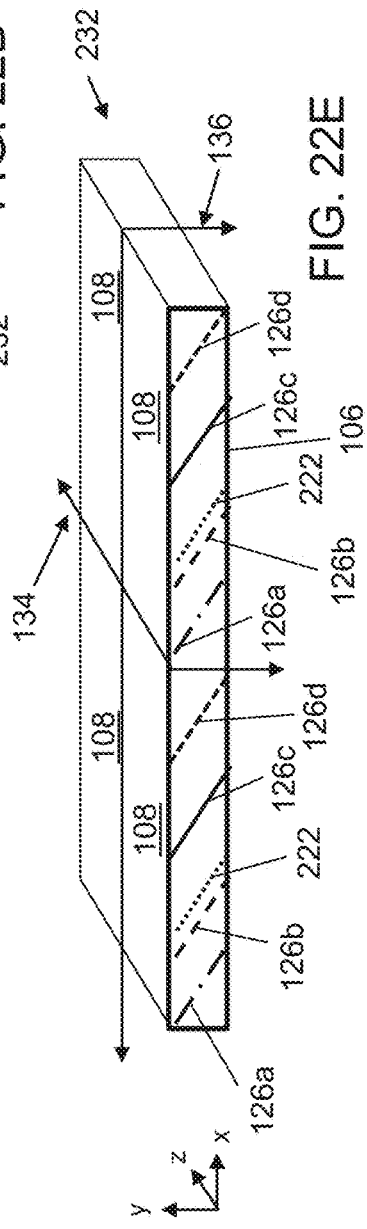

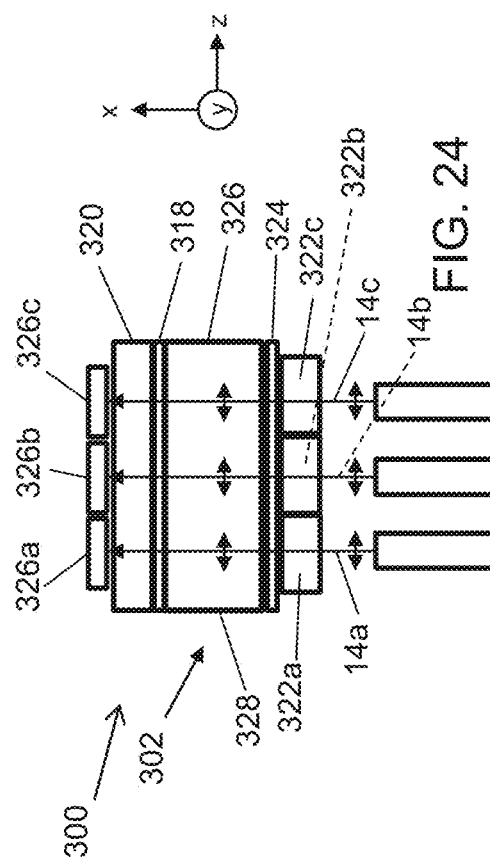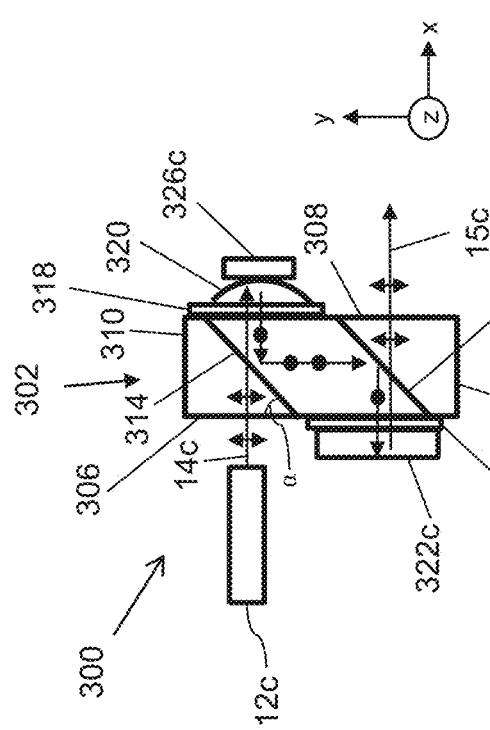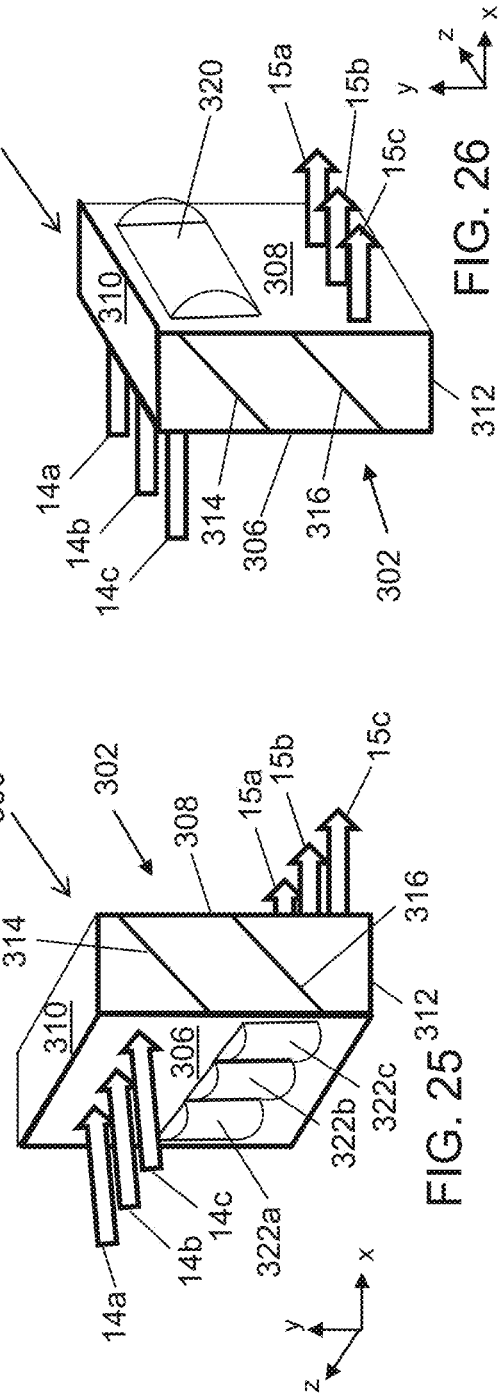

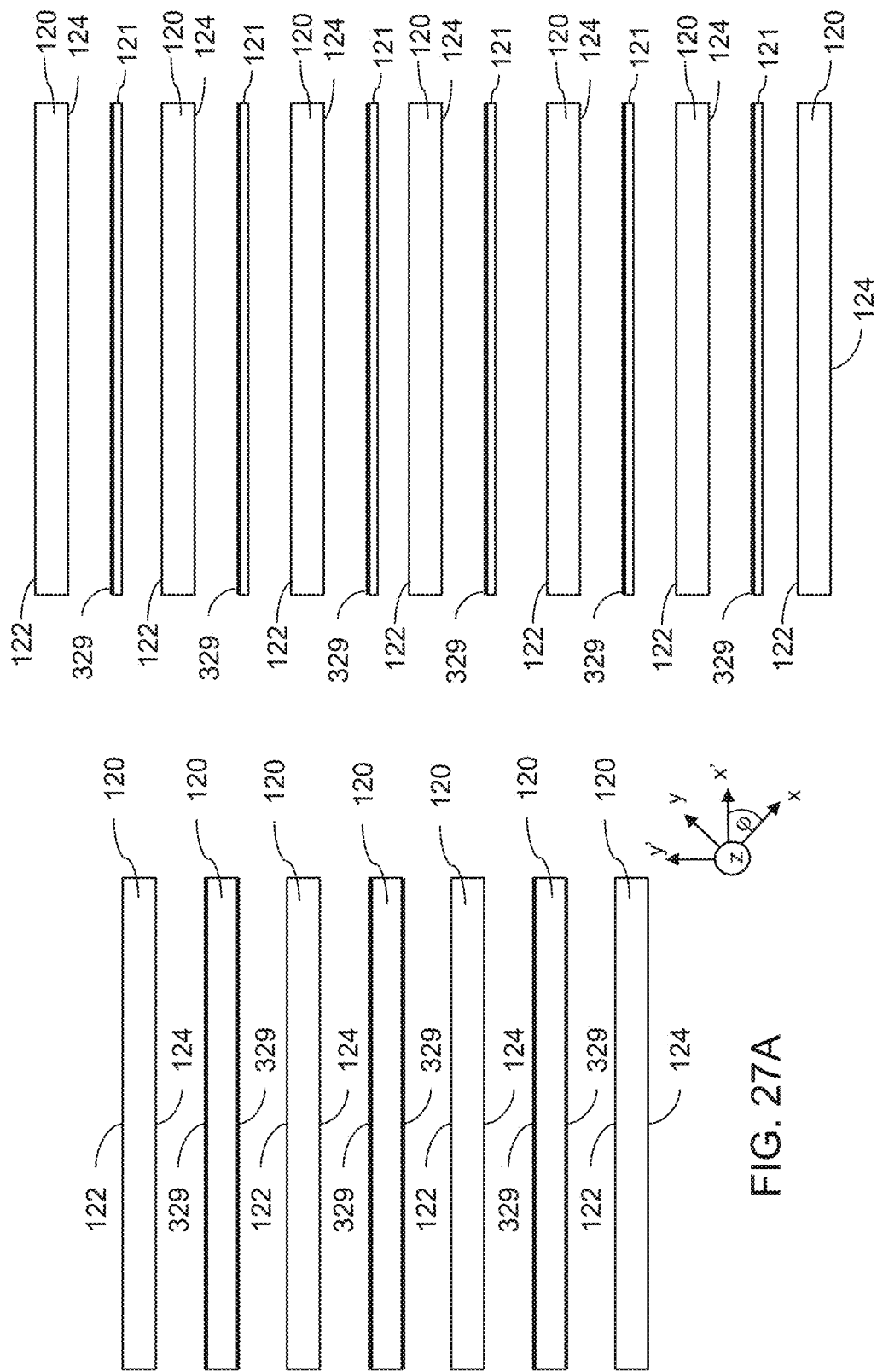

OPTICAL DEVICES HAVING DICHROIC BEAM COMBINERS, OPTICAL DEVICES FOR USE WITH DICHROIC BEAM COMBINERS, AND METHODS OF MANUFACTURE THEREFOR

CROSS-REFERENCE TO RELATED APPLICATIONS

This application claims priority from U.S. Provisional Patent Application No. 62/895,519, filed Sep. 4, 2019, whose disclosure is incorporated by reference in its entirety herein.

TECHNICAL FIELD

The present invention relates to dichroic beam combiners.

BACKGROUND OF THE INVENTION

Compact optical devices are particularly needed in the field of head-mounted displays (HMDs), wherein an optical module performs functions of image generation and collimation of the image to infinity, for delivery to the eye of the viewer. The image can be obtained from a display device, either directly from a spatial light modulator (SLM), such as a cathode ray tube (CRT), a liquid crystal display (LCD), a liquid crystal on silicon (LCoS), a digital micro-mirror device (DMD), an OLED display, a scanning source or similar devices, or indirectly, by means of a relay lens or an optical fiber bundle. The image, made up of an array of pixels, is focused to infinity by a collimating arrangement and transmitted into the eye of the viewer, typically by a reflecting surface or a partially reflecting surface acting as a combiner, for non-see-through applications and see-through applications, respectively. Typically, a conventional, free-space optical module is used for these purposes.

A particularly advantageous family of solutions for HMDs and near-eye displays (NEDs) are commercially available from Lumus Ltd. (Israel), typically employing light-guide substrates (waveguides) with partially reflecting surfaces or other applicable optical elements for delivering an image to the eye of a user.

In certain optical architectures utilizing SLMs as the display device, in particular those utilizing LCoS or LCDs to generate the image pixels, the active areas of the display device require illumination from a combined-colored beam made up of constituent colored beams originating from different colored illumination sources in order to generate the image pixels. Various optical architecture concepts for color combiners have been proposed, including proposals for dichroic beam combiners that utilize dichroic reflectors to combine individual color beams to form a combined-color beam. FIG. 1 illustrates one such proposal for a dichroic beam combiner 10 having three dichroic reflectors 18a, 18b and 18c that are associated with respective colored light sources 12a, 12b and 12c, typically implemented as LEDs or laser light sources such as laser diodes. Light beams (schematically represented as light rays 14a) of a first color (e.g., red) are emitted by the light source 12a, while light beams (schematically represented as light rays 14b) of a second color (e.g., green) are emitted by the light source 12b, and light beams (schematically represented as light rays 14c) of a third color (e.g., blue) are emitted by the light source 12c. The beams 14a, 14b and 14c pass through respective collimating optics 16a, 16b and 16c (which can each be a lens or set of lenses) which collimate the beams. The collimated beams impinge on the dichroic reflectors 18a, 18b and 18c, which are each configured to transmit light of a certain color or colors, and reflect light of another color or colors. In the FIG. 1, the dichroic reflector 18a reflects light of the first color, the dichroic reflector 18b transmits light of the first color and reflects light of the second color, and the dichroic reflector 18c transmits light of the first color and light of the second color, and reflects light of the third color. As a result, the individual colored light beams are combined as a color-combined output beam 20.

However, the spacing between the dichroic reflectors 18a, 18b and 18c in combination with the deployment of collimating optics 16a, 16b and 16c, results in the dichroic beam combiner 10 illustrated in FIG. 1 having a form factor that makes it generally unsuitable for use with compact optical devices and systems such as those used in HMDs and NEDs.

SUMMARY OF THE INVENTION

The present invention is optical devices having dichroic beam combiners, optical devices that emit light beams that can be used with dichroic beam combiners, and methods of manufacturing such optical devices.

According to the teachings of an embodiment of the present invention, there is provided a method for manufacturing an optical device, the method comprising: arranging a plurality of coated surfaces in a stack so as to assume a periodic formation that includes a sequence of segments, the sequence of segments including a first segment, and the periodic formation formed by repeating the first segment a set number of times, the first segment including: a first coated surface that reflects or transmits light having wavelength in a first wavelength range, a second coated surface that reflects light having wavelength in a second wavelength range and transmit lights having wavelength in the first wavelength range, and a third coated surface that reflects or transmits light having wavelength in a third wavelength range, transmits or reflects light having wavelength in the first wavelength range or the second wavelength range; slicing the stack to form a slice having at least two parallel major external surfaces and a plurality of adjacent sections, each section having coated surfaces from one segment of the periodic formation between the two major external surfaces; and cutting the slice at least once to form at least one substrate from each section, each substrate of the at least one substrate having at least two parallel major surfaces and coated surfaces from a single segment of the periodic formation between the two major surfaces.

According to a further feature of an embodiment of the present invention, the first coated surface is formed by applying a reflective coating to a surface associated with at least one transparent plate.

According to a further feature of an embodiment of the present invention, the second coated surface is formed by applying a first dichroic coating to a surface associated with at least one transparent plate, and the third coated surface is formed by applying a second dichroic coating to a surface associated with at least one transparent plate.

According to a further feature of an embodiment of the present invention, there is also provided simultaneously polishing the two major external surfaces of the slice.

According to a further feature of an embodiment of the present invention, each substrate of the at least one substrate has a direction of elongation and is configured to output a combined beam having a propagation direction that is parallel to the direction of elongation.

According to a further feature of an embodiment of the present invention, the cutting the slice at least once includes: cutting the slice along at least one plane that is perpendicular to the two major external surfaces of the slice so as to form a single section that includes exactly one segment.

According to a further feature of an embodiment of the present invention, there is also provided polishing at least one surface formed by slicing the slice along the at least one plane.

According to a further feature of an embodiment of the present invention, the cutting the slice at least once further includes: slicing the single section along at least one second plane perpendicular to the at least one plane and the two major external surfaces of the slice so as to form the at least one substrate.

According to a further feature of an embodiment of the present invention, there is also provided slicing a substrate of the at least one substrate along a plane oblique to the at least one plane to form a planar surface; and polishing and coating the planar surface with a reflective coating so as to be reflective for light having wavelength in the first, second or third wavelength range, such that the substrate is configured to output a combined beam having a propagation direction that is perpendicular to a direction of elongation of the substrate and parallel to the two major surfaces of the substrate.

According to a further feature of an embodiment of the present invention, the third coated surfaces reflect light having wavelength in the third wavelength range and transmit light having wavelength in the first wavelength range or the second wavelength range.

According to a further feature of an embodiment of the present invention, the cutting the slice at least once includes: cutting the slice along at least one first plane that is perpendicular to the two major external surfaces of the slice so as to form a single section that includes exactly one segment, and slicing the single section along at least one second plane perpendicular to the at least one first plane and the two major external surfaces of the slice so as to form the at least one substrate, each substrate of the at least one substrate has a direction of elongation and is configured to output a combined beam having a propagation direction that is parallel to the direction of elongation; and there is also provided attaching a cuboid structure to a surface formed at the at least one first plane, the cuboid structure having a reflective surface deployed in a plane oblique to the surface formed at the at least one plane, the reflective surface configured to deflect the combined beam in a direction that is perpendicular to the direction of elongation and parallel to the major external surfaces.

According to a further feature of an embodiment of the present invention, the third coated surfaces transmit light having wavelength in the third wavelength range and reflect light having wavelength in the first wavelength range or the second wavelength range.

According to a further feature of an embodiment of the present invention, the cutting the slice at least once includes: cutting the slice along at least one first plane that is perpendicular to the two major external surfaces of the slice so as to form a single section that includes exactly one segment, and slicing the single section along at least one second plane perpendicular to the at least one first plane and the two major external surfaces of the slice so as to form the at least one substrate, each substrate of the at least one substrate has a direction of elongation and is configured to output a combined beam having a propagation direction that is parallel to the direction of elongation; and there is also provided attaching a cuboid structure to a portion of one of the two major external surfaces, the cuboid structure having a reflective surface deployed in a plane oblique to the two major external surfaces, the reflective surface configured to deflect the combined beam in a direction that is perpendicular to the direction of elongation and parallel to the major external surfaces.

According to a further feature of an embodiment of the present invention, the first segment further includes: a fourth coated surface that reflects light having wavelength in the first, second, or third wavelength range.

According to a further feature of an embodiment of the present invention, the cutting the slice at least once includes: cutting the slice along at least one first plane that is perpendicular to the two major external surfaces of the slice so as to form a single section that includes exactly one segment, and slicing the single section along at least one second plane perpendicular to the at least one first plane and the two major external surfaces of the slice so as to form the at least one substrate, each substrate of the at least one substrate has a direction of elongation and is configured to output a combined beam having a propagation direction that is parallel to the direction of elongation; and there is also provided attaching a cuboid structure to a portion of one of the two major external surfaces, the cuboid structure having a reflective surface deployed in a plane oblique to the two major external surfaces, the reflective surface configured to deflect the combined beam in a direction that is perpendicular to the direction of elongation and parallel to the major external surfaces.

According to a further feature of an embodiment of the present invention, there is also provided aligning a first plate with a first of the two major external surfaces of the slice, the first plate having a two-dimensional array of lenses arranged such that, for each segment, the first coated surface is associated with at least one first lens of the array, the second coated surface is associated with at least one second lens of the array, and the third coated surface is associated with at least one third lens of the array; and aligning a second plate with a second of the two major external surfaces of the slice, the second plate having a two-dimensional array of lenses arranged such that, for each segment, the fourth coated surface is associated with at one lens of the array of the second plate.

According to a further feature of an embodiment of the present invention, there is also provided aligning a first plate with a first of the two major external surfaces of the slice, the first plate having a two-dimensional array of lenses arranged such that, for each segment, the first coated surface is associated with at least one first lens of the array, the second coated surface is associated with at least one second lens of the array, and the third coated surface is associated with at least one third lens of the array.

According to a further feature of an embodiment of the present invention, there is also provided aligning a second plate with a second of the two major external surfaces of the slice, the second plate having a two-dimensional array of detectors arranged such that, for each segment, the first coated surface is associated with at least one first detector of the array, the second coated surface is associated with at least one second detector of the array, and the third coated surface is associated with at least one third detector of the array.

According to a further feature of an embodiment of the present invention, there is also provided attaching at least one retardation plate to a second of the two major external surfaces of the slice; and aligning a second plate with the retardation plate, the second plate having a two-dimensional array of lenses arranged such that, for each segment, the first coated surface is associated with at least one first lens of the array of the second plate, the second coated surface is associated with at least one second lens of the array of the second plate, and the third coated surface is associated with at least one third lens of the array of the second plate.

According to a further feature of an embodiment of the present invention, there is also provided aligning a third plate with the second plate, the third plate having a two-dimensional array of detectors arranged such that, for each segment, the first coated surface is associated with at least one first detector of the array of detectors, the second coated surface is associated with at least one second detector of the array of detectors, and the third coated surface is associated with at least one third detector of the array of detectors.

According to a further feature of an embodiment of the present invention, there is also provided deploying a plurality of retardation plates in the stack such that the first segment includes at least one retardation plate.

According to a further feature of an embodiment of the present invention, there is also provided aligning a plate with one of the two major external surfaces of the slice, the plate having a two-dimensional array of detectors arranged such that, for each segment, the first coated surface is associated with at least one first detector of the array, the second coated surface is associated with at least one second detector of the array, and the third coated surface is associated with at least one third detector of the array.

According to a further feature of an embodiment of the present invention, the plate further includes an electrically conductive carrier foil that carries the detectors on the plate.

According to a further feature of an embodiment of the present invention, there is also provided attaching an electrically conductive surface to the plate, the electrically conductive surface including a plurality of electrical contact points, each contact point associated with a respective one of the detectors.

There is also provided according to the teachings of an embodiment of the present invention a method for manufacturing an optical device, the method comprising: arranging a plurality of coated surfaces in a stack having at least one segment, the at least one segment including a first segment that is repeated at least once, the plurality of coated surfaces including: at least one first coated surface that reflects or transmits at least light having wavelength in a first wavelength range, at least one second coated surface that reflects light having wavelength in a second wavelength range and transmits light having wavelength in the first wavelength range, at least one third coated surface that reflects or transmits light having wavelength in a third wavelength range, and transmits or reflects light having wavelength in the first wavelength range or the second wavelength range, and at least one fourth coated surface that reflects light having wavelength in the first wavelength range, the second wavelength range, or the third wavelength range, the first segment has exactly one of the at least one first coated surface, exactly one of the at least one second coated surface, exactly one third coated surface, and exactly one of the at least one fourth coated surface; slicing the stack to form a slice having at least two major external surfaces and at least one section having coated surfaces of one segment between the two major external surfaces; and cutting the slice at least once to form at least one substrate from each section of the at least one section, each substrate of the at least one substrate having at least two major surfaces and coated surfaces from a single segment between the two major surfaces. There is also provided according to the teachings of an embodiment of the present invention a method for manufacturing an optical device, the method comprising: arranging a plurality of coated surfaces in a stack having at least one segment, that includes a first segment that is repeated at least once, the plurality of coated surfaces including: at least one first coated surface that transmits light having wavelength in a first wavelength range polarized in a first polarization direction and reflects light having wavelength in the first wavelength range polarized in a second polarization direction, at least one second coated surface that transmits light having wavelength in a second wavelength range polarized in the first polarization direction and light having wavelength in the first wavelength range polarized in the second polarization direction, and reflects light having wavelength in the second wavelength range polarized in the second polarization direction, at least one third coated that transmits light having wavelength in a third wavelength range polarized in the first polarization direction and light having wavelength in the first or second wavelength ranges polarized in the second polarization direction, and reflects light having wavelength in the third wavelength range polarized in the second polarization direction, the first segment includes exactly one of the at least one first coated surface, exactly one of the at least one second coated surface, and exactly one of the at least one third coated surface; slicing the stack to form a slice having at least two major external surfaces and at least one section having coated surfaces from one segment of the at least one segment between the two major external surfaces; and attaching a retardation plate to one of the two major external surfaces of the slice.

According to a further feature of an embodiment of the present invention, there is also provided cutting the slice at least once to form at least one substrate from each section of the at least one section, each substrate of the at least one substrate having at least two major surfaces and coated surfaces from a single segment of the periodic formation between the two major surfaces.

According to a further feature of an embodiment of the present invention, there is also provided aligning a first plate with the retardation plate, the first plate having a two-dimensional array of lenses arranged such that, for each segment, the first coated surface is associated with at least one first lens of the array, the second coated surface is associated with at least one second lens of the array, and the third coated surface is associated with at least one third lens of the array; and aligning a second plate with the other of the two major external surfaces of the slice, the second plate having a two-dimensional array of lenses arranged such that, for each segment, the first coated surface is associated with at least one first lens of the array of the second plate, the second coated surface is associated with at least one second lens of the array of the second plate, and the third coated surface is associated with at least one third lens of the array of the second plate.

According to a further feature of an embodiment of the present invention, there is also provided aligning a third plate with the first plate, the third plate having a two-dimensional array of detectors arranged such that, for each segment, the first coated surface is associated with at least one first detector of the array of detectors, the second coated surface is associated with at least one second detector of the array of detectors, and the third coated surface is associated with at least one third detector of the array of detectors.

According to a further feature of an embodiment of the present invention, the plurality of coated surfaces further includes at least one fourth coated surface that is polarization-selective, and the first segment further includes exactly one fourth coated surface.

According to a further feature of an embodiment of the present invention, the at least one fourth coated surface transmits light that is polarized in the first polarization direction and reflects light that is polarized in the second polarization direction.

According to a further feature of an embodiment of the present invention, the at least one fourth coated surface transmits light that is polarized in the second polarization direction and reflects light that is polarized in the first polarization direction.

There is also provided according to the teachings of an embodiment of the present invention a method for manufacturing an optical device, the method comprising: arranging a plurality of coated surfaces in a stack having at least one segment, the at least one segment including a first segment that is repeated at least once, the plurality of coated surfaces including: at least one first coated surface that reflects or transmits at least light having wavelength in a first wavelength range, at least one second coated surface that reflects light having wavelength in a second wavelength range and transmits light having wavelength in the first wavelength range, and at least one third coated surface that reflects or transmits light having wavelength in a third wavelength range and transmits or reflects light having wavelength in the first wavelength range or the second wavelength range, the first segment includes exactly one of the at least one first coated surface, exactly one of the at least one second coated surface, and exactly one of the at least one third coated surface; slicing the stack to form a slice having at least two major external surfaces and at least one section having coated surfaces from one segment of the at least one segment between the two major external surfaces; and aligning a plate having a two-dimensional array of lenses with one of the two major external surfaces of the slice such that, for each segment, the first coated surface is associated with at least one first lens of the array, the second coated surface is associated with at least one second lens of the array, and the third coated surface is associated with at least one third lens of the array.

There is also provided according to the teachings of an embodiment of the present invention a method for manufacturing an optical device, the method comprising: obtaining a plurality of transparent plates; applying a polarization-selective coating to at least one first surface associated with the transparent plates to form at least one first coated surface; applying a first chromatic-polarization-selective coating to at least one second surface associated with the transparent plates to form at least one second coated surface; applying a second chromatic-polarization-selective coating to at least one third surface associated with the transparent plates to form at least one third coated surface; arranging the plates in a stack having at least one segment, the at least one segment including a first segment that is repeated at least once, the first segment includes exactly one of the at least one first coated surface, exactly one of the at least one second coated surface, and exactly one of the at least one third coated surface; slicing the stack to form a slice having at least first and second major external surfaces and at least one section having coated surfaces from one segment of the at least one segment between the major external surfaces; aligning a first plate with the first or second major external surface, the first plate having a two-dimensional array of lenses arranged in a first orientation associated with a first polarization direction and arranged such that, for each segment, the first coated surface is associated with at least one first lens of the array, the second coated surface is associated with at least one second lens of the array, and the third coated surface is associated with at least one third lens of the array; and aligning a second plate with the other of the two major external surfaces of the slice, the second plate having a two-dimensional array of lenses arranged in a second orientation associated with a second polarization direction and arranged such that, for each segment, the first coated surface is associated with at least one first lens of the array of the second plate, the second coated surface is associated with at least one second lens of the array of the second plate, and the third coated surface is associated with at least one third lens of the array of the second plate, the second orientation and the second polarization direction are orthogonal to the first orientation and the first polarization direction, respectively.

There is also provided according to the teachings of an embodiment of the present invention a method for manufacturing an optical device, the method comprising: arranging a plurality of coated surfaces in a stack having at least one segment, the at least one segment including a first segment that is repeated at least once, the plurality of coated surfaces including: at least one first coated surface that reflects or transmits at least light having wavelength in a first wavelength range, at least one second coated surface that reflects light having wavelength in a second wavelength range and transmits light having wavelength in the first wavelength range, and at least one third coated surface that reflects or transmits light having wavelength in a third wavelength range and transmits or reflects light having wavelength in the first wavelength range or the second wavelength range, the first segment includes exactly one of the at least one first coated surface, exactly one of the at least one second coated surface, and exactly one of the at least one third coated surface; slicing the stack to form a slice having at least two major external surfaces and at least one section having coated surfaces from one segment of the at least one segment between the two major external surfaces; and aligning a plate with one of the two major external surfaces of the slice, the plate having a two-dimensional array of detectors arranged such that, for each segment, the first coated surface is associated with at least one first detector of the array, the second coated surface is associated with at least one second detector of the array, and the third coated surface is associated with at least one third detector of the array.

There is also provided according to the teachings of an embodiment of the present invention a method for manufacturing an optical device, the method comprising: obtaining a plurality of transparent plates and at least one retardation plate; arranging a plurality of coated surfaces and the at least one retardation plate in a stack having at least one segment, the at least one segment including a first segment that is repeated at least once, the plurality of coated surfaces including: at least one first coated surface formed by applying a polarization-selective coating to at least one surface associated with the transparent plates, at least one second coated surface formed by applying a first chromatic-polarization-selective coating to at least one surface associated with the transparent plates, at least one third coated surface formed by applying a second chromatic-polarization-selective coating to at least one surface associated with the transparent plates, the first segment includes exactly one of the at least one first coated surface, exactly one of the at least one second coated surface, exactly one of the at least one third coated surface, and one or more retardation plate of the at least one retardation plate; slicing the stack to form a slice having at least two major external surfaces and at least one section having coated surfaces and at least one retardation plate from one segment of the at least one segment between the two major external surfaces.

There is also provided according to the teachings of an embodiment of the present invention a method for manufacturing an optical device, the method comprising: obtaining a plurality of transparent plates; applying a polarization-selective coating to a plurality of surfaces associated with the transparent plates to form a plurality of coated surfaces that transmit incident light to the coated surfaces that is polarized in a first polarization direction and reflect incident light to the coated surfaces that is polarized in a second polarization direction orthogonal to the first polarization direction; arranging the plates in a stack such that the coated surfaces are mutually parallel; slicing the stack to form a slice including at least a first and a second major external surface and a plurality of adjacent sections, each section including exactly two of the coated surfaces between the first and second major external surfaces; attaching a first array of retardation plates to the first or second major external surface such that, for each section, a first of the two coated surfaces of the section is associated with a respective one of the retardation plates of the first array of retardation plates; attaching a second array of retardation plates to the second or first major external surface such that, for each section, a second of the two coated surfaces of the section is associated with a respective one of the retardation plates of the second array of retardation; attaching a first array of lenses, deployed in a first orientation, to the first array of retardation plates such that, for each section, the first of the two coated surfaces of the section is associated with a respective one of the lenses of the first array of lenses; and attaching a second array of lenses, deployed in a second orientation orthogonal to the first orientation, to the second array of retardation plates such that, for each section, the second of the two coated surfaces of the section is associated with a respective one of the lenses of the second array of lenses.

There is also provided according to the teachings of an embodiment of the present invention a method for manufacturing an optical device, the method comprising: arranging a plurality of coated surfaces in a stack so as to assume a periodic formation that includes a sequence of segments, the sequence of segments including a first segment, and the periodic formation formed by repeating the first segment a set number of times, the first segment including a first coated surface and a second coated surface, each of the coated surfaces configured to transmit certain types of light and reflect other types of light; slicing the stack at an oblique angle to the coated surfaces to form a slice having at least two major external surfaces and a plurality of adjacent sections, each section having coated surfaces from one segment of the periodic formation between the two major external surfaces and oblique to the two major external surfaces; and cutting the slice at least once to form at least one substrate from each section, each substrate of the at least one substrate having at least two major surfaces and coated surfaces from a single segment of the periodic formation embedded between the two major surfaces, coatings used to produce the coated surfaces and the oblique angle are such that, for each substrate of the at least one substrate, light that is transmitted and reflected by the coated surfaces propagates as unguided light through the substrate.

According to a further feature of an embodiment of the present invention, the first coated surface is configured to transmit light having wavelength in a first wavelength range and reflect light having wavelength in a second wavelength range, and the second coated surface is configured to transmit light having wavelength in the first wavelength range and light in the second wavelength range, and reflect light having wavelength in a third wavelength range.

According to a further feature of an embodiment of the present invention, the first coated surface is configured to transmit light having polarization in a first polarization direction with regards to the first coated surface and reflect light having polarization in a second polarization direction, orthogonal to the first polarization direction, with regards to the first coated surface, and the second coated surface is configured to transmit light having polarization in the first polarization direction with regards to the second coated surface and reflect light having polarization in the second polarization direction with regards to the second coated surface.

According to a further feature of an embodiment of the present invention, both the first and second coated surfaces are configured to transmit light having wavelength in a first wavelength range and reflect light having wavelength in a second wavelength range.

The terms "color combining" and "color-combined" as used herein in the description can be used interchangeably with the terms "color mixing", "mixed color", "color multiplexing", and "wavelength mixing".

As used herein, the term "substrate" refers to any light-waves transmitting body, preferably light-waves transmitting solid bodies, which may also be referred to as "optical substrates" or "light-waves transmitting substrate".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 1 is a schematic side view of a prior art beam combiner;

FIG. 2 is a schematic side view of an optical device, constructed and operative according to an embodiment of the present invention, having a dichroic beam combiner with a substrate having three embedded reflectors for combining beams emitted by different light sources to produce a color-combined output beam;

FIG. 3 is a schematic side view of an optical device similar to the optical device of FIG. 2, but with two embedded reflectors;

FIG. 5 is a schematic side view of coated surfaces of transparent thin plates as an alternative to the step illustrated in FIG. 4B;

FIG. 6 is a schematic side view of an optical device, constructed and operative according to another embodiment of the present invention, similar to the optical device of FIG. 2, but with different one of the reflectors having different transmission and reflection characteristics from the reflector in FIG. 2, for changing a propagation direction of the color-combined output beam;

FIG. 7 is a schematic side view of an optical device, constructed and operative according to another embodiment of the present invention, similar to the optical device of FIG. 2, but with a fourth reflector, embedded in the substrate of the dichroic beam combiner, for changing a propagation direction of the color-combined output beam;

FIG. 8A is a schematic side view of coated surfaces, corresponding to the four embedded reflectors, arranged in a stack, according to a step in the process for manufacturing the dichroic beam combiner of FIG. 7;

FIG. 8B is a schematic side view of the stack of FIG. 8A with a pair of parallel cutting planes overlaid on the stack for producing a slice from the stack, according to another step in the process for manufacturing the dichroic beam combiner of FIG. 7;

FIG. 8C is a schematic isometric view of a slice produced by slicing along the pair of cutting planes of FIG. 8B, and another pair of cutting planes for producing sections from the slice, according to another step in the process for manufacturing the dichroic beam combiner of FIG. 7;

FIG. 8D is a schematic isometric view of a section produced by cutting along the pair of cutting planes of FIG. 8C, and another pair of cutting planes for producing substrates from the sections, according to another step in the process for manufacturing the dichroic beam combiner of FIG. 7;

FIG. 9A is a schematic isometric view of the substrate of the dichroic beam combiner of FIG. 2, showing a diagonal cutting plane along which the substrate can be cut to alter a propagation direction of the color-combined output beam;

FIG. 9B is a schematic isometric view of the substrate of FIG. 2 having a diagonal planar surface resultant from cutting along the diagonal cutting plane of FIG. 9A;

FIG. 9C is a schematic isometric view of the substrate of FIG. 9B, showing the propagation of light beams, from respective light sources, through the substrate;

FIG. 10A is a schematic isometric view of the substrate of the dichroic beam combiner of FIG. 2 placed next to a cuboid having a reflector deployed at an oblique plane relative to major surfaces of the cuboid to alter a propagation direction of the color-combined output beam;

FIG. 10B is a schematic isometric view of the substrate and the cuboid of FIG. 10A optically attached to each other according to a first attachment configuration;

FIG. 10C is a schematic isometric view of the attached substrate and cuboid of FIG. 10B, showing the propagation of light beams, from respective light sources, through the substrate and the cuboid;

FIG. 10D is a schematic isometric view of the substrate and the cuboid of FIG. 10A optically attached to each other according to a second attachment configuration;

FIG. 10E is a schematic isometric view of the attached substrate and cuboid of FIG. 10D, showing the propagation of light beams, from respective light sources, through the substrate and the cuboid;

FIG. 11A is a schematic isometric view of the substrate of the dichroic beam combiner of FIG. 7 placed next to a cuboid having a reflector deployed at an oblique plane relative to major surfaces of the cuboid to alter a propagation direction of the color-combined output beam;

FIG. 11B is a schematic isometric view of the substrate and the cuboid of FIG. 11A optically attached to each other according to an attachment configuration;

FIG. 11C is a schematic isometric view of the attached substrate and cuboid of FIG. 11B, showing the propagation of light beams, from respective light sources, through the substrate and the cuboid;

FIG. 12A is a schematic side view of an arrangement of uncoated transparent plates and coated transparent plates, according to a step in the process for manufacturing the cuboid of FIGS. 10A-11C;

FIG. 12B is a schematic side view of the uncoated transparent plates and coated transparent plates of FIG. 12A arranged in a stack, according to another step in the process for manufacturing the cuboid of FIGS. 10A-11C;

FIG. 12C is a schematic side view of the stack of FIG. 12B with a first pair of parallel cutting planes, and additional pairs of cutting planes perpendicular to the first pair of cutting planes, overlaid on the stack for producing the cuboid of FIGS. 10A-11C;

FIG. 13 is a schematic side view of the optical device of FIG. 7, modified to include collimating optics and power optics associated with the reflectors;

FIG. 14A is a schematic isometric view of plates respectively having the collimating optics and the power optics to be attached to the slice of FIG. 8C, according to a step in the process for manufacturing the optical device of FIG. 13;

FIG. 14C is a schematic plan view corresponding to FIG. 14A, taken from below the plate having the power optics, after alignment with another major surface of the slice;

FIG. 17 is a schematic side view of the optical device of FIG. 7, modified to include collimating optics and detector arrangements attached to the substrate of the dichroic beam combiner, according to another embodiment of the present invention;

FIG. 18 is a schematic side view of an optical device, constructed and operative according to an embodiment of the present invention, having a dichroic beam combiner with a substrate having four embedded polarization-selective reflectors, two sets of orthogonally oriented cylindrical collimating optics, a retardation plate, and detector arrangements associated with three of the polarization-selective;

FIG. 22A is a schematic side view of an arrangement of uncoated transparent plates, coated transparent plates, and coated retardation plates, according to a step in the process for manufacturing a substrate, of an optical device similar to the optical devices of FIGS. 18 and 20, but having a retardation plate deployed between at least one pair of the polarization-selective reflectors;

FIG. 22B is a schematic side view of an arrangement of uncoated transparent plates, coated thin plates, and coated retardation plates, as an alternative to the step illustrated in FIG. 22A;

FIG. 22C is a schematic side view of the arrangement of FIG. 22A or FIG. 22B arranged in a stack, according to another step in the process for manufacturing the substrate;

FIG. 22D is a schematic side view of the stack of FIG. 22C with a pair of parallel cutting planes overlaid on the stack for producing a slice from the stack, according to another step in the process for manufacturing the substrate;

FIG. 22E is a schematic isometric view of a slice produced by slicing along the pair of cutting planes of FIG. 22D, and a pair of orthogonal cutting planes for producing the substrate;

FIG. 23 is a schematic side view of an optical device, constructed and operative according to an embodiment of the present invention, having a substrate with a pair of embedded polarization-selective beam splitter configurations, a horizontal cylindrical lens for applying optical power along a first polarization direction, a set of vertical cylindrical lenses for applying optical power along a second polarization direction, a pair of retardation plates for polarization rotation, and a set of detectors for power monitoring;

FIG. 24 is a schematic plan view corresponding to FIG. 23;

FIG. 25 is a schematic isometric view corresponding to FIG. 23, taken from behind the optical device;

FIG. 26 is a schematic isometric view corresponding to FIG. 23, taken from in front of the optical device;

FIG. 27A is a schematic side view of an arrangement of coated surfaces, corresponding to the polarization-selective beam splitter configurations of the optical device, associated with transparent plates, according to a step in the process for manufacturing the optical device of FIGS. 23-26;

FIG. 27B is a schematic side view of an arrangement of coated surfaces of transparent thin plates as an alternative to the step illustrated in FIG. 27A;

DESCRIPTION OF THE PREFERRED EMBODIMENTS

Figure 4A:
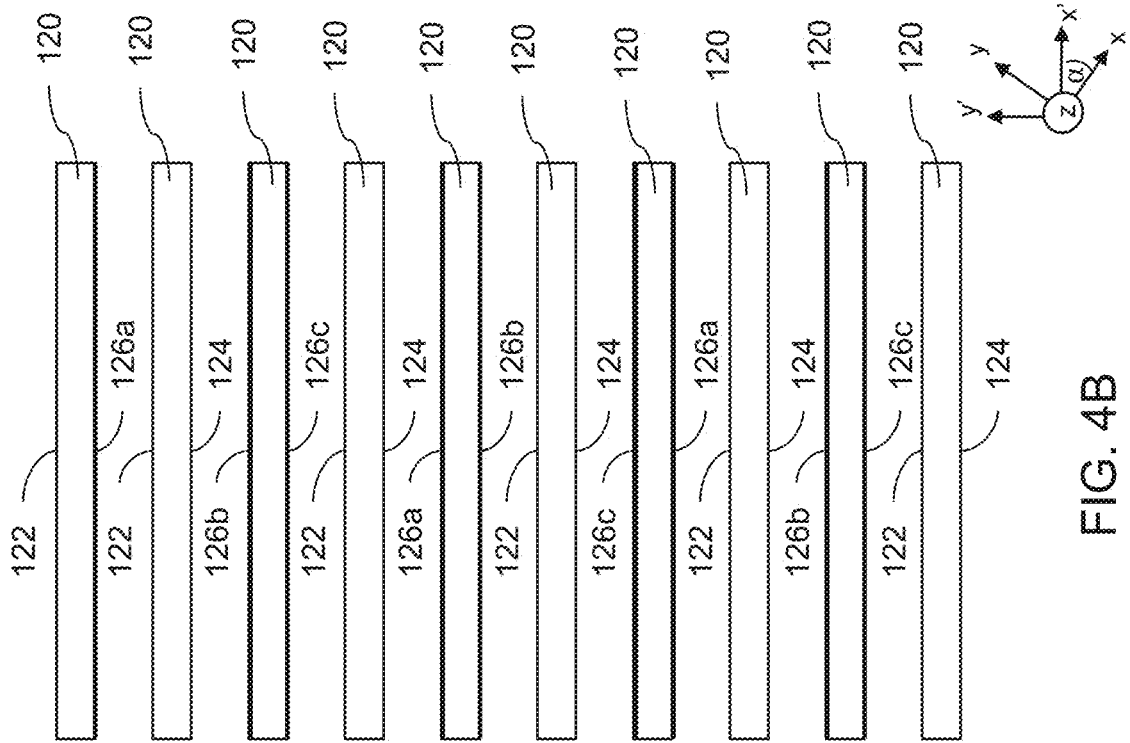
FIG. 4A is a schematic side view of a plurality of transparent plates according to one of the steps in a process for manufacturing the dichroic beam combiner of FIG. 2.

The present invention is optical devices having dichroic beam combiners, optical devices that emit light beams that can be used with dichroic beam combiners, and methods of manufacturing such optical devices.

The optical devices according to the present invention include light-transmitting material (substrates) having sets of parallel reflectors (formed by coated surfaces) embedded within the substrate. Each of the embedded parallel reflectors is configured to transmit certain types of light and reflect other types of light. In some embodiments, the discrimination between which types of light are transmitted and which types of light are reflected by a particular reflector is based on the wavelength of the light that is incident to the reflector, while in other embodiments the discrimination is based on the polarization direction of the light that is incident to the reflector, while yet in other embodiments the discrimination is based on both the polarization direction and wavelength of the light that is incident to the reflector. The types of light that are transmitted and the types of light that are reflected will become apparent for each particular embodiment. However, delineation of the transmitted and reflected types of light will be provided in certain instances.

The principles and operation of the optical devices and methods according to present invention may be better understood with reference to the drawings accompanying the description. Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, front, behind, top, bottom, and the like. These directional references are exemplary only to illustrate the invention and embodiments thereof. In addition, coordinate systems with arbitrarily labeled axes are provided with some of the figures. These coordinate systems are intended to be used as an aid for explaining the orientations of the components of the optical devices of the present disclosure.

Referring now to the drawings, FIG. 2 illustrates an optical device, generally designated 100, constructed and operative according to various aspects of the present disclosure, having color combining functionality. In general terms, the optical device 100 includes a dichroic beam combiner 102, light sources 12a, 12b and 12c (configured to generate respective light beams 14a, 14b and 14c), and collimating optics 16a, 16b and 16c associated with the respective light sources 12a, 12b and 12c. It is generally noted that although each of the collimated beams 14a, 14b and 14c is represented simplistically by a corresponding ray, each collimated beam includes a set of parallel rays that span the beam.

The dichroic beam combiner 102 includes a substrate 103, formed as parallel-faced slab, having a direction of elongation (illustrated arbitrarily herein as corresponding to the "x-axis") that defines the direction of elongation of the dichroic beam combiner 102. The substrate 103 has a pair of parallel major external planar surfaces (faces) 106, 108 which form a rectangular cross-section (in the xy-plane). The substrate 103 further includes a pair of parallel external planar surfaces 109, 110, where the surface 110 acts as the output (or light-waves exit) surface of the dichroic beam combiner 102, and where the distance between the surfaces 109, 110 is typically an order of magnitude greater than the distance between the surfaces 106, 108. Mutually parallel selectively reflective surfaces (referred to hereinafter as "reflectors") 104a, 104b and 104c are embedded within the substrate 103 between the major surface 106, 108 at an oblique angle (i.e., neither parallel nor perpendicular) α to the direction of elongation (and by equivalence at the same oblique angle α to the surfaces 106, 108).

The reflectors 104a, 104b and 104c are preferably non-overlapping along the direction of elongation. In other words, the projections of the reflectors 104a, 104b and 104c in the plane of the surface 106 are non-overlapping.

The reflectors 104a, 104b and 104c are associated with respective light sources 12a, 12b and 12c, which in certain preferred implementations are implemented as laser light sources (e.g., laser diodes), light-emitting diodes (LEDs) or superluminescent diodes (SLEDs). Similar to as described with reference to FIG. 1, the light source 12a is configured to emit light having wavelength in a first wavelength range, the light source 12b is configured to emit light having wavelength in a second wavelength range, and the light source 12c is configured to emit light having wavelength in a third wavelength range. The light sources 12a, 12b and 12c are associated with the surface 106, which serves as the light-waves entrance surface for the beams 14a, 14b and 14c.

The reflector 104a may be implemented in various ways. In one non-limiting implementation, the reflector 104a is a reflective surface (e.g., a simple mirror) that is configured to reflect different wavelengths of light, including at least light of the first wavelength range. In another non-limiting implementation, the reflector 104a is as chromatically selective reflector having dichroic (chromatically selective) properties so as to reflect only light having wavelength in the first wavelength range and transmit light having wavelength in other wavelength ranges. The reflector 104b is a chromatically selective reflector having dichroic properties so as to reflect light having wavelength in the second wavelength range and to transmit light having wavelength in the first wavelength range. The reflector 104c is a chromatically selective reflector having dichroic properties so as to reflect light having wavelength in the third wavelength range and to transmit light having wavelength in the first wavelength range or the second wavelength range. Here, the types of light reflected by the reflector 104a is light that has wavelength in the first wavelength range. The types of light transmitted by the reflector 104b is light that has wavelength in the first wavelength range, and the types of light reflected by the reflector 104b is light that has wavelength in the second wavelength range. The types of light transmitted by the reflector 104c is light that has wavelength in the first or second wavelength range, and the types of light reflected by the reflector 104c is light that has wavelength in the third wavelength range. In a particular preferred but non-limiting implementation, the above-mentioned wavelength ranges are wavelength ranges in the electromagnetic spectrum which correspond to different colors of visible light color. In particular, the first wavelength range corresponds to a first visible color centered at a first wavelength (e.g., red light centered at approximately 638 nanometers (nm)), the second wavelength range corresponds to a second visible color centered at a second wavelength (e.g., green light centered at approximately 532 nm), and the third wavelength range corresponds to a third visible color centered at a third wavelength (e.g., blue light centered at approximately 456 nm). Therefore, in many instances, the terms "wavelength range" and "color" are used interchangeably, and, without loss of generality, the embodiments of the present disclosure are described within the context of visible colored light, whereby the light sources 12a, 12b and 12c emit light of different respective colors, and the reflectors are configured to reflect/transmit light of certain colors to effectuate color-combining. However, as should be apparent to those of skill in the art, the embodiments of the present disclosure may be applicable to wavelength ranges outside of the visible spectrum, and/or instances in which two (or more) light sources emit light within the same wavelength region corresponding to the same "color", and the reflectors are configured to transmit/reflect light according to wavelength ranges within the wavelength region. For example, all three light sources may be configured to emit light that is within the "red" region of the electromagnetic spectrum, where the light source 12a emits light at wavelengths in a first range of 450 nm-460 nm, the light source 12b emits light at wavelengths in a second range of 460 nm-470 nm, and the light source 12c emits light at wavelengths in a third range of 470 nm-480 nm. Accordingly, the reflector 104b may be configured to transmit light at wavelengths in the range of 450 nm-460 nm and reflect light at wavelengths in the range of 460 nm-470 nm, and the reflector 104c may be configured to transmit light at wavelengths in the range of 450 nm-470 nm and reflect light at wavelengths in the range of 470 nm-480 nm. This concept may be extrapolated to the non-visible region of the electromagnetic spectrum as well, including the infrared (IR) and near infrared (NIR) regions. Bearing the above in mind, the optical device 100 generates a color-combined output beam 112 in generally the same way as the optical device 10 of FIG. 1. The light source 12a emits a beam (schematically represented as light ray 14a) of a first color that enters the substrate 103 through the surface 106, is reflected by the reflector 104a, transmitted by the reflector 104b, and transmitted by the reflector 104c. The light source 12b emits a beam (schematically represented as light ray 14b) of a second color that enters the substrate 103 through the surface 106, is reflected by the reflector 104b (mixing with the beam 14a), and transmitted by the reflector 104c. The light source 12c emits a beam (schematically represented as light ray 14c) of the a color that enters the substrate 103 through the surface 106, is reflected by the reflector 104c, whereupon the reflected beam 14c combines with the beams 14a and 14b and exits the substrate 103 through the output surface 110 as the color-combined output beam 112. In the particular configuration of the dichroic beam combiner 102 shown in FIG. 2, the beams 14a, 14b and 14c illuminate the respective reflectors 104a, 104b and 104c by propagating toward the surface 106 along a common direction of propagation (projection direction), which is generally perpendicular to the direction of elongation of the substrate 103. The output beam 112 exits the substrate 103 and propagates along the direction of elongation (i.e., perpendicular to the projection direction).

The following paragraphs describe steps for manufacturing the dichroic beam combiner 102. Reference is made to FIGS. 4A-4F, which show various steps in the manufacturing process. Referring first to FIG. 4A, the first step in the manufacturing process is illustrated, in which a plurality of transparent plates 120 are obtained. Each transparent plate 120 has two parallel major surfaces 122, 124. In general, all of the transparent plates 120 preferably have identical length (illustrated arbitrarily herein as being measured along the "x'-axis" which is rotationally offset from the x-axis by α, and corresponding to the length of the major surfaces 122, 124), and identical width (measured along the axis perpendicular to the plane of the paper). In certain embodiments, all of the transparent plates 120 have identical thickness (illustrated arbitrarily herein as being measured along the "y'-axis", and corresponding to the distance between the major surfaces 122, 124), while in other embodiments a majority of the transparent plates 120 have a first thickness, and the remaining (a minority set) of the transparent plates 120 have a second thickness greater than the first thickness (i.e., the transparent plates 120 in the minority set are thicker than the transparent plates 120 in the majority set).

In the next step, coatings are applied to various surfaces associated with the transparent plates 120 to generate a plurality of coated surfaces. In general, a first coating is applied to a first set of surfaces associated with the transparent plates 120 to form a plurality of coated surfaces 126a. The first coating may be a reflective coating that is reflective for at least light of the first color, or may be a dichroic coating that is reflective for only light of the first color. A second coating is applied to a second set of surfaces associated with the transparent plates 120 to form a plurality of coated surfaces 126b. The second coating is preferably a dichroic coating that is reflective for light of the second color and transmissive for light of the first color. A third coating is applied to a third set of surfaces associated with the transparent plates 120 to form a plurality of coated surfaces 126c. The third coating is preferably a dichroic coating that is reflective for light of the third color and is transmissive for light of the first color and for light of the second color. The three coatings are applied to the respective sets of surfaces, and the coated surfaces (which may include the coated transparent plates 120) are arranged, so as to create a periodic formation composed of a sequence of identical and non-overlapping segments, where each segment contains exactly one coated surface 126a, exactly one coated surface 126b, and exactly one coated surface 126c. The coated surfaces 126a, 126b and 126c ultimately form the respective reflectors 104a, 104b and 104c. The segments are non-overlapping in the sense that each coated surface belongs to one (and only one) segment. The periodic formation is formed by repeating a first segment (of the sequence of segments) a set number of times. This set number of times (also referred to as a "repetition factor") can, in principle, be any positive integer, which includes the lower boundary case of a repetition factor of 1, which yields a sequence of segments that is composed of a single segment. The embodiments of the present disclosure are preferably implemented with a repetition factor anywhere between 2 and 30 (inclusive), and is most typically implemented with a repetition factor of at least 4, and in some particularly preferred cases a repetition factor in the range of 5-10 (inclusive).

Figure 4B:
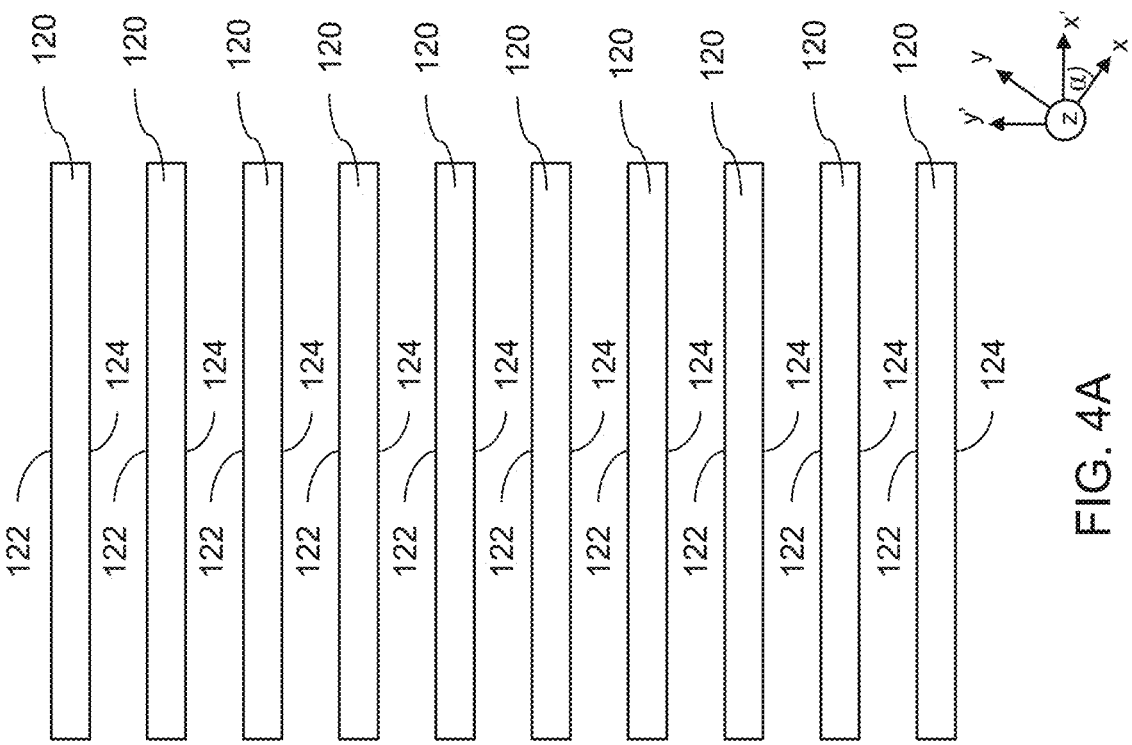
FIG. 4B is a schematic side view of coated surfaces, corresponding to the three reflectors, associated with the transparent plates of FIG. 4A, according to another step in the process for manufacturing the dichroic beam combiner of FIG. 2.

The step of applying the coatings to the surfaces can be performed in various ways. FIG. 4B illustrates one non-limiting example, in which, for every other one of the transparent plates 120 (defining a subset of the transparent plates 120), each major surface 122, 124 of the transparent plates 120 is coated with a coating (selected from the three coatings). In other words, coatings are applied directly to the both of the major surfaces of every other one of the transparent plates 120. The surfaces 122, 124 of the remaining transparent plates 120 (not in the subset) are uncoated. Here, the surfaces associated with the transparent plates 120 are in fact major surfaces (122, 124) of some of the transparent plates 120. Note that since there are three coatings, there may be cases where one of the transparent plates 120 is coated only on one of its major surfaces in order to ensure that all segments have exactly three coated surfaces. Such is the case illustrated in FIG. 4B. When employing this "double-sided" coating method, an even number of segments can be achieved without needing to coat only one surface of one of the transparent plates 120. In general, in order to achieve 2k segments (where k is any positive integer), 6k+1 of the transparent plates 120 are needed.

FIG. 5 illustrates another non-limiting example, in which a plurality of thin transparent plates 121 are arranged alternately between the transparent plates 120. The thin transparent plates 121 are referred to as "thin plates", and have a thickness that is typically an order of magnitude smaller than the thickness of the transparent plates 120. Each thin plate 121 is coated (on its major surfaces, not shown) with a coating selected from the three coatings. The coated thin plates 121 and the transparent plates 120 are arranged to create the periodic formation by stacking the transparent plates 120 and the coated thin plates 121 in alternating order. Here, the surfaces associated with the transparent plates 120 are the coated surfaces of the thin plates 121.

In another non-limiting example (not shown), the coatings are applied to the same side (for example the surface 122 or the surface 124) of all of the transparent plates 120 (except for one of the transparent plates 120 which is uncoated). Here, similar to as in FIG. 4B, the surfaces associated with the transparent plates 120 are in fact major surfaces (122, 124) of some of the transparent plates 120. It is noted that in certain cases coating a single side of each of the transparent plates 120 has been found to impose stress on the transparent plates during the coating process, which can cause the plates to warp, leading to undesired curvature of the plates and a degradation of the efficacy of the color-combining functionality. In contrast, the "double-sided" coating method (illustrated in FIG. 4B) has been found to reduce coating stress on the transparent plates during the coating process, thereby reducing the likelihood of warping.

Figure 4C:
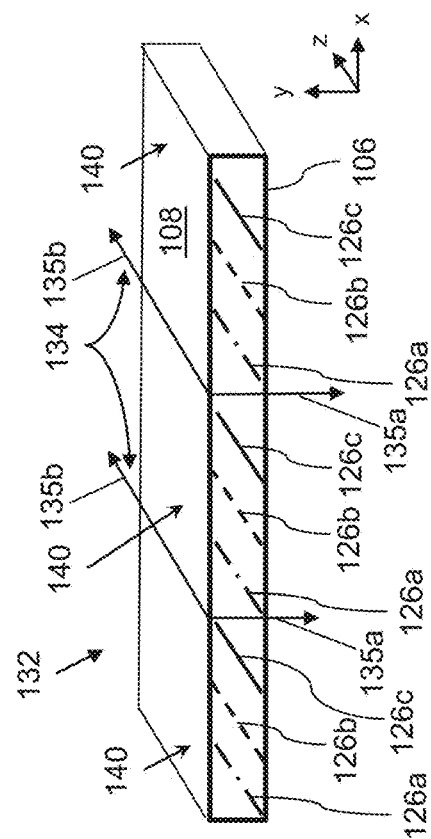
FIG. 4C is a schematic side view of the coated surfaces arranged in a stack, according to another step in the process for manufacturing the dichroic beam combiner of FIG. 2.

It is generally noted that the plates 120 and 121 are both transparent substrates formed from light-transmitting materials, such as glass (e.g., BK-7), that is transparent to light waves having wavelengths in any of the three wavelength ranges. It is further noted that each applied coating may itself include multiple layers of coatings. A common approach for providing such (dichroic) coatings is to build up alternating layers of optical coatings with different refractive indices on a substrate (such as the transparent plates 120 or the thin plates 121) to achieve the desired reflective and transmissive characteristics of the coated surfaces 126a, 126b and 126c. After the coatings are applied to the relevant surfaces to form the coated surfaces 126a, 126b and 126c, the coated surfaces 126a, 126b and 126c are arranged (by appropriately stacking the coated transparent plates 120 or the transparent plates 120 with the coated thin plates 121), so as to create a periodic formation composed of a sequence of segments having at least one segment, and more preferably a plurality of identical segments. FIG. 4C shows the desired arrangement of the coated surfaces 126a, 126b and 126c, in which the transparent plates 120 (or the transparent plates 120 with the coated thin plates 121) are arranged in a stack 130 such that all of the coated surfaces 126a, 126b and 126c are mutually parallel, and that each segment is composed of exactly one coated surface 126a, exactly one coated surface 126b, and exactly one coated surface 126c. Although not illustrated in the drawings, the stack may be a staggered stack.

The coated surfaces of the stack 130 assume a periodic formation, in which each segment of the periodic formation is identical and includes the same number of coatings in the same order. The order of the coatings within the segment should correspond to the required order of reflectors of the dichroic beam combiner to achieve color-combining. In FIG. 4C, the dashed rectangle designates the first segment 129 in the sequence of segments. The first segment 129 includes a total of three coated surfaces (126a, 126b and 126c), which is repeated three times to form a sequence of three segments. Starting from the bottom of the stack 130, each segment is composed of exactly one coated surface 126c, exactly one coated surface 126b, and exactly one coated surface 126a. The surfaces of the transparent plates 120 that correspond to the coated surfaces for the first segment 129 are as follows: the surface 124 of the transparent plate 120 second from the bottom in FIG. 4A is coated to form the coated surface 126c, the surface 122 of the transparent plate 120 second from the bottom in FIG. 4A is coated to form the coated surface 126b, and the surface 124 of the transparent plate 120 fourth from the bottom in FIG. 4A is coated to form the coated surface 126a. In FIG. 4C, two additional segments are shown, resulting in a total of nine coated surfaces (three coated surface 126a, three coated surfaces 126b, and three coated surfaces 126c), which, starting from the bottom of the stack 130, have the following order (with square brackets indicating a segment): [coated surface 126c, coated surface 126b, coated surface 126a], [coated surface 126c, coated surface 126b, coated surface 126a], [coated surface 126c, coated surface 126b, and coated surface 126a].

The plates of the stack 130 are attached (i.e., glued) together, for example by way of applying optical cement between adjacent surfaces of the stack 130. It is noted that obtaining a high-degree of parallelism between the reflectors 104a, 104b and 104c is of critical importance in order to attain efficient beam combining by the reflectors 104a, 104b and 104c. This high-degree of parallelism can be obtained by ensuring a corresponding high-degree of parallelism between the coated surfaces 126a, 126b and 126c prior to attachment of the plates of the stack 130. Parallelism between the coated surfaces 126a, 126b and 126c can be obtained by using various metrological techniques.

Figure 4D:
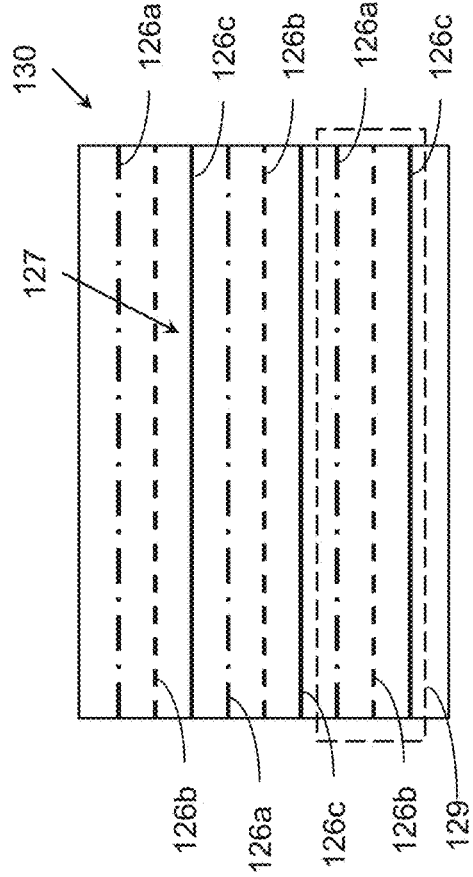
FIG. 4D is a schematic side view of the stack of FIG. 4C with a pair of parallel cutting planes overlaid on the stack for producing a slice from the stack, according to another step in the process for manufacturing the dichroic beam combiner of FIG. 2.

In the next step, as shown in FIG. 4D, the stack 130 is sliced (cut) along pairs of parallel planes, designated 128, to produce slices 132 (or "pieces"). Although FIG. 4D illustrates only a single pair of parallel planes 128 to produce a single slice 132 (or "piece"), the single pair of planes 128 is a representative sample of what may be multiple pairs of parallel planes that can be used to produce multiple such slices 132 from the stack 130. The planes 128 are diagonal to the major surfaces of all of the transparent plates 120 of the stack 130 such that the planes 128 intersect all of the planar coated surfaces 126a, 126b and 126c at a common oblique angle β (where β=180−α).

Parenthetically, in many instances the reflectance and transmittance provided by dichroic coatings is a function of both the wavelength of the incident light and the angle of incident (AOI) of the incoming light. For example, the dichroic coating which forms the coated surfaces 126b may exhibit peak reflectance of light of the second color and peak transmittance of light of the first color at a first particular range of AOI's. Similarly, the dichroic coating which forms the coated surfaces 126c may exhibit peak reflectance of light of the third color and peak transmittance of light of the first and second color at a second particular range of AOI's. It is therefore desirable to slice the stack 130 such that the common oblique angle corresponds to the angles of incidence that are within these two ranges of angles of incidence. Since the beams 14a, 14b and 14c are collimated prior to entering the substrate 103, the beams enter the substrate 103 approximately normal to the surface 106, and therefore at an AOI of a (measured relative to the normal to the reflectors 104a, 104b and 104c. Therefore, since the cutting angle β and the AOI are supplementary angles, the cutting angle β can be selected such that the AOI falls within the ranges at which the dichroic coatings provide the peak desired reflectance and transmittance. Returning to FIG. 4D, the end portions of the slice 132 can be cut at 90-degrees relative to the planes 128 such that the slice 132 forms a generally rectangular slab. It is noted that the stack 130 is sliced along the planes 128 at an unbiased angle (i.e., orthogonal) to the front planar surface 127 (which is orthogonal to the major surfaces 122, 124) of the stack 130. It is further noted that the spacing between adjacent planes 128 determines the length of the reflectors 104*a*, 104*b* and 104*c* (and the size of the active area of the reflectors 104*a*, 104*b* and 104*c*, whereby the spacing and the length are one in the same.

Figure 4E:
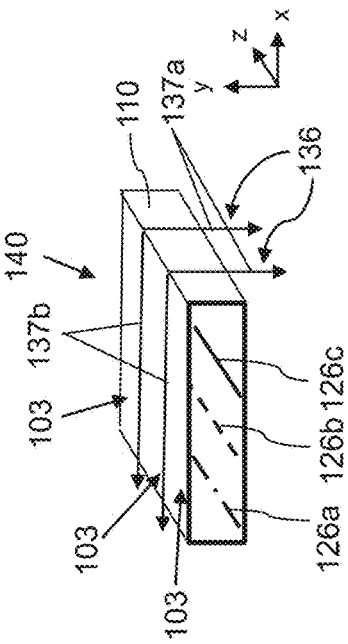
FIG. 4E is a schematic isometric view of a slice produced by slicing along the pair of cutting planes of FIG. 4D, and another pair of cutting planes for producing sections from the slice, according to another step in the process for manufacturing the dichroic beam combiner of FIG. 2.

FIG. 4E shows the slice 132, which has periodic coated surfaces 126*a*, 126*b* and 126*c* (corresponding to multiple segments) embedded between major external surfaces 106, 108. The coated surfaces 126*a*, 126*b* and 126*c* are oblique to the major surfaces 106, 108 due to the diagonal cutting of the stack 130. The major surface 106 (which serves as the light-waves entrance surface for the final dichroic beam combiner 102 product) is preferably polished to increase optical quality. The transparent plates 120 are preferably thick enough such that the coated surfaces 126*a*, 126*b* and 126*c* do not overlap with each other (i.e., the projections of the coated surfaces 126*a*, 126*b* and 126*c* in the plane of the surface 106 are non-overlapping). Optionally, a retardation plate, preferably a half-wave plate, may be attached to the surface 106 to effectuate polarization rotation of the light that is incoming to the reflectors 104*a*, 104*b* and 104*c*. In such a configuration the beams 14*a*, 14*b* and 14*c* emitted by the respective light sources 12*a*, 12*b* and 12*c* are polarized in a first polarization direction (for example p-polarized) with regards to the reflective surface of the reflectors 104*a*, 104*b* and 104*c*. The polarized beams pass through the retardation plate prior to entering the substrate 103 (through the surface 106), which rotates the polarization to a second polarization direction (orthogonal to the first polarization direction, e.g., s-polarized). In such embodiments, the light sources 12*a*, 12*b* and 12*c* may themselves be polarized light sources, or may be combinations of unpolarized sources of light with linear polarizers.

In the next step, as shown in FIG. 4E, the slice 132 is cut (sliced) along at least one plane (preferably a set of parallel planes), designated 134, to separate the slice 132 into multiple adjacent sections 140. The plane(s) 134 is/are orthogonal to the major surfaces 106, 108 and orthogonal to the front planar surface formed from the surface 127 during formation of the section 140. In the arbitrarily labeled coordinate system in FIG. 4E, the plane(s) 134 is/are in the yz-plane, and is/are defined by the pair orthogonal lines, designated 135*a*, 135*b*, which extend along the y-axis and z-axis, respectively. Each section 140 contains the coated surfaces corresponding to exactly one segment of the periodic formation. In other words, each section 140 (also referred to as a "sub-slice") has exactly one coated surface 126*a*, exactly one coated surface 126*b*, and exactly one coated surface 126*c*. As should be clear, the order of the coated surfaces does not change from section to section (i.e., the order of the coated surfaces is the same in each section). The cuts are made in region between adjacent segments, so as to effectively separate the slice 132 into sections that contain exactly one segment. It is noted that a transparent plate 120 that is associated with coated surfaces from two adjacent segments may have slightly greater thickness than the other transparent plates 120, so as to provide a larger spacing between the coated surfaces of adjacent segments (for example, in FIGS. 4C-4E, to provide greater spacing between the coated surfaces 126*a* and 126*c*).

The cut(s), along the plane(s) 134, is/are also preferably not made at a bias. The cutting along plane(s) 134 forms a rectangular surface 110 (perpendicular to the major surfaces 106, 108) on each section 140. The surface 110, which is ultimately the output surface of the dichroic beam combiner 102, is preferably polished to increase optical quality.

It is noted that in situations in which the stack 130 includes only a single segment, the slice 132 will necessarily include only a single section 140, and therefore no cuts along the plane 134 are required.

In the next step, each section 140 is sliced (cut) along at least one plane (preferably a set of parallel planes), designated 136, to separate the section 140 into multiple substrates 103. The plane(s) 136 is/are orthogonal to the major surfaces 106, 108 and orthogonal to the plane(s) 134. In the arbitrarily labeled coordinate system in FIG. 4F, the plane(s) 136 is/are in the xy-plane, and is/are defined by the pair orthogonal lines, designated 137*a*, 175*b*, which extend along the x-axis and y-axis, respectively. Each substrate 103 includes a single set of reflectors 104*a*, 104*b* and 104*c* (formed from the respective coated surfaces 126*a*, 126*b* and 126*c*) embedded within the substrate at an oblique angle to the major surfaces 106, 108 and the direction of elongation of the substrate 103.

It is noted that the thickness of the transparent plates 120 is selected such that the spacing between adjacent reflectors of the dichroic beam combiner 102 is on the order of approximately one millimeter (mm) such that the total length of the substrate 103 is in the range of 2-6 mm. It also preferable that the reflectors 104*a*, 104*b* and 104*c* are evenly spaced (i.e., the spacing between the reflectors 104*a* and 104*b* is the same (or roughly the same) as the spacing between the reflectors 104*b* and 104*c*).

The method of manufacturing the dichroic beam combiners, as described with reference to FIGS. 4A-4F, is particularly suitable to situations in which mass production of beam combiners is desired, enabling production of anywhere from a few tens to a few hundreds of dichroic beam combiners from a single stack 130. For example, the stack 130 may be dimensioned and sized such that approximately 10 slices 132 can be produced from the stack 132 (by cutting along planes 128), and such that the periodic formation of each slice 132 includes approximately 4 segments so as to produce 4 sections 140 (each having a single segment) from each slice 132 (by cutting along the planes 134), and such that each section 140 can be further cut (along the planes 136) to form approximately 7 beam combiners. Accordingly, in this example, the stack 132 can produce 10*4*7=280 dichroic beam combiners. However, as should be apparent, the dimensions of the stack, in particular the width of the transparent plates (measured along the axis perpendicular to the plane of the paper), can be increased to enable additional cuts along planes 136 to produce up to 20 dichroic beam combiners from a single section 140 (resulting in a single stack producing 10*4*20=800 dichroic beam combiners).

It is critical to note that for all of the optical devices of the present disclosure, the light beams (e.g., beams 14*a*, 14*b* and 14*c*) that enter the substrate and which are reflected/transmitted by the reflectors embedded within the substrate, propagate within the substrate as unguided light beams. The term "unguided", as used within the context of the present disclosure, generally refers to light that is not guided. Light that is unguided traverses a light transmitting material (e.g., the substrate) without being trapped within the light transmitting material, i.e., without being trapped by (total) internal reflection between external major surfaces of the light transmitting material, and more preferably without undergoing any reflections from the external major surfaces of the light transmitting material. The unguided propagation of the light beams 14a, 14b and 14c through the substrate is effectuated by the coating designs used to form coated surfaces (which ultimately form reflectors) and the oblique angle β of the cutting planes 128 relative to the coated surfaces (which determines the oblique angle α at which the reflectors are deployed).

Although the dichroic beam combiner 102 illustrated in FIG. 2 utilizes three light sources 12a, 12b and 12c which emit respective beams 14a, 14b and 14c along a common projection direction so as to enter the substrate 103 via the surface 106, other configurations are possible in which the beam 14a from the light source 12a has a different projection direction from the beams 14b and 14c, and enters the substrate 103 via the surface 109 instead of the surface 106. In such a design, the light source 12a and the collimating optics 16a are associated with the surface 109, and the first coating is designed to be transmissive for at least light of the first color (preferably designed as a dichroic coating that is transmissive for light of the first color, and reflective to light of other colors). In order to manufacture a dichroic beam combiner according to such a configuration, the surface 109 (created after cutting along the plane(s) 134, as shown in FIG. 4E) is preferably polished (together with the surface 110) prior to slicing along the plane(s) 136.

Alternatively, beam combining functionality may be effectuated without using the reflector 104a. Such a configuration is illustrated in FIG. 3, in which the light source 12a and collimating optics 16a are associated with the surface 109 (which is now a light-waves entrance surface). The dichroic beam combiner of FIG. 3 may be manufactured similarly to the dichroic beam combiner 102 with the main difference being that the segment that contains exactly one full cycle of the periodic formation is limited to exactly one coated surface 126b and exactly one coated surface 126c. In addition, the surface 109 is polished at the section 140 level in order to improve optical quality of the light-waves entrance surface 109. Although this polishing step may be more difficult to perform as compared with polishing the surfaces 106, 108 due to the smaller surface area, the dichroic beam combiner of FIG. 3 may provide advantages over the dichroic beam combiner 102, notably the reduction in length along the direction of elongation, resulting a reduced form factor of the optical device.

Referring again to FIG. 2, the output beam 112, generated in response to illumination of the reflectors 104a, 104b and 104c by the respective light sources 12a, 12b and 12c, propagates in a propagation direction that is parallel to the direction of elongation of the substrate 103, and perpendicular to the projection direction of the collimated beams 14a, 14b and 14c. In certain cases, for example when the dichroic beam combiner is used to illuminate a spatial light modulator (e.g., LCoS) in order to project an image to be viewed via an optical substrate that is as part of an HMD or NED, it may be advantageous to provide different options for the propagation direction of the output beam.

One configuration option that provides a different propagation direction of the output beam is illustrated in FIG. 6, and relies on modifying the coating design used to produce the reflector 104c such that the reflector 104c transmits light of the third color and reflects light of the first color and light of the second color. In such a configuration, the beams 14a and 14b, transmitted and reflected by the reflector 104b, respectively, impinge on the reflector 104c which reflects the beams 14a, 14b and transmits the beam 14c so as to produce a color-combined beam 112. The beam 112 exits the substrate 103 through the surface 108 and propagates along the projection direction and perpendicular to the direction of elongation. In such a configuration, the major surface 108 (which serves as the light-waves exit surface) of the slice 132 is polished to increase optical quality. Most preferably, the surfaces 106, 108 are simultaneously polished at the slice level 132 using a technique referred to as "double-side polishing". In addition, since the surface 110 does not function as the light-waves exit surface, the surface 110 does not require polishing. Typically, double-side polishing the major surfaces 106, 108 is a simpler polishing procedure than polishing the side surface 110 (and the side surface 109) due in part to the larger surface area of the surfaces 106, 108. Therefore, the configuration in which the reflector 104c transmits light of the third color and reflects light of the first color and light of the second color may provide advantages in the manufacturing process over the configuration in which the reflector 104c reflects light of the third color and transmits light of the first color and light of the second color.

Other configuration options that provides different propagation directions of the output beam rely on the use of additional reflectors, embedded within the substrate 103 and/or embedded in separate optical structures from the substrate 103. The following paragraphs describe optical devices according to various such configuration options.

With continued reference to FIG. 2, refer also to FIG. 7, which shows an optical device 100A, generally similar to the optical device 100 of FIG. 2, with equivalent elements labeled similarly. The optical device 100A includes a dichroic beam combiner 102A that includes a substrate 103A. The substrate 103A includes the parallel to the reflectors 104a, 104b and 104c, and additionally includes a fourth reflective surface (reflector) 104d, parallel to the reflectors 104a, 104b and 104c, and positioned after the reflector 104c, which functions to alter the direction of the output beam. Here, the color-combined beam from the reflector 104c impinges on the reflector 104d which redirects the beam 112 perpendicular to the direction of elongation so as to propagate along the projection direction and exit the substrate 103 via the major surface 108.

The process for manufacturing the dichroic beam combiner 102A is generally similar to the process for manufacturing the dichroic beam combiner 102, with additional steps for producing the fourth reflector 104d. In addition to applying the three coatings to form the pluralities of coated surfaces 126a, 126b and 126c, a fourth coating is applied to a fourth set of surfaces associated with the transparent plates 120 to form a plurality of coated surfaces 126d. The fourth coating is reflective for light of all three colors, such that when light of any of the three colors impinges on any one of the coated surfaces 126d, the light is reflected by the coated surface 126d.

The coatings can be applied to the surfaces so as to form the coated surfaces 126a, 126b, 126c and 126d in a similar fashion as described above, for example with reference to FIG. 4B and FIG. 5. The coated surfaces 126a, 126b, 126c and 126d are arranged in a stack 130A, as shown in FIG. 8A. The plates of the stack 130A are attached (i.e., glued) together, for example by way of applying optical cement between adjacent surfaces of the stack 130A.

Similar to as in FIG. 4C, each segment contains exactly one full cycle of the periodic formation. However, in FIG. 8A, the full cycle further includes the coated surface 126d such that the full cycle is composed of exactly one coated surface 126a, exactly one coated surface 126b, exactly one coated surface 126c, and exactly one coated surface 126d. The coated surfaces 126a, 126b, 126c and 126d ultimately form the respective reflectors 104a, 104b, 104c and 104d. It is noted that the transparent plates 120 associated with the fourth coating may have an increased thickness relative to the other transparent plates so as to affect a larger spacing between adjacent coated surfaces 126c and 126d.

After the plates of the stack 130A is glued, the stack 130A is sliced (cut) along two parallel planes, designated 128, to produce a slice 132A, as shown in FIG. 8B. The slice 132A, shown in FIG. 8C, has periodic coated surfaces 126a, 126b, 126c and 126d (corresponding to multiple segments) embedded between major surfaces 106, 108. The major surface 106 (which serves as the light-waves entrance surface for the final dichroic beam combiner 102A product) is preferably polished to increase optical quality. In addition, the major surface 108 (which serves as the light-waves exit surface for the final dichroic beam combiner 102A product) is preferably polished to increase optical quality. Most preferably, double-side polishing is applied to the slice 132A so as to polish the surfaces 106, 108. Optionally, a retardation plate, preferably a half-wave plate, may be attached to the surface 106 to effectuate polarization rotation of the light that is incoming to the reflectors 104a, 104b and 104c. In such a configuration the beams 14a, 14b and 14c emitted by the respective light sources 12a, 12b and 12c are polarized in a first polarization direction (for example p-polarized). The polarized beams pass through the retardation plate prior to entering the substrate 103A (through the surface 106), which rotates the polarization to a second polarization direction (orthogonal to the first polarization direction, e.g., s-polarized). In such embodiments, the light sources 12a, 12b and 12c may themselves be polarized light sources, or may be combinations of unpolarized sources of light with linear polarizers.

In the next step, as shown in FIG. 8C, the slice 132A is cut (sliced) along at least one plane 134, to separate the slice 132A into multiple sections 140A, where each section 140A contains the coated surfaces corresponding to exactly one segment of the periodic formation. In the next step, as shown in FIG. 8D, each section 140A is sliced (cut) along at least one plane 136, to separate the section 140A into multiple substrates 103A. Each substrate 103A includes a single set of reflectors 104a, 104b, 104c and 104d (formed from the respective coated surfaces 126a, 126b. 126c and 126d) embedded within the substrate at an oblique angle to the major surfaces 106, 108 and the direction of elongation of the substrate 103A.

Additional steps in the manufacturing processes of the dichroic beam combiners can provided in order to provide additional options for the propagation direction of the output beams. For example, the dichroic beam combiner 102 can be modified during manufacturing to provide a diagonal cut to each substrate 103 to remove the external planar surface 110. The transparent plates 120 associated with the third coated surfaces 126c may be thicker than the remaining transparent plates so as to provide additional space between the third coated surfaces 126c and the external planar surface 110.

FIG. 9A is an isometric view of a substrate of a dichroic beam combiner similar to as shown in FIG. 2, but with additional spacing between the reflector 104c and the planar surface 110. The diagonal cut is made along a plane 142 that is oblique to the external planar surfaces 109, 110, preferably being at a 45-degree angle relative to the external planar surfaces 109, 110. FIG. 9B shows the result of the cut made along the plane 142, in which a planar surface 144, oblique to the external planar surface 109, is formed as a result of the cut along the plane 142. The surface 144, which is output (light-wave exit) surface 144 of the substrate 103, is polished and coated with a reflective coating so as to be reflective to light of all three colors. FIG. 9C shows the traversal of light through the dichroic beam combiner of FIG. 9B. The incoming collimated beams 14a, 14b and 14c are reflected/transmitted by the reflectors 104a, 104b and 104c in accordance with the transmissive and reflective properties of the reflectors 104a, 104b and 104c. The color-combined beam from the reflector 104c impinges on the surface 144, which re-directs the beam 112 perpendicular to the direction of elongation so as to exit the substrate 103 via the planar external major surface 111. The surface 111 is orthogonal to the surfaces 108 and 109. As such, the surface 144 re-directs the output beam for "out-of-plane" propagation, so as to propagate in a direction that is perpendicular to the both the direction of elongation and the projection direction of the collimated beams 14a, 14b and 14c.

The cutting along plane 142 and the polishing of the surface 144 may present certain technical challenges. In order to avoid these steps, alternative methods for achieving "out-of-plane" propagation of the output beam are presented, with reference to FIGS. 10A-11C. These methods rely on attaching an additional optical structure to the dichroic beam combiner substrate in order to form a unitary dichroic beam combiner.

Referring first to FIG. 10A, there is illustrated an isometric view of the substrate 103 of FIG. 2 and a cuboid 150 having a reflective surface (reflector) 152 at a plane oblique to sets of parallel surfaces 154, 156, 158 and 160 of the cuboid 150 (for example, the plane can be at an oblique angle of γ relative to the surface 154). The reflector 152 is reflective to light of all three colors. In order to effectuate out-of-plane propagation, the cuboid 150 is attached to the substrate 103 at one of the major surfaces of the substrate 103. FIG. 10B shows attachment of the cuboid 150 to the substrate 103 at the surfaces 110 and 160, such that the reflector 152 is at a plane oblique to the surface 110. The attachment can be a mechanical attachment, but is preferably made by optically cementing the surfaces 110 and 160 to each other such that the cuboid 150 and the substrate 103 form a unitary dichroic beam combiner structure 162. Preferably, the cuboid 150 and the substrate 103 are manufactured from materials have the same refractive index so as to minimize unwanted reflection and/or refraction at the interface between the cuboid 150 and the substrate 103. The interface region between the surfaces 110 and 160 may be filled with an index matched material to reduce the need for polishing between the cuboid 150 and the substrate 103. FIG. 10C shows the traversal of light through the dichroic beam combiner 162. The propagation through the substrate 103 is similar to the beam propagation described with reference to FIG. 9C, and will not be repeated here. The color-combined beam exits the substrate 103 via the surface 110, enters the cuboid 150 via the surface 160, and impinges on the reflector 152 which reflects the beam out of the cuboid 150 through the surface 156.

FIG. 10D shows an alternative attachment location of the cuboid 150 to the substrate 103. Here, the attachment (cementing) between the cuboid 150 and the substrate 103 is made between the surfaces 108 and 160 in order to form the unitary dichroic beam combiner 162. The attachment is made such that the reflector 152 is at a plane oblique to the major surfaces 106, 108, and such that the surfaces 154 and 110 are aligned and co-planar. In this configuration, the reflector 104c is designed with a coating according to the design described with reference to FIG. 6, namely the reflector 104c transmits light of the third color and reflects light of the first color and light of the second color.

The traversal of light through the dichroic beam combiner of FIG. 10D is illustrated in FIG. 10E. As shown, the beams 14*a* and 14*b* are reflected by the reflector 104*c* and the beam 14*c* is transmitted by the reflector 104*c*. From the reflector 104*c*, the color-combined beam exits the substrate 103 via the surface 108, enters the cuboid 150 via the surface 160, and impinges on the reflector 152 which reflects the beam out of the cuboid 150 through the surface 156.

Another configuration of a dichroic beam combiner substrate attached to the cuboid 150 is illustrated with reference to FIGS. 11A-11C, in which the cuboid 150 is attached to the substrate 103A of FIG. 7. Referring first to FIG. 11A, this shows an isometric view of the cuboid 150, the substrate 103A, and the reflectors 104*a*, 104*b*, 104*c* and 104*d* embedded within the substrate 103A. FIG. 11B shows the cuboid 150 attached to the substrate 103A. The attachment between the cuboid 150 and the substrate 103A is similar to as described with reference to FIG. 11D, in which the attachment is made between the surfaces 108 and 160, in order to form a unitary dichroic beam combiner 162A. The attachment is made such that the reflector 152 is at a plane oblique to the major surfaces 106, 108, and such that the surfaces 154 and 110 are aligned and co-planar. Here too it is preferable that the cuboid 150 and the substrate 103A are manufactured from materials have the same refractive index so as to minimize unwanted reflection and/or refractions at the interface between the cuboid 150 and the substrate 103A. The interface region between the surfaces 108 and 160 may be filled with an index matched material to reduce the need for polishing between the cuboid 150 and the substrate 103A.

The traversal of light through the dichroic beam combiner 162A is illustrated in FIG. 11C. The traversal of light through the substrate 103A is similar to as described with reference to FIG. 7, and will not be repeated here. The color-combined beam, after being reflected by the reflector 104*d* and exiting the substrate 103A via the surface 108, enters the cuboid 150 via the surface 160, and impinges on the reflector 152 which reflects the beam out of the cuboid 150 through the surface 156.

The cuboid 150 with the embedded reflector 152 can be manufactured using a process similar to the process for manufacturing the dichroic beam combiners 102 and 102A. For example, as shown in FIG. 12A, a plurality of transparent plates 120 (having dimensions similar to as described with reference to FIG. 4A) can be obtained, and both sides (major surface) of every other plate can be coated with a reflective coating (similar to the reflective coating used to produce the coated surfaces 126*d*) to produce a plurality of coated surfaces 164. The coated surfaces 164 can then be arranged in a stack 166 (FIG. 12B). Alternatively, a plurality of thin plates can be coated with the reflective coating and arranged alternatingly between the transparent plates, similar to as described with reference to FIG. 5. Alternatively, the top side (major surface) of every transparent plate can be coated with the reflective coating.

With reference to FIG. 12C, the stack 166 is then cut along two parallel planes 168 at an oblique angle, preferably a 135-degree angle such that the coated surface that forms the reflector 152 is at a 45-degree angle relative to the major surfaces 154, 156, 158 and 160 of the cuboid 150 (i.e., γ is 45-degrees). A series of cuts along pairs of planes 170 perpendicular to the planes 166 are made to form the sections 151, which may be further cut along orthogonal planes to the planes 168, 170 to form the cuboids 150. The geometric parameters of cuboid 150 can be adjusted by varying the cutting angles and the spacing between the planes of a pair.

In certain preferred embodiments, the cuboid 150 is formed as a cube (i.e., the six major surfaces of the cuboid 150 are squares). In such embodiments, the spacing between the planes 168 (and the spacing between the planes in a pair of planes 170) is preferably equal to the thickness of the transparent plates 120 so as to form sections 151 having square cross-section. In such embodiments, the width of the transparent plates may be the same as the thickness of the transparent plates, such that the sections 151 form the cuboids 150 (as cubes). Alternatively, the width of the transparent plates may an integer multiple of the thickness of the transparent plates, such that each section 151 can be cut to form the integer number of cuboids 150 (as cubes). The external surfaces of each cuboid 150 can then be polished, as appropriate.

The dichroic beam combiners as described thus far have pertained to generally rectangular slab-type substrates having two major external surfaces 106, 108 and a set of reflectors 104*a*, 104*b* and 104*c* (and optionally 104*d*) embedded within the substrate between the external surfaces 106, 108 at an oblique angle to the external surfaces 106, 108. In order to increase the quality of the combined output beam, the input beams 14*a*, 14*b* and 14*c* are collimated by collimating optics 16*a*, 16*b* and 16*c*, separate from the substrate, prior to entering the substrate. In order to provide a more compact beam combiner device, it may be of particular advantage to include collimating optics embedded as part of the beam combiner device.

Referring now to FIG. 13, there is shown an optical device 100B, generally similar to the optical device 100A of FIG. 7, with equivalent elements labeled similarly. The optical device 100B includes a dichroic beam combiner 102B with embedded optics. The optics includes collimating optics 180*a*, 180*b* and 180*c* (e.g., a lens or set of lenses) that are associated with respective light sources 12*a*, 12*b* and 12*c*, and with respective reflectors 104*a*, 104*b* and 104*c*. The optics further includes power optics 182 (e.g., a lens) associated with the reflector 104*d* for applying optical power to the output beam 112.

The optics are optically attached to the major surfaces 106, 108 of the substrate 103B. Preferably, the attachment of the optics to the major surfaces 106, 108 is performed during the manufacturing process at the slice level prior to making the cut(s) along the plane(s) 134 (FIG. 8C).

Figure 14B:
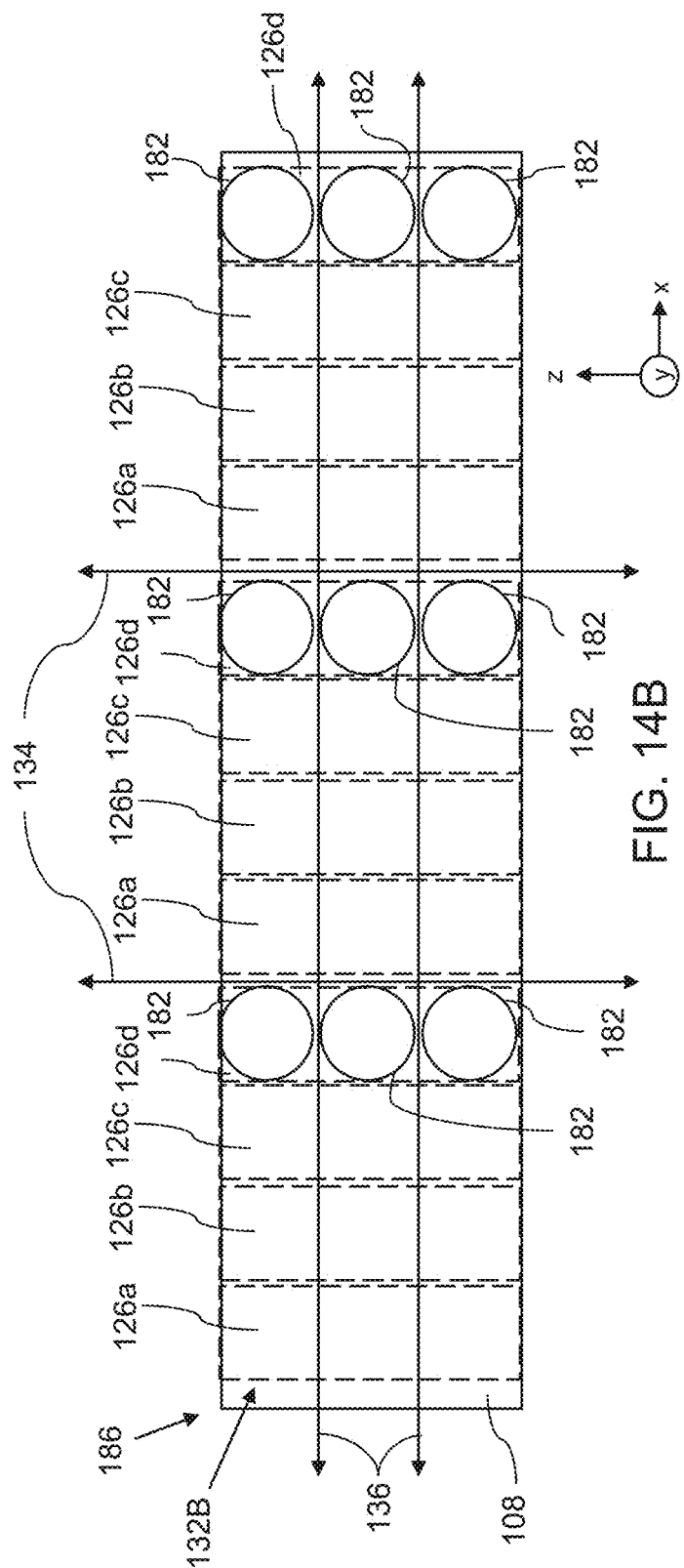
FIG. 14B is a schematic plan view corresponding to FIG. 14A, taken from above the plate having the collimating optics, after alignment with a major surface of the slice.

With reference to FIG. 8C, reference is also made to FIG. 14A, which illustrates a first step in the attachment of the optics to the major surfaces 106, 108 of the slice 132B. A transparent plate 186, of roughly the same size and dimension of the major surface 108 of the slice 132B, carries a microlens array 187 composed of lenses 182 arranged in a two-dimensional array or grid having a number of rows and columns. The plate 186 is aligned with the major surface 108 such that each respective coated surface 126*d* is associated with one or more lens 182 of a respective column of the array 187. FIG. 14B shows a plan view of the plate 186 with lenses 182 aligned and in contact with the major surface 108, taken from above the plate 186 with the coated surfaces 126*a*, 126*b*, 126*c* and 126*d* shown in phantom. Typically, the number of columns in the array is in one-to-one correspondence with the number of coated surfaces 126*d* in the slice 132B.

In the example illustrated in FIG. 14B, there are three columns corresponding to the three coated surfaces 126*d*. Furthermore, the number rows (i.e., the number of lenses associated with each coated surface 126*d*) is in one-to-one correspondence with the number of substrates to be produced after performing the cuts along the plane(s) 136. In the example illustrated in FIG. 14B, there are three rows of lenses, corresponding to three substrates formed from cuts along two planes 136. Therefore, each coated surface 126*d* is associated with three lenses 182 from the same column.

Another transparent plate 184 (of roughly the same size and dimension of the major surface 106 of the slice 132B) carries a microlens array 188 composed of lenses 180*a*, 180*b* and 180*c* arranged in a two-dimensional array or grid having a number of rows and columns. The plate 184 is aligned with the major surface 106 such that each respective coated surface 126*a* is associated with one or more lens 180*a* of a respective column of the array 188, each respective coated surface 126*b* is associated with one or more lens 180*b* of a respective column of the array 188, and each respective coated surface 126*c* is associated with one or more lens 180*c* of a respective column of the array 188. FIG. 14C shows a plan view of the plate 184 aligned and in contact with the major surface 106, taken from below the plate 184 with the coated surfaces 126*a*, 126*b*, 126*c* and 126*d* shown in phantom. The number of columns in the array is in one-to-one correspondence with the total number of coated surfaces 126*a*, 126*b* and 126*c* in the slice 132B. In the example illustrated in FIG. 14C, there are nine columns corresponding to the three sets of three coated surfaces 126*a*, 126*b* and 126*c*. Furthermore, the number rows (i.e., the number of lenses associated with each of the coated surfaces 126*a*, 126*b* and 126*c*) is in one-to-one correspondence with the number of substrates to be produced after performing the cuts along the plane(s) 136. In the example illustrated in FIG. 14C, there are three rows of lenses, corresponding to three substrates formed from cuts along two planes 136. Therefore, each coated surface 126*a* is associated with three lenses 180*a* from the same column, each coated surface 126*b* is associated with three lenses 180*b* from the same column, and each coated surface 126*c* is associated with three lenses 180*c* from the same column.

The lenses 180*a*, 180*b* and 180*c* are preferably sized and dimensioned such that they align with the projections of the respective coated surfaces 126*a*, 126*b* and 126*c* in the plane of the surface 106, without overlapping with any of the projections of the coated surfaces that neighbor the respective coated surfaces 126*a*, 126*b* and 126*c*. In addition, the lenses 182 are preferably sized and dimensioned such that they align with the projections of the respective coated surfaces 126*d* in the plane of the surface 108, without overlapping with any of the projections of the coated surfaces that neighbor the respective coated surfaces 126*d*.

Once the plates 184 and 186 are properly aligned with the surfaces 106 and 108, the lenses of the microlens arrays 188, 187 are optically attached to the respective surfaces 106 and 108 via optical adhesive (i.e., cement) so as to bond the lenses to the slice 132B. The plates 184 and 186 may be optionally be removed after attachment of the lenses to the slice 132B. Alternatively, if the plates 184 and 186 are optically transparent (to the light emitted by the light sources 12*a*, 12*b* and 12*c*), the plates 184 and 186 themselves can be bonded to the respective surfaces 106 and 108 of the slice 132B, via optical adhesive.

Figure 14D:
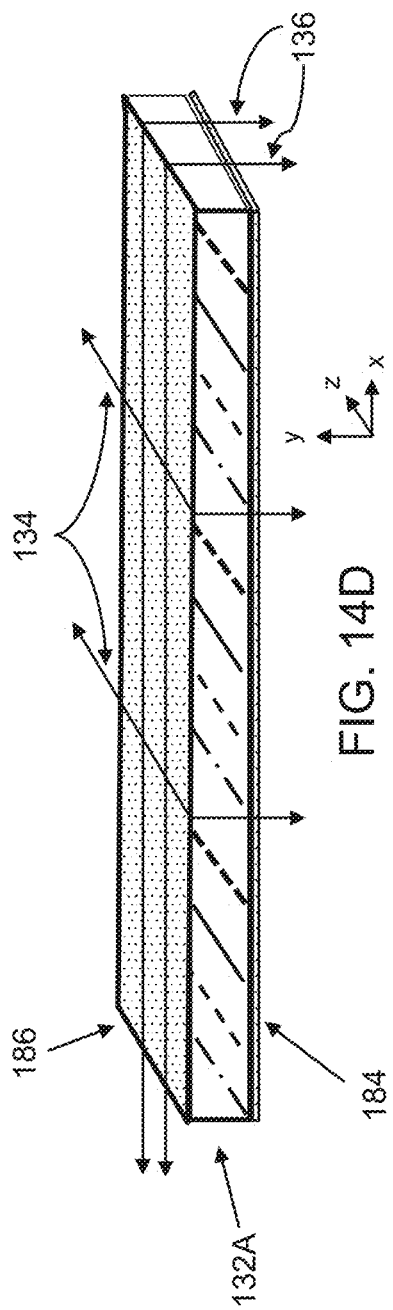
FIG. 14D is a schematic isometric view corresponding to FIGS. 14A-14C, showing the plates attached to the slice and cutting planes for cutting the slice.

After the lenses attached to the slice 132B, as shown in FIG. 14D, the slice 132B is cut (sliced) along the at least one plane 134, to separate the slice 132B into multiple sections, similar to as described with reference to FIG. 8C. Each section is then cut along the at least one plane 136, similar to as described with reference to FIG. 8D, so as to form the substrates 103B.

It is generally desirable to continuously monitor the power output of each of the light sources 12*a*, 12*b* and 12*c* in order to identify intensity fluctuations and responsively attenuate the output power to compensate for such fluctuations. This can be accomplished by deploying detectors (power detectors or photodetectors) in association with the respective reflectors 104*a*, 104*b* and 104*c* in order to measure intensity indicative of the intensity output by the light sources 12*a*, 12*b* and 12*c*. In addition, in practice the (selectively) reflective surfaces of the reflectors 104*a*, 104*b* and 104*c* do not perform as ideal reflectors, and there is some leakage of light associated with each reflector. Using the same example configuration of the dichroic beam combiner 102 of FIG. 2, the reflector 104*a* transmits a small proportion of the intensity of incident light of the first color. Similarly, the reflector 104*b* transmits a small proportion of the intensity of incident light of the second color, and reflects a small proportion of the intensity of incident light of the first color. Similarly, the reflector 104*c* transmits a small proportion of the intensity of incident light of the third color, and reflects a small proportion of the intensity of incident light of the first and second colors.

This leakage reduces the overall intensity of the color-combined output beam, which may negatively affect overall beam quality. Therefore, it may also be desirable to quantify the leakage via power/intensity monitoring. Computer processors, electrically connected to the detectors, can be programmed to execute algorithms to determine the power output of each of the light sources 12*a*, 12*b* and 12*c*, and if necessary, account for leakage through the reflectors, based on the measured intensities.

Figure 15:
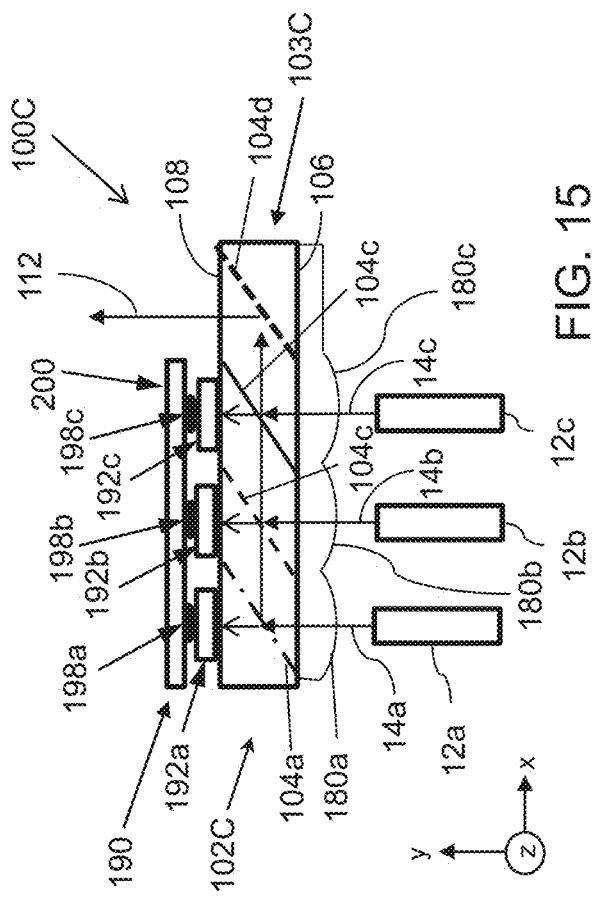
FIG. 15 is a schematic side view of the optical device of FIG. 7, modified to include collimating optics and detector arrangements attached to the substrate of the dichroic beam combiner, according to an embodiment of the present invention.

Referring now to FIG. 15, there is shown an optical device 100C, generally similar to the optical device 100B of FIG. 12, with equivalent elements labeled similarly. The optical device 100C includes a dichroic beam combiner 102C with a detector arrangement 190, having detectors 192*a*, 192*b* and 192*c* associated with respective reflectors 104*a*, 104*b* and 104*c*, for measuring an intensity indicative of the power output by each of the light sources 12*a*, 12*b* and 12*c*, and for measuring an intensity of the light leaked by each of the reflectors 104*a*, 104*b* and 104*c*. The light leaked by the reflectors 104*a*, 104*b* and 104*c* is designated by open arrows. It is noted that unlike the optical device 100B, the optical device 100C illustrated in FIG. 15 does not include power optics 182 (e.g., a lens) for applying optical power to the output beam 112 that is reflected by the reflector 104*d*, however, embodiments are contemplated in which power optics 182 are included with the optical device 100C.

The detector arrangement 190 is optically attached to the major surface 106 of the substrate 103C. Preferably, the attachment of the detector arrangement 190 to the major surface 106 is performed during the manufacturing process at the slice level prior to making the cut(s) along the plane(s) 134 (as in FIG. 8C).

Figure 16A:
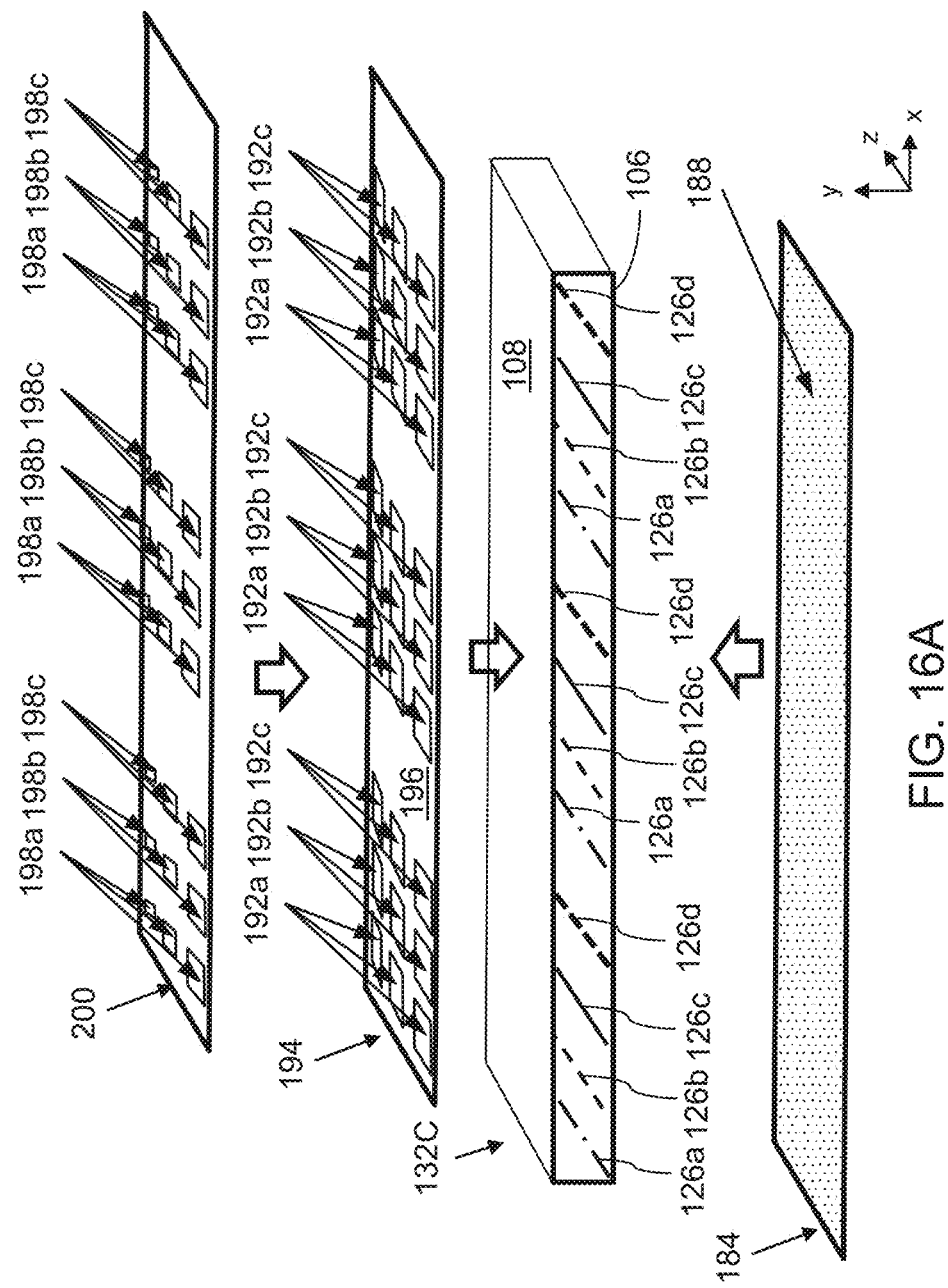
FIG. 16A is a schematic isometric view of plates respectively having the collimating optics and components of the detector arrangements to be attached to the slice of FIG. 8C, according to a step in the process for manufacturing the optical device of FIG. 15.

With reference to FIGS. 8C, 14A and 14C, reference is also made to FIG. 16A, which illustrates a first step in the attachment of the detector arrangement 190 and optics to the respective major surfaces 108 and 106 of the slice 132C. The transparent plate 184 having the microlens array 188 is aligned and attached to the major surface 106, similar to as described with reference to FIGS. 14A and 14C.

A transparent plate 194, of roughly the same size and dimension of the major surface 108 of the slice 132C, carries detectors 192*a*, 192*b* and 192*c* arranged in a two-dimensional array or grid having a number of rows and columns. The detectors 192a, 192b and 192c are held in position on the transparent plate 194 via a carrier foil 196. In certain embodiments, the foil 196 may include conductive elements which provide electrical contact points for the detectors 192a, 192b and 192c. In other embodiments, such as the embodiment illustrated in FIGS. 15 and 16A, an electrically conductive surface 200, having electrically conductive elements 198a, 198b and 198c which provide electrical contact points for the detectors 192a, 192b and 192c, is associated with and attached to the detectors 192a, 192b and 192c, and the foil 196 is removed after the plate 194 is attached to the major surface 108.

Figure 16B:
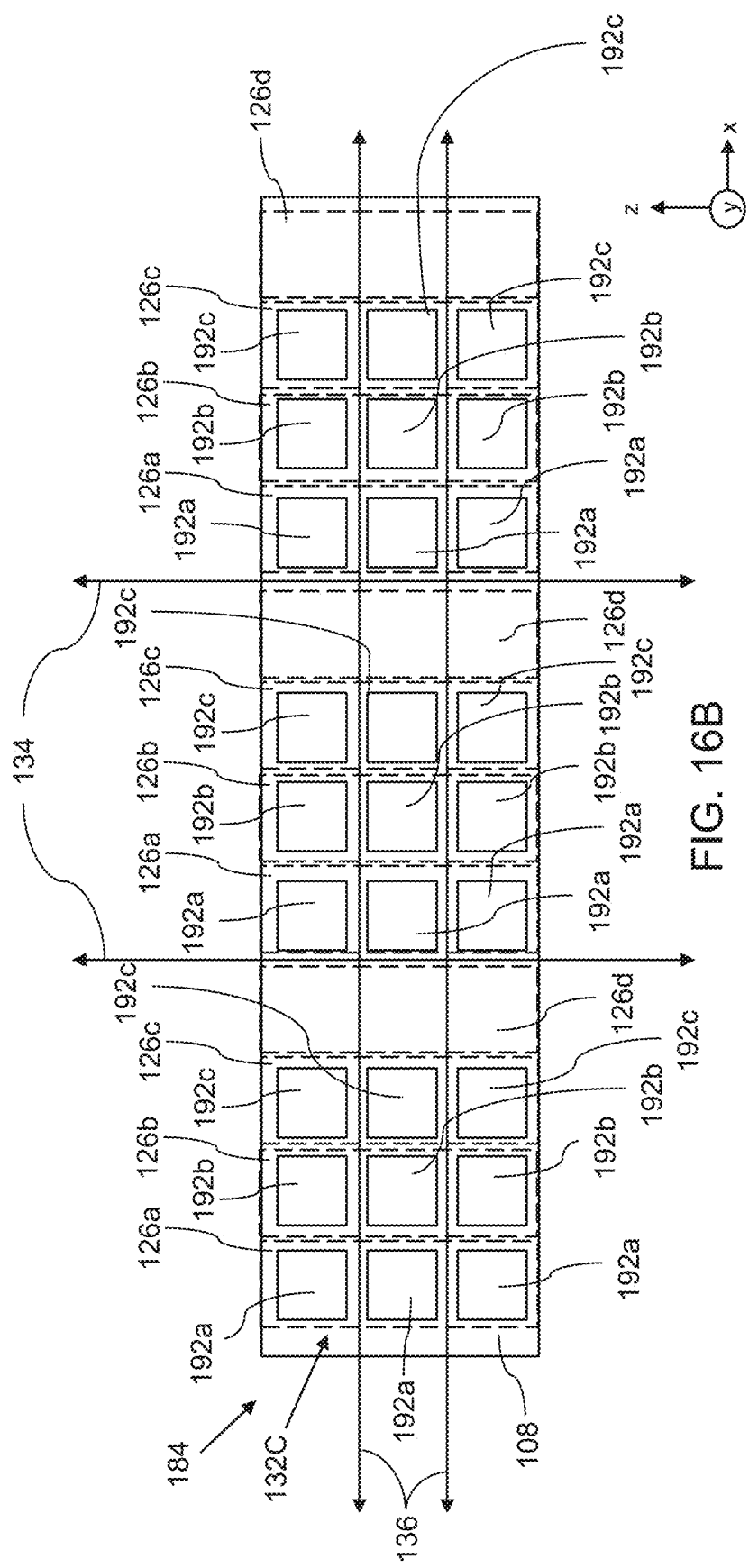
FIG. 16B is a schematic plan view, taken from above one of the plates having detectors components of the detector arrangement of FIG. 16A, after alignment with a major surface of the slice.

The plate 194 is aligned with the major surface 108 such that each respective coated surface 126a is associated with one or more detector 192a of a respective column, each respective coated surface 126b is associated with one or more detector 192b of a respective column, and each respective coated surface 126c is associated with one or more detector 192c of a respective column FIG. 16B shows a plan view of the plate 194 aligned and in contact with the major surface 108, taken from above the plate 194 with the coated surfaces 126a, 126b, 126c and 126d shown in phantom. The number of columns in the array of the detectors is in one-to-one correspondence with the total number of coated surfaces 126a, 126b and 126c in the slice 132C. In the example illustrated in FIGS. 16A and 16B, there are nine columns corresponding to the three sets of three coated surfaces 126a, 126b and 126c. Furthermore, the number rows (i.e., the number of detectors associated with each of the coated surfaces 126a, 126b and 126c) is in one-to-one correspondence with the number of substrates to be produced after performing the cuts along the plane(s) 136. In the example illustrated in FIGS. 16A and 16B, there are three rows of detectors, corresponding to three substrates formed from cuts along two planes 136. Therefore, each coated surface 126a is associated with three detectors 192a from the same column, each coated surface 126b is associated with three detectors 192b from the same column, and each coated surface 126c is associated with three detectors 192c from the same column.

Figure 16C:
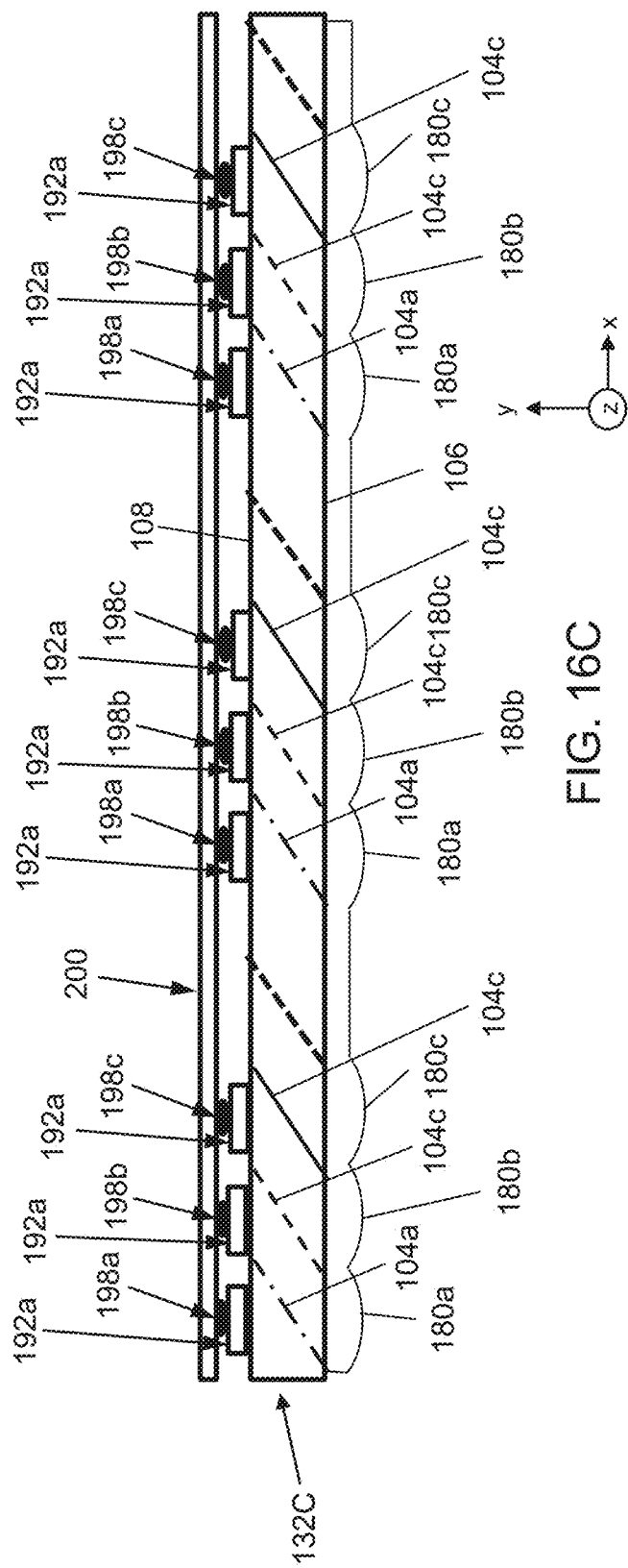
FIG. 16C is a schematic side view corresponding to FIG. 16A, showing the collimating optics and components of the detector arrangements attached to the slice.

After aligning the plate 194 with major surface 108, the plate 194 is attached to the surface 108 via optical adhesive (i.e., cement) so as to bond the plate 194 to the slice 132C. Subsequently, the foil 196 is removed from the plate 194, and the conductive surface 200 is aligned with the plate 194. The conductive elements 198a, 198b and 198c are arranged in a two-dimensional array or grid having a number of rows and columns, corresponding to the grid size of the array of detectors, such that there is a one-to-one correspondence between the conductive elements 198a, 198b and 198c and the detectors 192a, 192b and 192c. The conductive surface 200 is aligned with the plate 194 such that each detector 192a, 192b and 192c is associated with one respective conductive element 198a, 198b and 198c (i.e., each element 198a is associated with a respective detector 198a, each element 192b is associated with a respective detector 192b, and each element 198c is associated with a respective detector 192c). Once aligned, conductive element 198a, 198b and 198c are attached to the detectors 192a, 192b and 192c via an electrically conductive adhesive. As a result, each conductive element is sandwiched between an associated detector and the conductive surface 200, as illustrated in FIG. 16C.

After attachment of the optics (via plate 184) and the detector arrangement 190 (via plate 194 and conductive surface 200 and elements 198a, 198b and 198c), the slice 132C is cut (sliced) along the at least one plane 134, to separate the slice 132C into multiple sections, similar to as described with reference to FIG. 8C. Each section is then cut along the at least one plane 136, similar to as described with reference to FIG. 8D, so as to form the substrates 103C. Note that alternatively, the conductive surface 200 with the conductive elements 198a, 198b and 198c may be attached to the detectors 192a, 192b and 192c at the substrate level and not at the slice level. FIG. 17 illustrates another configuration of the optical device 100C in which the foil 196 includes conductive elements which provide electrical contact points for the detectors 192a, 192b and 192c. Here, the conductive surface 200 and the array of conductive elements 198a, 198b and 198c is not needed.

For certain types of polarized light sources, for example laser diodes that emit beams of linearly polarized light, the emitted beam can be an asymmetric beam, where light propagating along one axis (referred to as the "fast-axis") diverges several times (usually two or three times) wider than the light propagating along the orthogonal axis (referred to as the "slow-axis"). The beam divergence leads to power-loss in the generated output beams. It is therefore generally desirable to reduce divergence by generating symmetric beams, in order to utilize as much of the beam output power as possible. One approach to generating symmetric beams relies on deploying two orthogonally oriented cylindrical lenses, which separately apply optical power to the light propagating along respective axes.

FIG. 18 shows an optical device 100D that includes a dichroic beam combiner 102D with sets of cylindrical lenses for separately applying optical power to the light that propagates along the fast and slow axes, so as to generate symmetric beams. A lens arrangement 206, having cylindrical lenses 208a, 208b and 208c associated with respective reflectors 204a, 204b and 204c, is attached to the major surface 106 (similar to as described with reference to FIGS. 13-17). The lenses 208a, 208b and 208c can apply optical power to both the fast and slow axes, but it is beneficial for the lenses 208a, 208b and 208c to operate mostly on the fast axis. A retardation plate 202, preferably a quarter-wave plate, is attached to the major surface 108. A lens arrangement 210, having cylindrical lenses 212a, 212b and 212c associated with respective reflectors 204a, 204b and 204c and oriented orthogonally to the cylindrical lenses 208a, 208b and 208c, is attached to the retardation plate 202 such that the retardation plate 202 is sandwiched between the lens arrangement 210 and the major surface 108. The lenses 212a, 212b and 212c can apply optical power to both the fast and slow axes, but it is beneficial for the lenses 212a, 212b and 212c to operate mostly on the slow axis. In addition, the lenses 212a, 212b and 212c are coated with a partially reflective coating. A detector arrangement 190 (similar to as described with reference to FIGS. 15-17) is attached to lens arrangement 210 for measuring an intensity of light that is indicative of the power output by each of the light sources 12a, 12b and 12c.

The reflectors 204a, 204b, 204c and 204d are generally similar to the reflectors 104a, 104b, 104c and 104d with two exceptions. First, the reflectors 204a, 204b, 204c and 204d are polarization selective. This means that the reflectors 204a, 204b and 204c are polarization-chromatic-selective reflectors, and that the 204d is a polarization-selective reflector. The reflectors 204a, 204b and 204c can be made to be polarization-chromatic-selective during the manufacturing process of the dichroic beam combiner 102D by applying coatings (to form the coated surfaces 126a, 126b and 126c) that exhibit both polarization and chromatic selective properties. Similarly, the reflector 204d can be made to be polarization-selective during the manufacturing process of the dichroic beam combiner 102D by applying coatings (to form the coated surfaces 126d) that exhibit polarization-selective properties. The specific coating requirements will be elaborated in subsequent sections of the present disclosure.

Second, the reflectors 204a, 204b, 204c and 204d have a different orientation compared to the reflectors 104a, 104b, 104c and 104d, whereby the reflectors 204a, 204b, 204c and 204d are flipped (180-degrees) about the horizontal axis (the direction of elongation of the substrate 103D). This change in orientation is achieved during manufacturing by slicing along planes that are orthogonal to the planes 128.

In the configuration illustrated in FIG. 18, the reflector 204a is configured to transmit light of the first color that is polarized in a first polarization direction (e.g., vertical polarization and referred to as p-polarized) with regards to the surface of the reflector 204a, and to reflect light of the first color that is polarized in a second polarization direction (e.g., horizontal polarization and referred to as s-polarized), with regards to the surface of the reflector 204a, that is orthogonal to the first polarization direction. The reflector 204b is configured to transmit light of the second color that is polarized in the first polarization direction (e.g., p-polarized) with regards to the surface of the reflector 204b, transmit light of the first color that is polarized in the second polarization direction (e.g., s-polarized) with regards to the surface of the reflector 204b, and reflect light of the second color that is polarized in the second polarization direction (e.g., s-polarized) with regards to the surface of the reflector 204b. The reflector 204c is configured to transmit light of the third color that is polarized in the first polarization direction (e.g., p-polarized) with regards to the surface of the reflector 204c, transmit light of the first and second colors that is polarized in the second polarization direction (e.g., s-polarized) with regards to the surface of the reflector 204c, and reflect light of the third color that is polarized in the second polarization direction (e.g., s-polarized) with regards to the surface of the reflector 204c. The reflector 204d is configured to reflect light of all three colors that is polarized in the second polarization direction (e.g., s-polarized).

The lenses 208a, 208b and 208c are oriented in a first orientation orthogonal to the polarization direction of the incoming light waves from the light sources 12a, 12b and 12c (i.e., the first polarization direction) so as to mostly apply optical power along the fast axis (i.e., in this example the lenses 208a, 208b and 208c are oriented horizontally, which is along the x-axis). The lenses 212a, 212b and 212c are oriented in a second orientation (orthogonal to the orientation of the lenses 208a, 208b and 208c, and orthogonal to the second polarization direction) so as to mostly apply optical power along the slow axis (i.e., in this example the lenses 212a, 212b and 212c are oriented vertically, which is along the z-axis).

The following paragraphs describe the propagation of the beams 14a, 14b and 14c through the dichroic beam combiner 102D. Here, the beams 14a, 14b and 14c emitted by the respective light sources 12a, 12b and 12c are linearly polarized, for example p-polarized, with regards to the surfaces of the reflectors 204a, 204b and 204c. The polarized beams 14a, 14b and 14c are collimated in the fast axis by the respective lenses 208a, 208b and 208c and impinge on respective reflectors 204a, 204b and 204c.

The p-polarized collimated beam 14a is transmitted by the reflector 204a and passes through the retardation plate 202 which rotates the polarization direction to circular polarization. The circular polarized light reaches the lens 212a, where part of the light (a proportion of the intensity) is transmitted through the lens 212a to the detector 192a, and part of the light (a majority of the intensity) is reflected by the partially reflective coating and is collimated in the slow axis by the lens 212a. The reflected-collimated light passes through the retardation plate 202 which rotates the polarization direction of the light to s-polarized. The now s-polarized light is reflected by the reflector 204a, is transmitted by the reflector 204b, and is transmitted by the reflector 204c so as to form part of the output beam 112.

The p-polarized collimated beam 14b is transmitted by the reflector 204b and passes through the retardation plate 202 which rotates the polarization direction to circular polarization. The circular polarized light reaches the lens 212b, where part of the light (a proportion of the intensity) is transmitted through the lens 212b to the detector 192b, and part of the light (a majority of the intensity) is reflected by the partially reflective coating and is collimated in the slow axis by the lens 212b. The reflected-collimated light passes through the retardation plate 202 which rotates the polarization direction of the light to s-polarized. The now s-polarized light is reflected by the reflector 204b, and is transmitted by the reflector 204c so as to form part of the output beam 112. The p-polarized collimated beam 14b is transmitted by the reflector 204c and passes through the retardation plate 202 which rotates the polarization direction to circular polarization. The circular polarized light reaches the lens 212c, where part of the light (a proportion of the intensity) is transmitted through the lens 212c to the detector 192c, and part of the light (a majority of the intensity) is reflected by the partially reflective coating and is collimated in the slow axis by the lens 212c. The reflected-collimated light passes through the retardation plate 202 which rotates the polarization direction of the light to s-polarized. The now s-polarized light is reflected by the reflector 204c so as to form part of the output beam 112.

The output beam 112, consisting of s-polarized components of all three colors, impinges on the reflector 204d, which reflects the s-polarized light, thereby deflecting (re-directing) the output beam 112 perpendicular to the direction of elongation so as to exit the substrate 103D via the major surface 106 (i.e., in a direction generally opposite the projection direction, i.e., back toward the light sources 12a, 12b and 12c).

Preferably, the attachment of the lens arrangement 206, retardation plate 202, lens arrangement 210, and detector arrangement 190 to the substrate 103D is performed during the manufacturing process at the slice level prior to making the cut(s) along the plane(s) 134 (as in FIGS. 8C, 14A and 16A).

Figure 19:
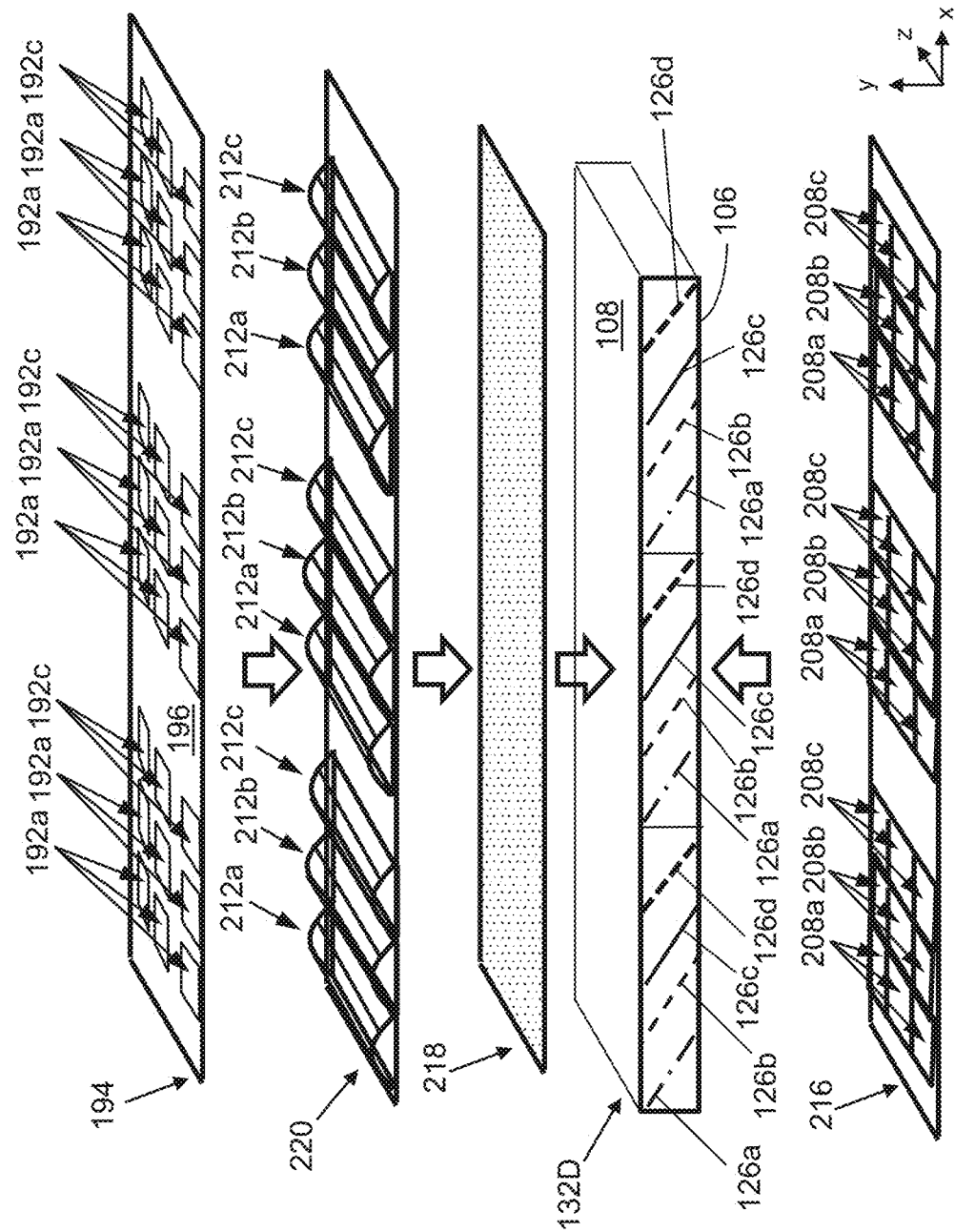
FIG. 19 is a schematic isometric view of plates respectively having cylindrical collimating optics, components of detector arrangements, and retardation plates, to be attached to a slice having segments of four embedded polarization-selective reflectors, according to a step in the process for manufacturing the optical device of FIG. 18.

FIG. 19 illustrates a first step in the attachment of the lens arrangement 206, retardation plate 202, lens arrangement 210, and detector arrangement 190 to the slice 132D. Reference is also made to FIGS. 8C, 14A and 16A. A transparent plate 216, of roughly the same size and dimension of the major surface 106 of the slice 132D, includes a set of cylindrical lenses 208a, 208b and 208c arranged in a two-dimensional array or grid having a number of rows and columns. The lenses have a direction of elongation dictated by the prescribed first orientation (which in the present example coincides with the direction of elongation of the slice 132D, which is the direction of elongation of the substrate 103D). The curved portions of the cylindrical lenses 208a, 208b and 208c extend downward to the underside of the plate 216 (not shown in the drawings). The plate 216 is aligned with the major surface 106 such that each respective coated surface 126a is associated with one or more lens 208a of a respective column of the array, each respective coated surface 126b is associated with one or more lens 208b of a respective column of the array, and each respective coated surface 126c is associated with one or more lens 208c of a respective column of the array. The number of columns in the array is typically in one-to-one correspondence with the total number of coated surfaces 126a, 126b and 126c in the slice 132D. In the example illustrated in FIG. 19, there are nine columns corresponding to the three sets of three coated surfaces 126a, 126b and 126c. Furthermore, the number rows (i.e., the number of lenses associated with each of the coated surfaces 126a, 126b and 126c) is in one-to-one correspondence with the number of substrates to be produced after performing the cuts along the plane(s) 136. In the example illustrated in FIG. 19, there are three rows of lenses, corresponding to three substrates formed from cuts along two planes 136. Therefore, each coated surface 126a is associated with three lenses 208a from the same column, each coated surface 126b is associated with three lenses 208b from the same column, and each coated surface 126c is associated with three lenses 208c from the same column Once the plate 216 is properly aligned with the surface 106, the lenses 208a, 208b and 208c are optically attached to the surface 106 via optical adhesive so as to bond the lenses 208a, 208b and 208c to the slice 132D. If the plate 216 is removable, the plate 216 can be removed after attachment of the lenses 208a, 208b and 208c. Alternatively, if the plate 216 is optically transparent (to the light emitted by the light sources 12a, 12b and 12c), the plate 216 itself can be bonded to the surface 106, via optical adhesive.

A waveplate 218 (preferably quarter-wave plates), of roughly the same size and dimension of the major surface 108 of the slice 132D, is aligned with the major surface 108. During the slicing steps (i.e., cutting along planes 134 and 136), the waveplate 218 is cut into individual pieces, where each piece forms a retardation plate 202. Once the waveplate 218 is properly aligned with the surface 108, the waveplate 218 is attached to the surface 108 via optical adhesive (i.e., cement) so as to bond the waveplate 218 to the slice 132D.

A transparent plate 220, of roughly the same size and dimension of the waveplate 218 (and the major surface 108 of the slice 132D), includes a set of cylindrical lenses 212a, 212b and 212c arranged in a two-dimensional array or grid having a number of rows and columns. The lenses have a direction of elongation that is dictated by the prescribed second orientation, which is orthogonal to the direction of elongation of the lenses 208a, 208b and 208c. Here, curved portions of the cylindrical lenses 212a, 212b and 212c extend upward from the top side of the plate 220. The plate 220 is aligned with the waveplate 218 and the major surface 108 such that each coated surface 126a is associated with one respective lens 212a, each coated surface 126b is associated with one respective lens 212b, and each coated surface 126c is associated with one respective lens 212c. The number of columns in the array corresponds to the total number of coated surfaces 126a, 126b and 126c in the slice 132D. In the example illustrated in FIG. 19, there are nine columns corresponding to the three sets of three coated surfaces 126a, 126b and 126c. In general, cylindrical lenses 212a, 212b and 212c form a single row, and the cutting along the plane(s) 136 effectively subdivides each cylindrical lens into multiple sets of cylindrical lenses, where each set of cylindrical lenses is associated with a respective substrate 103D.

Once the plate 220 is properly aligned with the waveplate 218 (and the major surface 108), the lenses 212a, 212b and 212c are optically attached to the waveplate 218 via optical adhesive so as to bond the lenses 212a, 212b and 212c to the slice 132D. If the plate 220 is removable, the plate 220 can be removed after attachment of the lenses 212a, 212b and 212c. Alternatively, if the plate 220 is optically transparent (to the light emitted by the light sources 12a, 12b and 12c), the plate 220 itself can be bonded to the waveplate 218, via optical adhesive.

Finally, a transparent plate 194 that includes detectors 192a, 192b and 192c is aligned with and attached to the plate 220. The alignment and attachment of the transparent plate 194 is generally similar to as described with reference to FIG. 16A. In particular, the transparent plate 194 is aligned with the plate 220 such that each lens 212a is associated with one or more respective detector 192a, each lens 212b is associated with one or more respective detector 192b, and each lens 212c is associated with one or more respective detector 192c. Furthermore, the transparent plate 194 is aligned with the plate 220 such that the coated surface 126a that is associated with a particular lens 212a is also associated with one or more respective detector 192a associated with that lens 212a, the coated surface 126b that is associated with a particular lens 212b is also associated with one or more respective detector 192b associated with that lens 212b, and the coated surface 126c that is associated with a particular lens 212c is also associated with one or more respective detector 192c associated with that lens 212c.

Although not shown in FIG. 19, an electrically conductive surface 200 may be aligned with the plate 194 so as to associate the detectors 192a, 192b and 192 with respective conductive elements 198a, 198b and 198c of the conductive surface 200 (similar to as described with reference to FIG. 16A). Alternatively, the foil 196 of the plate 194 may be conductive (as previously discussed).

After the lens arrangement 206 (i.e., the plate 216), the retardation plate 202 (i.e., the waveplate 218), the lens arrangement 210 (i.e., the plate 220), and the detector arrangement 190 (i.e., the plate 194 and optionally the conductive surface 200) are bonded to the slice 132D (through direct or indirect attachment), the slice 132D is cut (sliced) along the at least one plane 134, to separate the slice 132C into multiple sections, similar to as described with reference to FIG. 8C. Each section is then cut along the at least one plane 136, similar to as described with reference to FIG. 8D, so as to form the substrates 103D.

It is noted that in certain embodiments, such as when the lenses 208a, 208b and 208c have an orientation in which the direction of elongation is along the x-axis (as illustrated in FIG. 19), for each segment the lenses 208a, 208b and 208c from a single row can be combined as a single elongated cylindrical lens, instead of as three separate cylindrical lenses. Such may not be the case when the polarization direction of the incoming light waves from the light sources 12a, 12b and 12c are polarized in the horizontal direction (i.e., s-polarized). In such a scenario, the orientations of the lenses 208a, 208b and 208c and the lenses 212a, 212b and 212c would be swapped (i.e., the lenses 208a, 208b and 208c would be vertically oriented, and the lenses 212a, 212b and 212c would be horizontally oriented). In addition, the response of the reflectors 204a, 204b, 204c and 204d to p-polarized light and s-polarized light would be swapped (i.e., each mention of p-polarized light would be replaced by s-polarized light, and vice versa).

Figure 20:
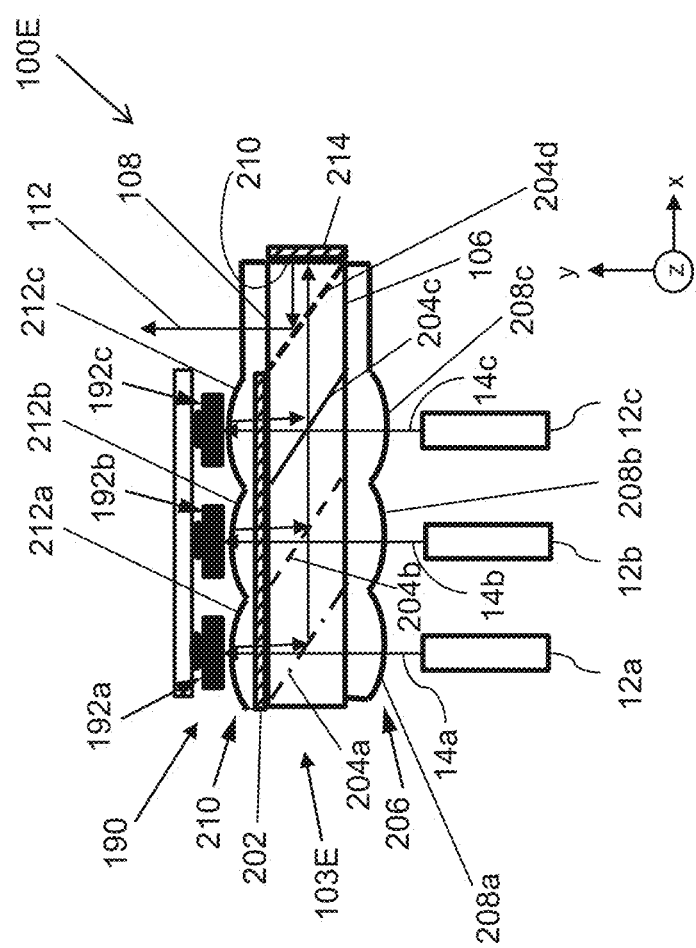
FIG. 20 is a schematic side view of an optical device, similar to the optical device of FIG. 18, with an additional reflective surface and retardation plate attached to a side of the substrate, according to an embodiment of the present invention.

FIG. 20 illustrates an optical device 100E that is a variation of the optical device 100D of FIG. 18. The optical device 100E incorporates a surface, generally designated 214, that includes a reflective coating together with a retardation plate (preferably a half-wave plate), on the external planar surface 210. Here, the reflector 204d is configured to transmit light of all three colors that is polarized in the second polarization direction (e.g., s-polarized), and to reflect light of all three colors that is polarized in the first polarization direction (e.g., p-polarized). The s-polarized output beam 112, upon emerging from the reflector 204c, is transmitted by the reflector 204d, and is reflected by the surface 214 which rotates the polarization to the second polarization direction (e.g., p-polarized). The now p-polarized beam impinges on the reflector 204d, which reflects the p-polarized light, thereby deflecting (re-directing) the output beam 112 perpendicular to the direction of elongation and along the projection direction so as to exit the substrate 103E via the major surface 108.

The surface 214 can be incorporated during the manufacturing process at the section level, after making the cut(s) along the plane(s) 134, but prior to making the cut(s) along the plane(s) 136. Here, for each section, the surface 214 (having the retardation plate (half-wave plate) and reflective surface) can be optically attached (via optical adhesive) to the planar surface that corresponds to the external planar surface 110.

Figure 21:
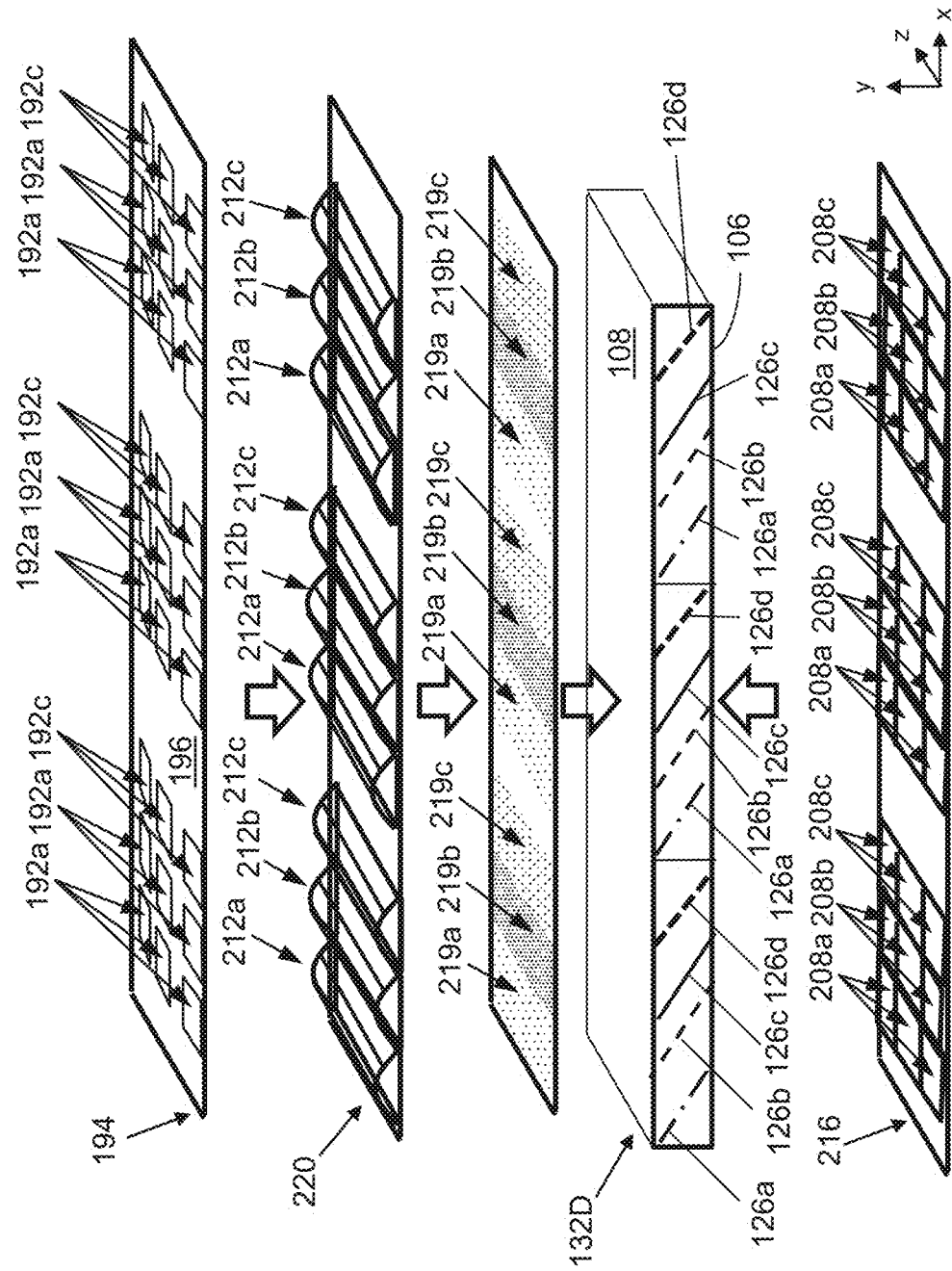
FIG. 21 is a schematic isometric view similar to FIG. 19, but with different sets of retardation plates, according to a step in the process for manufacturing an optical device similar to the optical device of FIG. 17.

It is noted that different coating designs for the reflectors 204a, 204b, 204c and 204d could be used to impose different color order of the beam combination or different polarization direction of the component colored beams and/or output beam. One example of changing the polarization direction is by introducing different respective retardation plates, in association with the respective light sources 12a, 12b and 12c, between the lens arrangement 206 and the major surface 106. Such retardation plates can be introduced between the lens arrangement 206 and the major surface 106 during manufacturing of the optical device using similar techniques described for embedding the waveplate 218 with reference to FIG. 19. An example is illustrated in FIG. 21, which is generally similar to FIG. 19, except that here the waveplate 218 is replaced by a set of waveplates 219a, 219b and 219c respectively associated with the coated surfaces 126a, 126b and 126c (and therefore respectively associated with the light sources 12a, 12b and 12c). Note that in situations in which polarization rotation is not required for a beam emitted by one of the light sources 12a, 12b and 12c, the waveplate associated with the coated surface that is associated with that light source can be replaced by a blank transparent plate.

Another example of changing the polarization direction is by embedding one or more retardation plate within the substrate 103D between the major surfaces 106, 108 parallel to, and between some of, the reflectors 204a, 204b, 204c and 204d. Here, the embedded retardation plates, and the reflectors 204a, 204b, 204c and 204d, are all at an oblique angle of a relative to the major surfaces 106, 108. The embedding of retardation plates between some of, the reflectors 204a, 204b, 204c and 204d enables polarization rotation within the substrate, and thereby eases the polarization-and-chromatic selective coating requirements for the reflectors.

The process for embedding one or more retardation plate within a substrate is described with reference to FIGS. 22A-22E. Referring first to FIG. 22A, this illustrates the coating of surfaces associated with transparent plates 120 and a plurality of retardation plates 222. In this configuration, both major surfaces 122, 124 of every other one of the transparent plates 120 is coated (similar to as described with reference to FIG. 4B and FIG. 8A. in this particular example, the coated transparent plates 120 and the retardation plates 222 are arranged such that a retardation plate 222 is positioned between an uncoated transparent plate 120 and the surface of a coated transparent plate 120 that is coated to produce the coated surface 126b. Starting from the bottom of the arrangement illustrated in FIG. 22A, the transparent plates and the retardation plates are arranged as follows: uncoated transparent plate 120, transparent plate 120 coated on its bottom surface to form coated surface 126d and coated on its top surface to form coated surface 126c, uncoated transparent plate 120, retardation plate 222, transparent plate 120 coated on its bottom surface to form coated surface 126b and coated on its top surface to form coated surface 126a, uncoated transparent plate 120. This periodic pattern may be repeated as needed. FIG. 22B illustrates an alternative coating method that utilizes transparent plates 120, coated thin plates 121, and retardation plates 222. Here, all of the transparent plates 120 are uncoated. Starting from the bottom of the arrangement illustrated in FIG. 22A, the periodic order of the plates is as follows: uncoated transparent plate 120, thin plate 121 coated on its top surface to form coated surface 126d, uncoated transparent plate 120, thin plate 121 coated on its top surface to form coated surface 126c, uncoated transparent plate 120, retardation plate 222 coated on its top surface to form coated surface 126b, uncoated transparent plate 120, thin plate 121 coated on its top surface to form coated surface 126a, uncoated transparent plate 120. Here too this periodic pattern may be repeated as needed.

FIG. 22C shows the coated surface 126a, 126b, 126c and 126d and the retardation plates 222 arranged in a stack 230 so as to create a periodic formation composed of a plurality of identical segments, where each segment contains exactly one full cycle of the periodic formation. In this illustrative example, each segment contains exactly one coated surface 126a, exactly one coated surface 126b, exactly one retardation plate 222, exactly one coated surface 126c, and exactly one coated surface 126d. The plates in the stack 230 are attached (i.e., glued) together, for example by way of applying optical cement between adjacent surfaces of the stack 230.

In the next step, as shown in FIG. 22D, the stack 230 is sliced (cut) along two parallel planes, designated 228, to produce a slice 232 (or "piece"). This step is similar to the steps for producing the slice 132 as described with reference to FIG. 4D, and should be understood by analogy thereto. As a result of this step, the coated surfaces 126a, 126b, 126c and 126d and the retardation plates 222 are embedded within the slice 232 in periodic order according to the periodic formation. FIG. 22E shows a view of the slice 232 with the coated surfaces 126a, 126b, 126c and 126d and the retardation plates 222 embedded between major surfaces 106, 108. Also shown in FIG. 22E are examples of planes 134 and 136 along which the slice 232 can be subsequently cut to produce individual sections and substrates (similar to as previously described throughout the present disclosure, for example with reference to FIGS. 4E and 4F).

Note that additional retardation plates can be introduced between the coated surfaces, for example between the coated surface 126a and the coated surface 126b, and/or between the coated surface 126c and the coated surface 126d, using techniques similar to as illustrated in FIGS. 22A-22E. It is also noted that the process for embedding one or more retardation plate within the substrate (FIGS. 22A-22E) and the process for introducing different respective retardation plates between the lens arrangement 206 and the major surface 106 (as described with reference to FIG. 21) are not mutually exclusive, and can be used in combination. In fact, lens arrangements 206, 210, detector arrangements 190, and waveplates 218 or 219a, 219b and 219c can be bonded to the slice 232 using the techniques previously described in order to produce compact optical devices having embedded optics, detectors and waveplates.

These compact optical devices, as well as the compact optical devices illustrated in FIGS. 18 and 20, in addition to performing color combining, also perform functions for symmetric beam generation (i.e., reducing fast and slow axis divergence) and beam collimation via optics 206 and 210, as well as light source power monitoring (via the detector arrangements 190). In certain cases where the output beam emitted by such optical devices are to be used as input to a follow-on optical device, the output beams emitted by such optical devices may be overly collimated for direct use by the follow-on optical device. Such is the case, for example, when the output beam emitted by such optical devices are used in a scanning arrangement that projects light into an optical waveguide. As a consequence, relay optics may be needed in the optical path between the optical device and the optical waveguide in order to de-collimate and re-collimate the output beam. In order to enable direct use of the output beam by a follow-on optical device, it may be desirable to separate the functions of color-combination and symmetric-beam-generation-and-collimation, such that these functions are performed by two separate optical devices.

FIGS. 23-26 illustrate various views of an optical device, generally designated 300, constructed and operative according to another aspect of the present disclosure, that provides symmetric beam generation and beam collimation functionality, as well as power monitoring functionality. It is noted that some of the components of the optical device 300, while visible in some of FIGS. 23-26, are not shown in other of FIGS. 23-26. For example, power monitoring and polarization rotation components are visible in FIGS. 23 and 24, but are not shown in FIGS. 25 and 26.

In general terms, the optical device 300 includes a substrate 302, formed as parallel-faced slab, having a first direction of elongation (illustrated arbitrarily herein as corresponding to the "y-axis"), and a second direction of elongation (illustrated arbitrarily herein as corresponding to the "z-axis") orthogonal to the first direction of elongation. The substrate 302 has a first pair of parallel major external planar surfaces (faces) 306, 308 which form a rectangular cross-section (in the xy-plane). The major surfaces 306 and 308 primarily function as light-waves entrance surfaces and a light-waves exit surfaces, respectively. The substrate 302 further includes a second pair of parallel external planar surfaces 310, 312 and a third pair of parallel external planar surfaces 326, 328, where the distance between the surfaces 310, 312 is typically an order of magnitude greater than the distance between the surfaces 306, 308, and the distance between the surfaces 326, 328 is approximately equal to the distance between the surfaces 306, 308.

Mutually parallel polychromatic polarization-selective beam splitter configurations (which may be referred to as "PBS") 314 and 316 are embedded within the substrate 302 between the major surfaces 306, 308 at an oblique angle φ to the first direction of elongation (and by equivalence at the same oblique angle to the surfaces 306, 308), preferably at an angle of 45-degrees. Preferably, the planar surfaces which form the PBS 314 and 316 are dimensioned such that the projections of the PBS 314 and 316 in the plane of the surface 306 are non-overlapping.

The PBS 314 is configured to transmit incident light that is polarized in a first polarization direction relative to the surface of the PBS 314, and to reflect incident light that is polarized in a second polarization direction (orthogonal to the first polarization direction) relative to the surface of the PBS 314. The PBS 316 has the same transmission and reflection properties as the PBS 314, specifically, the PBS 316 is configured to transmit incident light that is polarized in the first polarization direction relative to the surface of the PBS 316, and to reflect incident light that is polarized in the second polarization direction relative to the surface of the PBS 316. Accordingly, the types of light transmitted by the PBS 314 and 316 is light that is polarized in the first polarization direction, and the types of light reflected by the PBS 314 and 316 is light that polarized in the second polarization direction.

Light sources 12a, 12b and 12c are associated with the major surface 306 and the PBS 314. The light sources 12a, 12b and 12c are arranged in an array that extends laterally between the surfaces 326, 328 (along the second direction of elongation). A retardation plate 318, preferably a quarter-wave plate, is associated with the PBS 314 and is optically attached to the substrate 302 at the major surface 308. A partially reflective cylindrical lens 320 is associated with the PBS 314 and is optically attached to the retardation plate 318. The cylindrical lens 320 is deployed in a first orientation that is orthogonal to linear polarization direction of the light emitted by the light sources 12a, 12b and 12c (i.e., if the light sources 12a, 12b and 12c emit light that is polarized in the first polarization direction, the cylindrical lens 320 is oriented in a direction corresponding to the second polarization direction). When properly oriented, the cylindrical lens 320 applies optical power along the direction corresponding to the first polarization direction. In this orientation, the cylindrical lens 320 has a direction of elongation that is parallel to the second direction of elongation of the substrate 302, and the cylindrical lens 320 extends laterally between the surfaces 326, 328 along the second direction of elongation of the substrate 302.

A retardation plate 324, preferably a quart-wave plate, is associated with the PBS 316 and is optically attached to the substrate 302 at the major surface 306. A set of partially reflective cylindrical lenses 322a, 322b and 322c, deployed in a second orientation orthogonal to the first orientation, are associated with the PBS 316 and are optically attached to the retardation plate 324. The second orientation is along the same direction as the linear polarization direction of the light emitted by the light sources 12a, 12b and 12c (i.e., if the light sources 12a, 12b and 12c emit light that is polarized in the first polarization direction, the cylindrical lenses 322a, 322b and 322c are oriented in a direction corresponding to the first polarization direction). When properly oriented, the cylindrical lenses 322a, 322b and 322c apply optical power along the direction corresponding to the second polarization direction. In this orientation, the cylindrical lenses 322a, 322b and 322c have a direction of elongation that is parallel to the first direction of elongation of the substrate 302. The cylindrical lenses 322a, 322b and 322c are arranged side by side in an array that extends laterally between the surfaces 326, 328.

Detectors 326a, 326b and 326c are associated with respective light sources 12a, 12b and 12c and are attached to the cylindrical lens 320. The detectors 326a, 326b and 326c, like the light sources 12a, 12b and 12c, are arranged in an array that extends laterally between the surfaces 326, 328. Alternatively, the detectors 326a, 326b and 326c can be attached to respective cylindrical lenses 322a, 322b and 322c.

The light sources 12a, 12b and 12c are configured to emit linear polarized light beams 14a, 14b and 14c. The beams 14a, 14b and 14c are polarized in a first polarization direction relative to the surfaces of the PBS 314, 316. In the present non-limiting illustrative example, the first polarization direction is vertical polarization (shown as double-headed arrows and referred to as p-polarized), where the fast axis of the beams 14a, 14b and 14c expand vertically.

The following paragraphs describe the propagation path of the beam 14c through the substrate 302. Reference is made to FIGS. 23-26. The p-polarized beam 14c enters the substrate 302 through the surface 306, is transmitted by the PBS 314, and exits the substrate 302 through the surface 308. The beam 14c passes through the retardation plate 318, which rotates the polarization direction of the beam 14c to circular polarization, and impinges on the cylindrical lens 320 (having horizontal orientation). Part of the light (a small proportion of the intensity) that impinges on the cylindrical lens 320 is transmitted through the lens 320 to the detector 326c, which measures the intensity of the light (indicative of the output power of the light source 12c). The other part of the light (a majority of the intensity) is reflected by the lens 320, which applies vertical optical power so as to collimate the vertically diverging fast axis of the beam 14c (preventing the beam 14c from expanding along the fast axis). The reflected beam 14c passes back through the retardation plate 318, which rotates the polarization direction of the beam 14c to the second polarization direction, which in this context is horizontal polarization (shown as dots and referred to as s-polarized).

The now s-polarized beam 14c re-enters the substrate 302 through the surface 308, is reflected by the PBS 314, reflected by the PBS 316, and exits the substrate through the surface 306. The beam 14c passes through the retardation plate 324, which rotates the polarization direction of the beam 14c to circular polarization, and impinges on the cylindrical lens 322c (having vertical orientation). The beam 14c is reflected by the cylindrical lens 322c, which applies horizontal optical power so as to collimate the horizontally diverging slow axis of the beam 14c (preventing the beam 14c from expanding along the slow axis). The reflected beam 14c passes back through the retardation plate 324, which rotates the polarization direction of the beam 14c to the first polarization direction (p-polarized). The now p-polarized beam 14c re-enters the substrate 302 through the surface 306, is transmitted by the PBS 316, and exits the substrate through the surface 308 as an approximately circular (symmetric) beam 15c.

The beams 14a and 14b follow similar propagation paths to that of the beam 14c in order to produce approximately circular beams 15a and 15b, respectively. As should be understood, as the beams 14a and 14b propagate, part of the light that impinges on the cylindrical lens 320 is transmitted through the lens 320 to the detectors 326a and 326b, respectively, which respectively measure the intensity of the light (indicative of the output power of the light sources 12a and 12b). Furthermore, the beams 14a and 14b (after having polarization rotated to circular polarization) impinge on the cylindrical lenses 322a and 322b, respectively (having vertical orientation). The beams 14a and 14b are reflected by the cylindrical lens 322a and 322, respectively, which apply horizontal optical power so as to collimate the horizontally diverging slow axis of the beams 14a and 14b. The reflected beams 14a and 14b pass back through the retardation plate 324, which rotates the polarization direction of the beams 14a and 14b to the first polarization direction (p-polarized). The now p-polarized beams 14a and 14b re-enter the substrate 302 through the surface 306, are transmitted by the PBS 316, and exits the substrate through the surface 308 as approximately circular (symmetric) beams 15a and 15b.

The following paragraphs describe steps for manufacturing the optical device 300. Reference is made to FIGS. 27A-27F, which show various steps in the manufacturing process. Reference is also made to FIGS. 23-26, as well as FIGS. 4A, 4E, 4F, 16A-16C and 19.

In the first step in the manufacturing process, a plurality of the transparent plates 120 are obtained, similar to as described with reference to FIG. 4A. In the next step, coatings are applied to various surfaces associated with the transparent plates 120 to generate a plurality of coated surfaces. FIG. 27A illustrates one non-limiting example of how the coatings are applied, but in general, a coating is applied to a first set of surfaces associated with the transparent plates 120 to form a plurality of coated surfaces 329. The coating is a polychromatic polarization-selective coating which forms the polychromatic polarization-selective beam splitter configurations 314 and 316. As such, each coated surface 329 transmits incident light that is polarized in a first polarization direction relative to the surface 329, and reflects incident light that is polarized in the second polarization direction (orthogonal to the first polarization direction) relative to the surface 329.

In the non-limiting illustrative example of FIG. 27A, both major surfaces 122, 124 of every other one of the transparent plates 120 (defining a subset of the transparent plates 120) is coated with the polychromatic polarization-selective coating. The surfaces 122, 124 of the remaining transparent plates 120 (not in the subset) are uncoated. Here, the surfaces associated with the transparent plates 120 are in fact major surfaces (122, 124) of some of the transparent plates 120. The coated transparent plates 120 and the uncoated transparent plates 120 are arranged in an arrangement alternating between transparent plates 120 and the coated transparent plates 120. In other words, the plates are arranged in an alternating order as follows: uncoated transparent plate 120, double-sided coated transparent plate 120, uncoated transparent plate 120, double-sided coated transparent plate 120, uncoated transparent plate 120, and so on.

FIG. 27B illustrates another non-limiting example for applying the coatings. Here, a plurality of the thin transparent plates 121 are arranged alternately between the transparent plates 120. Each thin plate 121 is coated (on its major surfaces, not shown) with the polychromatic polarization-selective coating. The coated thin plates 121 and the transparent plates 120 are arranged so as to alternate between transparent plates 120 and coated thin plates 121. In other words, the plates are arranged in an alternating order as follows: transparent plate 121, coated thin plate 121, transparent plate 120, coated thin plate 121, transparent plate 120, and so on. Here, the surfaces associated with the transparent plates 120 are the coated surfaces of the thin plates 121.

In another non-limiting example (not shown), the polychromatic polarization-selective coating is applied to the same side (for example the surface 122 or the surface 124) of all of the transparent plates 120 (except for one of the transparent plates 120 which is uncoated). Here, similar to as in FIG. 27A, the surfaces associated with the transparent plates 120 are in fact major surfaces (122, 124) of some of the transparent plates 120.

As mentioned, once the polychromatic polarization-selective coating is applied to the relevant surfaces to form the coated surfaces 329, the coated surfaces 329 are arranged (by appropriately stacking the coated transparent plates 120, or the transparent plates 120 with the coated thin plates 121). The arrangement takes the form of a stack 330, as shown in FIG. 27C, in which all of the coated surfaces 329 are mutually parallel. The coated surfaces 329, within the stack 330, have a periodic formation composed of a plurality of identical and non-overlapping segments, where each segment contains exactly one full cycle of the periodic formation, and where a full cycle is composed of exactly two (i.e., a pair) of the coated surfaces 329. The segments are non-overlapping in the sense that each coated surface belongs to one (and only one) segment. By analogy, the periodic formation is formed by repeating a first segment, that contains exactly two (i.e., a pair) of the coated surfaces 329, a set number of times.

After the surfaces 329 are arranged in the stack 330, the plates of the stack 330 are attached (i.e., glued) together, for example by way of applying optical cement between adjacent surfaces (e.g., at the uncoated surfaces of the transparent plates 120) of the stack 330.

Figure 27E:
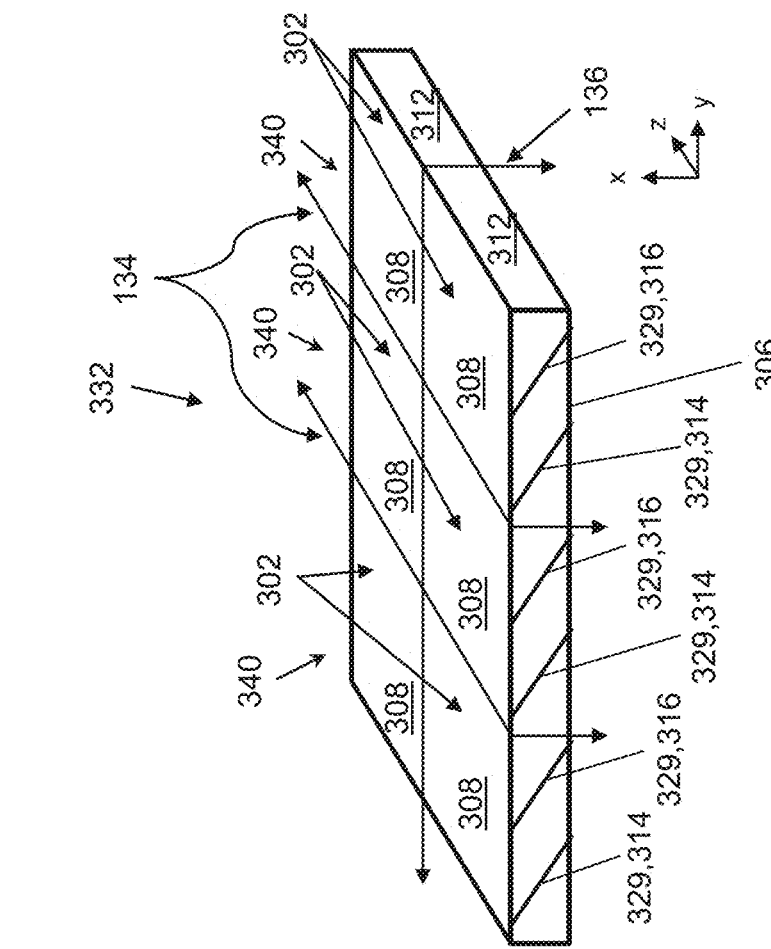
FIG. 27E is a schematic isometric view of a slice produced by slicing along the pair of cutting planes of FIG. 27D, and two pairs of orthogonal cutting planes for producing the substrate of the optical device of FIGS. 23-26.
Figure 27C:
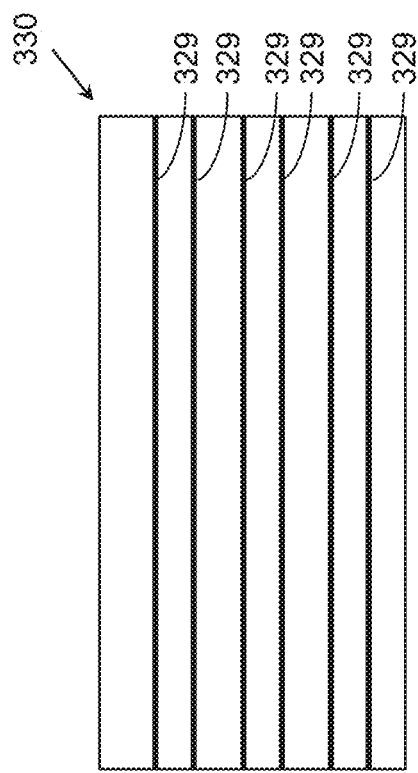
FIG. 27C is a schematic side view of the arrangement of coated surfaces of FIG. 27A arranged in a stack, according to a step in the process for manufacturing the optical device of FIGS. 23-26.
Figure 27D:
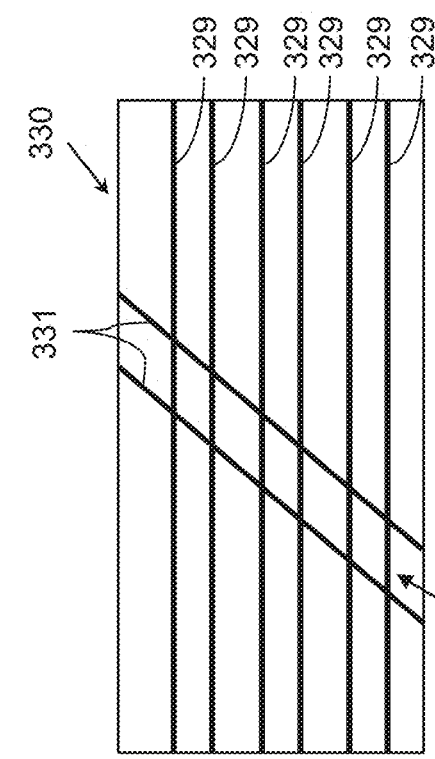
FIG. 27D is a schematic side view of the stack of FIG. 27C with a pair of parallel cutting planes overlaid on the stack for producing a slice from the stack, according to another step in the process for manufacturing the optical device of FIGS. 23-26.

In the next step, as shown in FIG. 27D, the stack 330 is sliced (cut) along two parallel planes, designated 331, to produce a slice 332 (or "piece"). This step is generally similar to the slicing step described with reference to FIG. 4D and FIG. 8B. The planes 331 are diagonal to the major surfaces of all of the transparent plates 120 of the stack 330 such that the planes 331 intersect all of the planar coated surfaces 329 at a common oblique angle. The slicing angle (i.e., the common oblique angle) and the oblique angle φ at which the PBS 314, 316 are deployed within the substrate 302 are supplementary angles. Therefore, the slicing angle is preferably selected to produce an angle φ that corresponds to an AOI that falls within a range at which the polychromatic polarization-selective coating provides peak desired reflectance and transmittance characteristics.

FIG. 27E shows a single slice 332, having a first direction of elongation (illustrated arbitrarily herein as corresponding to the "y-axis", and corresponding to the first direction of elongation of the substrate 302), and having a second direction of elongation (illustrated arbitrarily herein as corresponding to the "z-axis", and corresponding to the second direction of elongation of the substrate 302). It should be understood that multiple slices can be produced by slicing the stack 330 along multiple pairs of parallel planes 331. The slice 332 has periodic coated surfaces 329 (corresponding to multiple segments) embedded between major surfaces 306, 308. The coated surfaces 329 are at the oblique angle φ to the major surfaces 306, 308 due to the diagonal cutting of the stack 330. As can be seen, for each segment (which contains a pair of coated surfaces 329), a first of the coated surfaces 329 forms the PBS 314, and a second of the coated surfaces 329 forms the PBS 316. The major surfaces 306, 308 (which serve as the light-waves entrance and exit surfaces of the substrate 302) are preferably polished to increase optical quality.

Figure 4F:
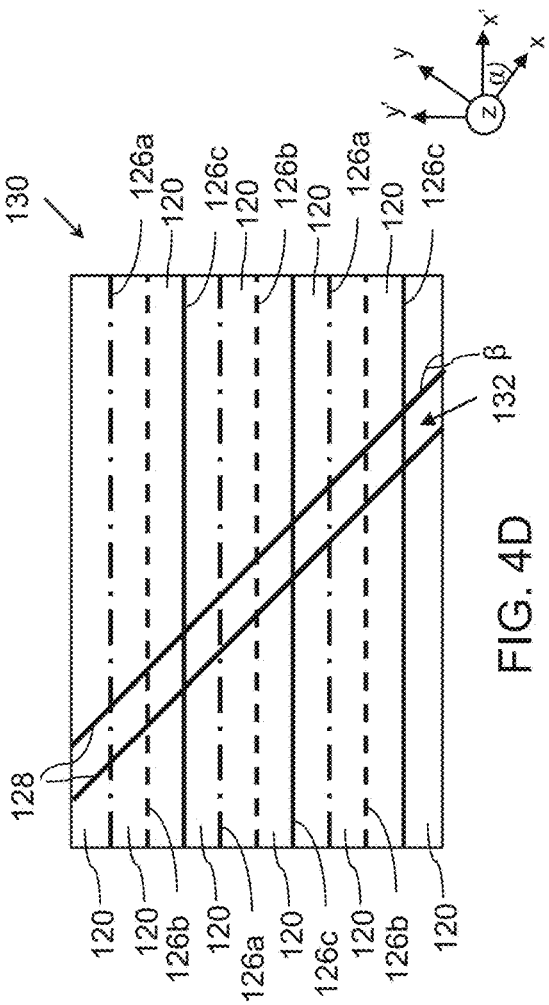
FIG. 4F is a schematic isometric view of a section produced by cutting along the pair of cutting planes of FIG. 4E, and another pair of cutting planes for producing substrates from the sections, according to another step in the process for manufacturing the dichroic beam combiner of FIG. 2.

Also shown in FIG. 27E are examples of planes 134 and 136 along which the slice 332 can be subsequently cut (sliced) to produce individual sections 340 and substrates 302 (similar to as previously described throughout the present disclosure, for example with reference to FIGS. 4E and 4F). It is noted that the transparent plate 120 that is between adjacent segments preferably has an increased thickness (as compared to the other transparent plates 120) so as to provide additional space between coated surfaces 329 from adjacent segments, which are separated by the cutting plane(s) 134.

Steps for applying the waveplates (corresponding to the retardation plates 318, 324), optics (corresponding to the cylindrical lenses 320, 322a, 322b and 322c), and detector arrangements (corresponding to the detectors 326a, 326b and 326c) are preferably performed at the slice level, similar to as describe with reference to FIG. 19.

Figure 27F:
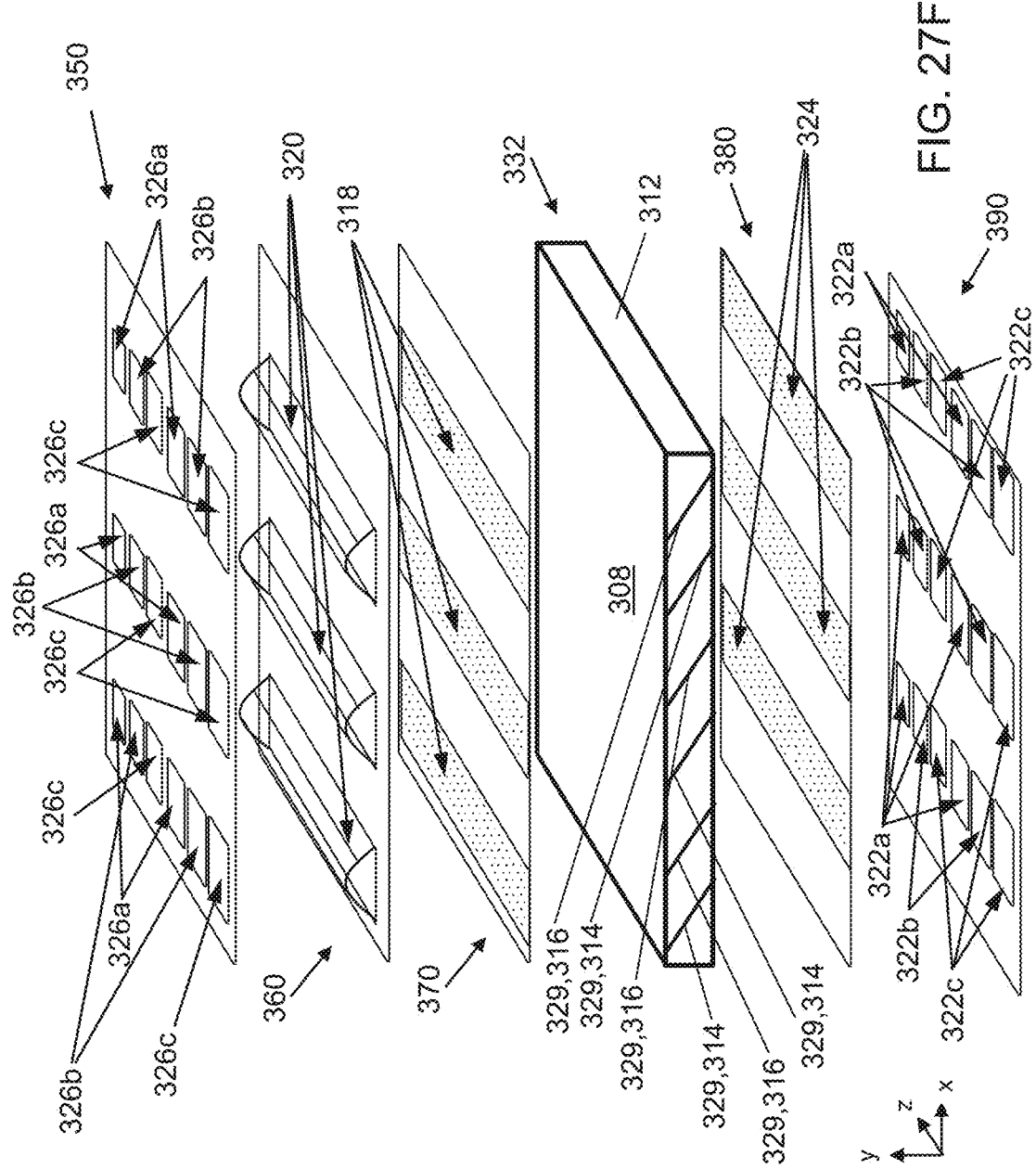
FIG. 27F is a schematic isometric view of plates respectively having horizontal cylindrical lenses, sets of vertical cylindrical lenses, retardation plates, and sets of detectors, to be attached to the slice of FIG. 27E, according to another step in the process for manufacturing the optical device of FIGS. 23-26.

FIG. 27F illustrates an arrangement of (optically) transparent and/or removable plates 350, 360, 370, 380 and 390, which respectively carry (i.e., hold) detectors 326a, 326b, 326c, cylindrical lenses 320, retardation plates 318, retardation plates 324, and cylindrical lenses 322a, 322b, 322c.

The plate 370, which carries retardation plates 318 (preferably quarter-wave plates), is aligned with the major surface 308 of the slice 332 such that each respective retardation plate 318 is associated with a respective one of the coated surfaces 329 that form the PBS 314. There is a one-to-one correspondence between the retardation plates 318 and the coated surfaces 329 that form the PBS 314. After alignment, the retardation plates 318 are optically attached to the surface 308 via optical adhesive (i.e., cement) so as to bond the retardation plates 318 to the slice 332. If the plate 370 is removable, the plate 370 can be removed after attachment of the retardation plates 318. Alternatively, if the plate 370 is optically transparent (to the light emitted by the light sources 12a, 12b and 12c), the plate 370 itself can be bonded to the slice 332 via optical adhesive.

Next, the plate 360, which carries cylindrical lenses 320, is aligned with the retardation plates 318 such that each respective lens 320 is associated with a respective one of the retardation plates 318. There is a one-to-one correspondence between the lenses 320 and the retardation plates 318. The lenses 320 are deployed such that the direction of elongation of the lenses 320 coincide with the second direction of elongation of the slice 332. After alignment, the lenses 320 are optically attached to the retardation plates 318 via optical adhesive (i.e., cement) so as to bond the lenses 320 to the slice 332. If the plate 360 is removable, the plate 360 can be removed after attachment of the lenses 320. Alternatively, if the plate 360 is optically transparent (to the light emitted by the light sources 12a, 12b and 12c), the plate 360 itself can be bonded to the retardation plates 318 or to the plate 370, via optical adhesive.

Next, the plate 350, which carries the detectors 326a, 326b and 326c, is aligned with the lenses 320. The detectors 326a, 326b and 326c are arranged on the plate 350 in a two-dimensional array or grid having a number of rows and columns. The rows arbitrarily correspond to the first direction of elongation of the slice 332, while the columns arbitrarily correspond to the second direction of elongation of the slice 332. There is a one-to-one correspondence between the columns and the lenses 320, such that each respective lens 320 is associated with a respective column Each column of the array includes N+1 groups of detectors, where each group consists of one of the detectors 326a, one of the detectors 326b, and one of the detectors 326c, and where N is an integer that represents the number of planes 136 (i.e., N+1 is the number of substrates 302 that will be produced from each section 340). The ordering of the detectors 326a, 326b and 326c within each group remains consistent between the groups.

The plate 350 is aligned with the lenses 320 such that the detectors 326a, 326b and 326c of each column are associated with a respective one of the lenses 320. After alignment, the detectors 326a, 326b and 326c are coupled to the lenses 320 via, for example, an adhesive (e.g., optical cement). Similar to as previously described with reference to FIGS. 16A-16C and FIG. 19, the plate 350 may include an electrically conductive carrier foil which provides electrically conductive contact points for the detectors 326a, 326b and 326c. Alternatively, the foil may act as a temporary holder for the detectors 326a, 326b and 326c and may be removed after attachment of the detectors 326a, 326b and 326c to the lenses 320. In such cases, an electrically conductive surface having electrically conductive elements may be attached to each of the detectors 326a, 326b and 326c.

The plate 380, which carries retardation plates 324 (preferably quarter-wave plates), is aligned with the major surface 306 of the slice 332 such that each respective retardation plate 324 is associated with a respective one of the coated surfaces 329 that form the PBS 316. There is a one-to-one correspondence between the retardation plates 324 and the coated surfaces 329 that form the PBS 316. After alignment, the retardation plates 324 are optically attached to the surface 306 via optical adhesive (i.e., cement) so as to bond the retardation plates 324 to the slice 332. If the plate 380 is removable, the plate 380 can be removed after attachment of the retardation plates 324. Alternatively, if the plate 380 is optically transparent (to the light emitted by the light sources 12a, 12b and 12c), the plate 380 itself can be bonded to the slice 332 via optical adhesive.

Next, the plate 390, which carries the cylindrical lenses 322a, 322b and 322c, is aligned with the retardation plates 324. The lenses 322a, 322b and 322c are deployed such that the direction of elongation of the lenses 322a, 322b and 322c coincide with the first direction of elongation of the slice 332 (i.e., the lenses 322a, 322b and 322c and the lenses 320 are orthogonally oriented). The lenses 322a, 322b and 322c are arranged on the plate 350 in a two-dimensional array or grid having a number of rows and columns. Similar to the array of the detectors 326a, 326b and 326c, the rows arbitrarily correspond to the first direction of elongation of the slice 332, while the columns arbitrarily correspond to the second direction of elongation of the slice 332. There is a one-to-one correspondence between the columns and the retardation plates 324, such that each respective retardation plate 324 is associated with a respective column. Similar to the array of the detectors 326a, 326b and 326c, each column of the array includes N+1 groups of lenses, where each group consists of one of the cylindrical lenses 322a, one of the cylindrical lenses 322b, and one of the cylindrical lenses 322c. The ordering of the cylindrical lenses 322a, 322b and 322c within each group remains consistent between the groups. The plate 390 is aligned with the retardation plates 324 such that the cylindrical lenses 322a, 322b and 322c of each column are associated with a respective one of the retardation plates 324. After alignment, the cylindrical lenses 322a, 322b and 322c are optically attached to the retardation plates 324 via optical adhesive (i.e., cement) so as to bond the cylindrical lenses 322a, 322b and 322c to the slice 332. If the plate 390 is removable, the plate 390 can be removed after attachment of the cylindrical lenses 322a, 322b and 322c. Alternatively, if the plate 390 is optically transparent (to the light emitted by the light sources 12a, 12b and 12c), the plate 390 itself can be bonded to the retardation plates 324 or to the plate 380, via optical adhesive.

It is noted that the alignment and attachment steps described with reference to FIG. 27F can generally be performed in any order, so long as overall alignment and association between sets of cylindrical lenses, retardation plates, PBS's, and detectors, is maintained. After the components, carried by the plates 350, 360, 370, 380 and 390, are attached to the slice 332 (either directly, or indirectly via other components carried by the plates), the slice 332 can be cut along the plane(s) 134 (FIG. 27E) to produce multiple sections 340, where each section consists of a pair of coated surfaces 329. Each of the sections 340 can then cut along the plane(s) 136 to produce substrates 302, each having attached components as illustrated and described with respect to FIGS. 23-26. As discussed, the optical device 300, in response to illumination from polarized beams 14a, 14b and 14c, provides approximately circular (symmetric) collimated polarized output beams 15a, 15b and 15c. In order to combine the output beams 15a, 15b and 15c, the optical device 300 can be combined with a dichroic beam combiner to produce a color-combined output beam. Since the optical device 300 provides functions for power monitoring, collimation, and beam divergence reduction (i.e., symmetric beam generation), the optical device 300 is particularly suited to operate with dichroic beam combiners that are limited to color-combining functionality, such as, for example, the dichroic beam combiners illustrated in FIGS. 2, 6, 7, 9B, 10B, 10D, and 11B.

Figure 28:
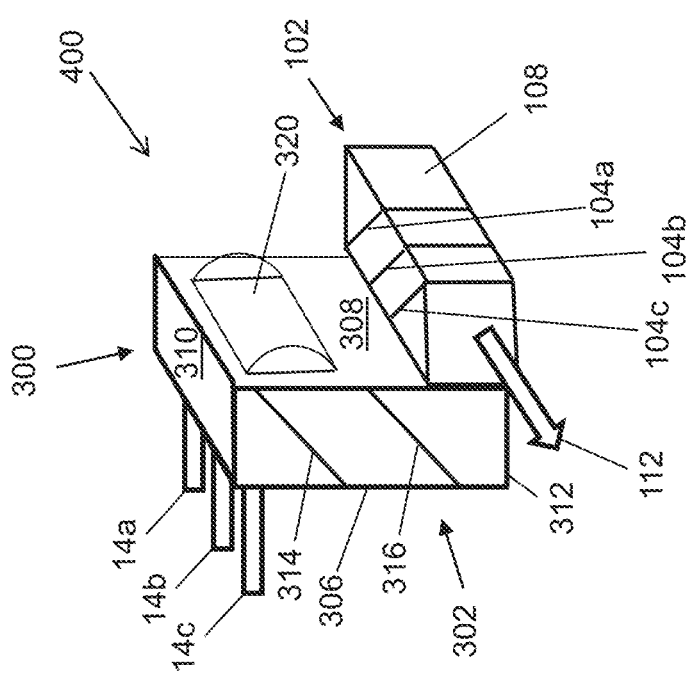
FIG. 28 is a schematic isometric view of an optical system/device including the optical device of FIGS. 23-26 coupled to the dichroic beam combiner of FIG. 2, according to an embodiment of the present invention.

FIG. 28 illustrates an optical system/device 400 that includes the optical device 300 and a dichroic beam combiner (implemented in this illustrative example as the dichroic beam combiner 102 illustrated in FIG. 2). The optical device 300 and the dichroic beam combiner 102 are optically coupled to each other at the surfaces 308 and 106, which define an interface region (interface plane) between the two devices. The optical coupling may be implemented as a mechanical coupling with an air gap between the surfaces 308 and 106 or a gap between the surfaces 308 and 106 that is filled with an index matched material. Alternatively, the optical device 300 and the dichroic beam combiner 102 may be coupled via a layer of optical adhesive between the surfaces 308 and 106. As should be apparent, the plates 120 (or plates 120 and 121) used to manufacture the optical device 300 and the dichroic beam combiner 102 should be of the same refractive index to minimize unwanted refractions of the beams 15a, 15b and 15c the interface region between the optical device 300 and the dichroic beam combiner 102.

The optical devices described thus far can be used in a wide range of applications for which a miniature color-combiner is needed. Examples of suitable applications include, but are not limited to, various imaging applications, such as near eye displays (NEDs), head mounted displays (HMDs), and head-up displays (HUDs) that utilize image projectors that project images into components of the NED, HMD, and HUD, cellular phones, compact displays, 3-D displays, compact beam expanders, as well as non-imaging applications, such as flat-panel indicators and scanners. The optical devices of the present embodiments may be of particular value when used as an illumination component of such image projectors, which employ SLM micro-displays that require illumination by polarized light to generate image pixels. Various types of image projectors suitable for NED, HMD, and HUD applications, are commercially available from Lumus Ltd. (Israel). These image projectors may employ various prism assemblies, including, illumination prisms and collimating prisms, together with a reflective-display device (e.g. LCoS). The optical devices of the present embodiments may also be used with non-visible light sources, such as non-visible laser diodes, which have particular applicability to LIDAR-type systems where multiple non-visible laser light sources are required. Such LIDAR-type systems can be used in combination with the optical devices described herein, and can be deployed, for example, in a vehicle HUD environment, for example installed in the dashboard or windshield of a vehicle.

Figure 29:
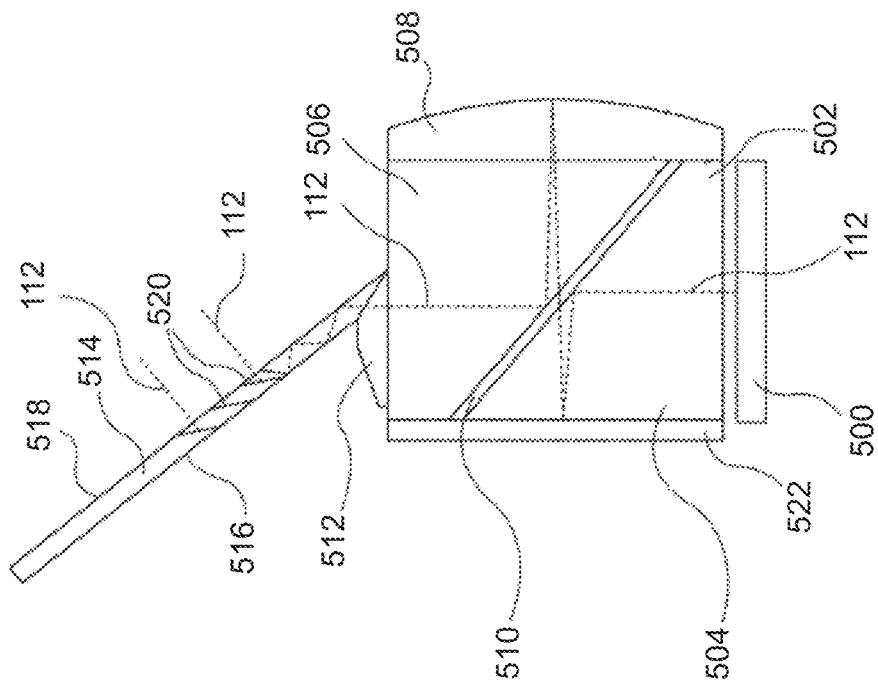
FIG. 29 is a schematic plan view of an optical system including an optical device, that produced a color-combined output beam, coupled to an image projector device and a light-waves transmitting substrate, according to an embodiment of the present invention.

By way of illustration of one particularly preferred but non-limiting subset of applications, FIG. 29 illustrates an optical device 500 which produces a color-combined output beam, combined with an image projector device 502 that generates a collimated image, and a light-guiding substrate 514 that receives injected images from the image projector device 502, to form an optical system. The optical device 500 may correspond in structure to any of the optical devices and corresponding components described with respect to FIGS. 2, 6, 7, 9B, 10B, 10D, 11B, 13, 15, 17, 18, 20, and 28.

The generic structure of the image projector device 502 and the substrate 514 will now be described, however, more detailed description of the image projector device 502 and the substrate 514 may be found in the following PCT patent publications, the disclosures of which are incorporated by reference in their entirety herein: WO 2018/100582, WO 01/95027, and WO 2008/023367. It is noted that the image projector device 502 and the substrate 514 described herein are merely examples of image projecting devices and light-guiding optical elements with which the optical device 100 can be used to advantage.

The image projector device 502 includes two constituent prisms 504, 506 that form an image-collimating prism. A polarization selective beamsplitter configuration 510 (PBS 510) is deployed within the image-collimating prism. Light waves 112, output from the optical device 500, enter the prism 504, preferably as s-polarized light waves. One or more retardation plates may be deployed between the optical device 500 and the image projector device 502 in order to achieve the desired s-polarization. The s-polarized light waves are reflected by the PBS 510 toward an image display surface where they impinge on a reflective-display device 522 (preferably implemented as an LCoS). Pixels corresponding to bright regions of the image are reflected with modulated rotated polarization to transform the light waves from s-polarized to p-polarized so that radiation from the bright pixels is transmitted through the PBS 510 and passes through at least one retardation plate (not shown), preferably a quarter-wave plate, before entering at least one light-wave collimating component 508 overlying at least part of the retardation plate, and is reflected back through quarter-wave plate to transform the light waves back to s-polarized. The s-polarized light waves are then reflected by the PBS 510 out of the prism 506, where they enter the substrate 514.

The substrate 514 typically includes at least two major surfaces 516 and 518 that are parallel to each other, one or more partially reflecting surfaces 520, and an optical wedge element 512 for coupling light into the substrate 514. The output light-waves 112 from the image projector device 502 enter the substrate 514 through the optical wedge element 512. The incoming light-waves (vis-a-vis the substrate 514) are trapped in the substrate 514 by total internal reflection (TIR) as illustrated in FIG. 29. The outcoupling of the trapped light waves from the substrate 514 can be applied by the partially reflecting surfaces 520 or by diffractive elements, or any other suitable outcoupling arrangement. The optical wedge element 512 is merely illustrative of one non-limiting optical coupling configuration, and other elements and configurations can be used to couple the light from the image projector device 502 into substrate 514.

Figure 30B:
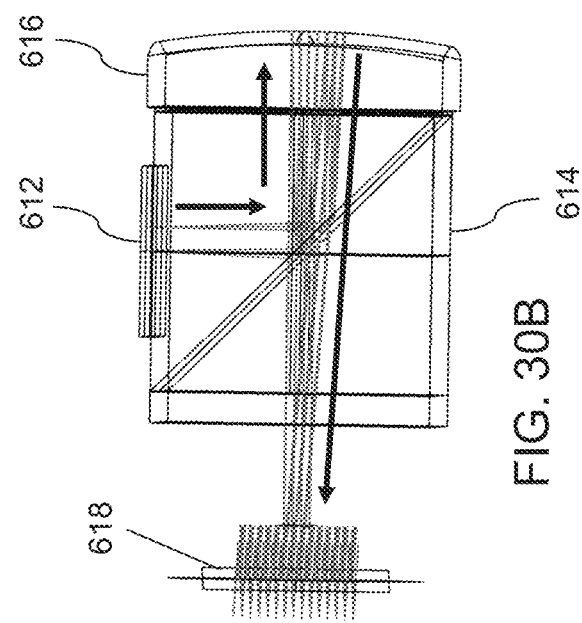
FIGS. 30A and 30B are schematic front and side views, respectively, of an optical system including an optical device, that produces a color-combined output beam, coupled to an optical arrangement for projecting light into an optical waveguide, according to an embodiment of the present invention.
Figure 30A:
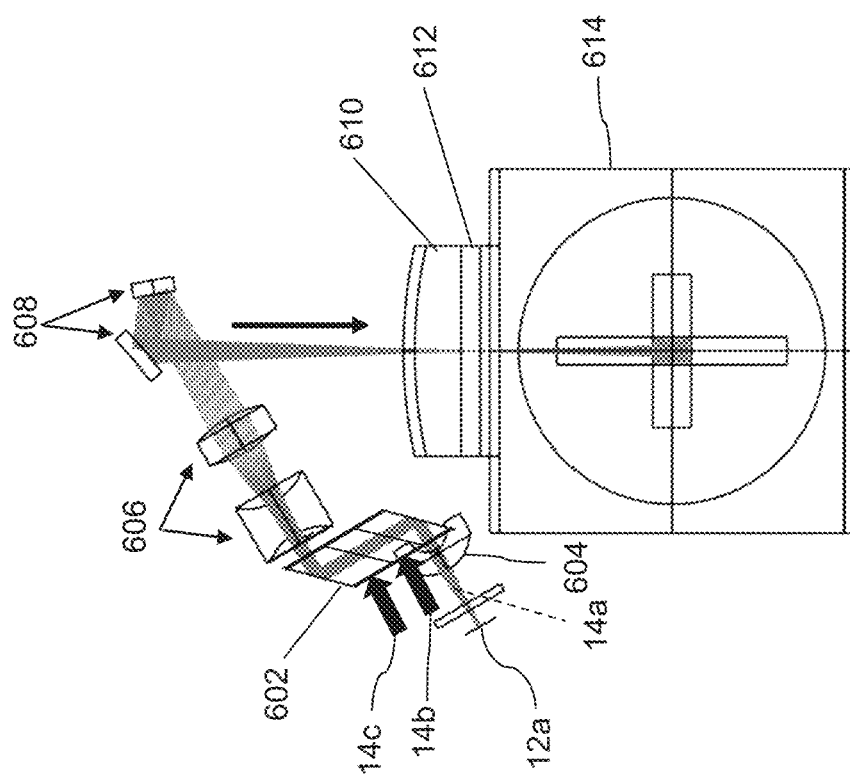

FIGS. 30A and 30B illustrate another non-limiting subset of applications for which the dichroic beam combiners of the present disclosure can be of particular use. Here, an optical device 600, which produces a color-combined output beam, is combined with an optical arrangement for projecting light into an optical waveguide, to form an optical system (a laser scanning system). The optical device 600 may correspond in structure to any of the optical devices and corresponding components described with respect to FIGS. 2, 6, 7, 9B, 10B, 10D, 11B, 13, 15, 17, 18, 20, and 28.

Light source 12a emits colored light beam 14a, which is collimated by a micro-lens 604 (which can be lens 180a as in FIG. 13) prior to impinging on one of the reflectors of the dichroic beam combiner 602. The collimated light beams 14b and 14c from the other light sources that impinge on the other dichroic reflectors of the dichroic beam combiner 602 are represented only as arrows. The dichroic beam combiner 602 combines the light beams 14a, 14b and 14c (as discussed in detail throughout the present disclosure) to produce a color-combined output beam, and reflects the output beam toward relay optics 606, which act to de-collimate the beam and re-collimate the beam (in the case where the output beam is overly collimated). A pair of scanning mirrors 608 scan the angle of the output beam to generate a field of illumination. The illumination field from the scanning mirrors 608 is imaged, by a lens 610, onto an exit pupil 618 (shown in FIG. 30B). In some cases, the numerical aperture of the output beam is expanded by a micro-lens array 612. FIG. 30B shows a side view of the bottom section of the laser scanning system, where the output beam is reflected by a PBS 614 onto a reflecting lens 616 which collimates the output beam and transmits the collimated beam to the exit pupil 618, which can be optically couple to an optical waveguide, such as the substrate 524 of FIG. 29.

Parenthetically, if the optical device 400 of FIG. 28 is used with the laser scanning system to produce the color-combined output beam, the micro-lens 604 and relay optics 606 are not needed, as the individual colored beams are collimated and symmetric prior to combining, thereby avoiding the need to de-collimate and re-collimate the output beam.

It is noted that for each instance where a particular polarized wave path has been followed in the examples described herein, the polarizations are interchangeable, whereby on alternating the polarization selective properties of the various selectively reflective surfaces (e.g., the reflectors 204a, 204b, 204c and 204d, surface 214, PBS 314, PBS 316, etc.), each mention of p-polarized light could be replaced by s-polarized light, and vice versa.

Throughout this document, reference has been made to light of particular colors, specifically, red light, green light, and blue light. Such light is collectively referred to as "colored light". As discussed, light of each of these particular colors has a center wavelength that is in a particular corresponding spectral region of the visible spectrum, whereby red light generally has a center wavelength of 638 nanometers (nm)—or approximately 638 nm, green light generally has a center wavelength of 532 nm—or approximately 532 nm, and blue light generally has a center wavelength of 456 nm—or approximately 456 nm. However, these specific wavelengths are exemplary only, and the particular wavelength of the different types of colored light can be selected from anywhere in the relevant spectral region of the visible spectrum, which in the case of blue light is approximately in a range of 450 nm-485 nm (but can extend outside of this range in certain instances), and in the case of green light is approximately in a range of 500 nm-565 nm (but can extend outside of this range in certain instances), and in the case of red light is approximately in a range of 625 nm-740 nm (but can extend outside of this range in certain instances). The coatings of the reflectors of the beam combiners of the present disclosure should be designed to achieve the desired reflectivity and transmissivity for whichever particular center wavelength and wavelength range is selected for the corresponding colored light.

In addition, although the embodiments of the present disclosure have been described within the context of combining visible light, in particular red, green, and blue light, the beam-combining functionality enabled by the beam combiners of the present disclosure can equally be applied to combining light of other sets of colors in the visible spectrum, or light beams from other regions of the electromagnetic spectrum, including, for example, the infrared (IR) region, the near-infrared (NIR) region, and the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for manufacturing an optical device, the method comprising:
   arranging a plurality of coated surfaces in a stack so as to assume a periodic formation that includes a sequence of segments, the sequence of segments including a first segment, and the periodic formation formed by repeating the first segment a set number of times, the first segment including:
   a first coated surface that reflects or transmits light having wavelength in a first wavelength range,
   a second coated surface that reflects light having wavelength in a second wavelength range and transmit lights having wavelength in the first wavelength range, and
   a third coated surface that reflects or transmits light having wavelength in a third wavelength range, transmits or reflects light having wavelength in the first wavelength range or the second wavelength range;
   slicing the stack to form a slice having at least two parallel major external surfaces and a plurality of adjacent sections, each section having coated surfaces from one segment of the periodic formation between the two major external surfaces; and
   cutting the slice at least once to form at least one substrate from each section, each substrate of the at least one substrate having at least two parallel major surfaces and coated surfaces from a single segment of the periodic formation between the two major surfaces.

2. The method of claim 1, wherein the first coated surface is formed by applying a reflective coating to a surface associated with at least one transparent plate.

3. The method of claim 1, wherein the second coated surface is formed by applying a first dichroic coating to a surface associated with at least one transparent plate, and wherein the third coated surface is formed by applying a second dichroic coating to a surface associated with at least one transparent plate.

4. The method of claim 1, further comprising:
   simultaneously polishing the two major external surfaces of the slice.

5. The method of claim 1, wherein each substrate of the at least one substrate has a direction of elongation and is configured to output a combined beam having a propagation direction that is parallel to the direction of elongation.

6. The method of claim 1, wherein the cutting the slice at least once includes:
   cutting the slice along at least one plane that is perpendicular to the two major external surfaces of the slice so as to form a single section that includes exactly one segment.

7. The method of claim 6, further comprising:
   polishing at least one surface formed by slicing the slice along the at least one plane.

8. The method of claim 6, wherein the cutting the slice at least once further includes:
   slicing the single section along at least one second plane perpendicular to the at least one plane and the two major external surfaces of the slice so as to form the at least one substrate.

9. The method of claim 6, further comprising:
   slicing a substrate of the at least one substrate along a plane oblique to the at least one plane to form a planar surface; and
   polishing and coating the planar surface with a reflective coating so as to be reflective for light having wavelength in the first, second or third wavelength range, such that the substrate is configured to output a combined beam having a propagation direction that is perpendicular to a direction of elongation of the substrate and parallel to the two major surfaces of the substrate.

10. The method of claim 1, wherein the third coated surfaces reflect light having wavelength in the third wavelength range and transmit light having wavelength in the first wavelength range or the second wavelength range.

11. The method of claim 10, wherein the cutting the slice at least once includes:
cutting the slice along at least one first plane that is perpendicular to the two major external surfaces of the slice so as to form a single section that includes exactly one segment, and
slicing the single section along at least one second plane perpendicular to the at least one first plane and the two major external surfaces of the slice so as to form the at least one substrate, wherein each substrate of the at least one substrate has a direction of elongation and is configured to output a combined beam having a propagation direction that is parallel to the direction of elongation;
and wherein the method further comprises:
attaching a cuboid structure to a surface formed at the at least one first plane, the cuboid structure having a reflective surface deployed in a plane oblique to the surface formed at the at least one plane, the reflective surface configured to deflect the combined beam in a direction that is perpendicular to the direction of elongation and parallel to the major external surfaces.

12. The method of claim 1, wherein the third coated surfaces transmit light having wavelength in the third wavelength range and reflect light having wavelength in the first wavelength range or the second wavelength range.

13. The method of claim 12, wherein the cutting the slice at least once includes:
cutting the slice along at least one first plane that is perpendicular to the two major external surfaces of the slice so as to form a single section that includes exactly one segment, and
slicing the single section along at least one second plane perpendicular to the at least one first plane and the two major external surfaces of the slice so as to form the at least one substrate, wherein each substrate of the at least one substrate has a direction of elongation and is configured to output a combined beam having a propagation direction that is parallel to the direction of elongation;
and wherein the method further comprises:
attaching a cuboid structure to a portion of one of the two major external surfaces, the cuboid structure having a reflective surface deployed in a plane oblique to the two major external surfaces, the reflective surface configured to deflect the combined beam in a direction that is perpendicular to the direction of elongation and parallel to the major external surfaces.

14. The method of claim 1, wherein the first segment further includes:
a fourth coated surface that reflects light having wavelength in the first, second, or third wavelength range.

15. The method of claim 14, wherein the cutting the slice at least once includes:
cutting the slice along at least one first plane that is perpendicular to the two major external surfaces of the slice so as to form a single section that includes exactly one segment, and
slicing the single section along at least one second plane perpendicular to the at least one first plane and the two major external surfaces of the slice so as to form the at least one substrate, wherein each substrate of the at least one substrate has a direction of elongation and is configured to output a combined beam having a propagation direction that is parallel to the direction of elongation;
and wherein the method further comprises:
attaching a cuboid structure to a portion of one of the two major external surfaces, the cuboid structure having a reflective surface deployed in a plane oblique to the two major external surfaces, the reflective surface configured to deflect the combined beam in a direction that is perpendicular to the direction of elongation and parallel to the major external surfaces.

16. The method of claim 14, further comprising:
aligning a first plate with a first of the two major external surfaces of the slice, the first plate having a two-dimensional array of lenses arranged such that, for each segment, the first coated surface is associated with at least one first lens of the array, the second coated surface is associated with at least one second lens of the array, and the third coated surface is associated with at least one third lens of the array; and
aligning a second plate with a second of the two major external surfaces of the slice, the second plate having a two-dimensional array of lenses arranged such that, for each segment, the fourth coated surface is associated with at one lens of the array of the second plate.

17. The method of claim 1, further comprising:
aligning a first plate with a first of the two major external surfaces of the slice, the first plate having a two-dimensional array of lenses arranged such that, for each segment, the first coated surface is associated with at least one first lens of the array, the second coated surface is associated with at least one second lens of the array, and the third coated surface is associated with at least one third lens of the array.

18. The method of claim 17, further comprising:
aligning a second plate with a second of the two major external surfaces of the slice, the second plate having a two-dimensional array of detectors arranged such that, for each segment, the first coated surface is associated with at least one first detector of the array, the second coated surface is associated with at least one second detector of the array, and the third coated surface is associated with at least one third detector of the array.

19. The method of claim 17, further comprising:
attaching at least one retardation plate to a second of the two major external surfaces of the slice; and
aligning a second plate with the retardation plate, the second plate having a two-dimensional array of lenses arranged such that, for each segment, the first coated surface is associated with at least one first lens of the array of the second plate, the second coated surface is associated with at least one second lens of the array of the second plate, and the third coated surface is associated with at least one third lens of the array of the second plate.

20. The method of claim 19, further comprising:
aligning a third plate with the second plate, the third plate having a two-dimensional array of detectors arranged such that, for each segment, the first coated surface is associated with at least one first detector of the array of detectors, the second coated surface is associated with at least one second detector of the array of detectors, and the third coated surface is associated with at least one third detector of the array of detectors.

21. The method of claim 20, further comprising:
deploying a plurality of retardation plates in the stack such that the first segment includes at least one retardation plate.

22. The method of claim 1, further comprising:
aligning a plate with one of the two major external surfaces of the slice, the plate having a two-dimensional array of detectors arranged such that, for each segment, the first coated surface is associated with at least one first detector of the array, the second coated surface is associated with at least one second detector of the array, and the third coated surface is associated with at least one third detector of the array.

23. The method of claim 22, wherein the plate further includes an electrically conductive carrier foil that carries the detectors on the plate.

24. The method of claim 22, further comprising:
attaching an electrically conductive surface to the plate, the electrically conductive surface including a plurality of electrical contact points, each contact point associated with a respective one of the detectors.

25. A method for manufacturing an optical device, the method comprising:
obtaining a plurality of transparent plates;
applying a polarization-selective coating to a plurality of surfaces associated with the transparent plates to form a plurality of coated surfaces that transmit incident light to the coated surfaces that is polarized in a first polarization direction and reflect incident light to the coated surfaces that is polarized in a second polarization direction orthogonal to the first polarization direction;
arranging the plates in a stack such that the coated surfaces are mutually parallel;
slicing the stack to form a slice including at least a first and a second major external surface and a plurality of adjacent sections, each section including exactly two of the coated surfaces between the first and second major external surfaces;
attaching a first array of retardation plates to the first or second major external surface such that, for each section, a first of the two coated surfaces of the section is associated with a respective one of the retardation plates of the first array of retardation plates;
attaching a second array of retardation plates to the second or first major external surface such that, for each section, a second of the two coated surfaces of the section is associated with a respective one of the retardation plates of the second array of retardation plates;
attaching a first array of lenses, deployed in a first orientation, to the first array of retardation plates such that, for each section, the first of the two coated surfaces of the section is associated with a respective one of the lenses of the first array of lenses; and
attaching a second array of lenses, deployed in a second orientation orthogonal to the first orientation, to the second array of retardation plates such that, for each section, the second of the two coated surfaces of the section is associated with at least one first lens, at least one second lens, and at least one third lens of the second array of lenses.

26. A method for manufacturing an optical device, the method comprising:
arranging a plurality of coated surfaces in a stack so as to assume a periodic formation that includes a sequence of segments, the sequence of segments including a first segment, and the periodic formation formed by repeating the first segment a set number of times, the first segment including a first coated surface and a second coated surface, each of the coated surfaces configured to transmit certain types of light and reflect other types of light;
slicing the stack at an oblique angle to the coated surfaces to form a slice having at least two major external surfaces and a plurality of adjacent sections, each section having coated surfaces from one segment of the periodic formation between the two major external surfaces and oblique to the two major external surfaces; and
cutting the slice at least once to form at least one substrate from each section, each substrate of the at least one substrate having at least two major surfaces and coated surfaces from a single segment of the periodic formation embedded between the two major surfaces, wherein coatings used to produce the coated surfaces and the oblique angle are such that, for each substrate of the at least one substrate, light that is transmitted and reflected by the coated surfaces propagates as unguided light through the substrate.

* * * * *